(12) United States Patent
Celikel et al.

(10) Patent No.: US 9,874,482 B2
(45) Date of Patent: Jan. 23, 2018

(54) FIBER COUPLED INTEGRATING SPHERE BASED-LASER ENERGY METER AND CALIBRATION SYSTEM (FCIS BASED—LEMCS) TRACEABLE TO PRIMARY LEVEL STANDARDS

(71) Applicant: TUBITAK (TURKIYE BILIMSEL VE TEKNOLOJIK ARASTIRMA KURUMU), Ankara (TR)

(72) Inventors: Oguz Celikel, Kiocaeli (TR); Ferhat Sametoglu, Kiocaeli (TR)

(73) Assignee: TUBITAK (TURKIYE BILIMSEL VE TEKNOLOJIK ARASTIRMA KURUMU), Ankara (TR)

( * ) Notice: Subject to any disclaimer, the term of this patent is extended or adjusted under 35 U.S.C. 154(b) by 0 days.

(21) Appl. No.: 15/113,839

(22) PCT Filed: Jan. 24, 2014

(86) PCT No.: PCT/IB2014/058513
§ 371 (c)(1),
(2) Date: Jul. 25, 2016

(87) PCT Pub. No.: WO2015/110868
PCT Pub. Date: Jul. 30, 2015

(65) Prior Publication Data
US 2016/0334285 A1    Nov. 17, 2016

(51) Int. Cl.
*G01K 17/00* (2006.01)
*G01J 1/42* (2006.01)
*G01J 1/04* (2006.01)

(52) U.S. Cl.
CPC ......... *G01K 17/003* (2013.01); *G01J 1/4257* (2013.01); *G01J 2001/0481* (2013.01)

(58) Field of Classification Search
CPC . G01K 17/03; G01J 1/4257; G01J 2001/0481
See application file for complete search history.

(56) References Cited

U.S. PATENT DOCUMENTS 5,774,213 A * 6/1998 Trebino ............. G01N 21/3151
356/320
2010/0219327 A1* 9/2010 Arbore ................... G01N 21/55
250/206

(Continued)

FOREIGN PATENT DOCUMENTS

DE        3002558 B1    4/1981
DE        3002559 A1    7/1981

(Continued)

OTHER PUBLICATIONS

Oguz Celikel et al, "Cryogenic radiometer based absolute spectral power responsivity calibration of integrating sphere radiometer to be used in power measurements at optical fiber communication wavelengths", Optical and Quantum Electronics, 37, 529-543,(2005).

(Continued)

*Primary Examiner* — Sang Nguyen
(74) *Attorney, Agent, or Firm* — Gokalp Bayramoglu

(57) ABSTRACT

FCIS based-LEMCS designed in this invention accomplishes both of the above proficiencies of measuring the averaged pulse energy of the Pulsed Type Laser Source and calibrating the Commercial Laser Energy Meters, which are traceably to primary level standards, FCIS based-LEMCS contains an integrating sphere having a novel port and an interior design and a series of mechanical choppers having separate Duty Cycles, each of which is rotated by an electrical motor in FCIS based-LEMCS, used for generating a chopped type laser, called as Chopped Type Laser Source, in order to provide the reference and averaged pulse energy (Continued)

for traceable calibration of Commercial Laser Energy Meters.

20 Claims, 11 Drawing Sheets

(56) References Cited

U.S. PATENT DOCUMENTS

| | | | |
|---|---|---|---|
| 2011/0084717 A1 | 4/2011 | Fong et al. | |
| 2013/0110311 A1* | 5/2013 | Ver Steeg | G01N 21/27 701/1 |
| 2013/0250997 A1 | 9/2013 | Greenfield et al. | |

FOREIGN PATENT DOCUMENTS

| | | | |
|---|---|---|---|
| JP | S63100335 A | 5/1988 | |
| WO | WO 2007094822 A2 * | 8/2007 | G01J 1/04 |

OTHER PUBLICATIONS

Ferhat Sametoglu,"New traceability chains in the photometric and radiometric measurements at the National Metrology Institute of Turkey",Optics and Lasers in Engineering 45, 36-42,(2007).

Volker Jungnickel et al,"Physical Model of the Wireless Infrared Communication Channel",IEEE Journal on Selected Areas in Communications,vol. 20, No. 3, 631-640,(Apr. 2002).

Labsphere Technical Guide: Integrating Sphere Photometry and Radiometry http://www.labsphere.com/uploads/technical-guides/a-guide-to-integrating-sphere-radiometry-and-photometry.pdf.

Oguz Celikel,"Mode Field Diameter and cut-off wavelength measurements of single mode optical fiber standards used in OTDR calibrations", Optical and Quantum Electronics, 37,587-604(2005).

David Bergström,"The Absorption of Laser Light by Rough Metal Surfaces", Doctoral Thesis,Department of Engineering,Physics and Mathematics Mid Sweden University Östersund, Sweden Luleå, Feb. 2008.

* cited by examiner

FIGURE 9a

FIBER COUPLED INTEGRATING SPHERE BASED-LASER ENERGY METER AND CALIBRATION SYSTEM (FCIS BASED—LEMCS) TRACEABLE TO PRIMARY LEVEL STANDARDS

FIELD

The present invention is related to a Fiber Coupled Integrating Sphere (FCIS) Based-Laser Energy Meter and Calibration System (FCIS based-LEMCS), designed for both measuring the averaged pulse energy of a Pulsed Type Laser Source generating infinite laser pulse train in time domain, and calibrating Commercial Laser Energy Meters, which is fully traceable to Primary Level Standards, together with new calibration method.

BACKGROUND

Laser, an acronym, means amplification of amplitude-, frequency- and phase-coherent electromagnetic waves generated by a suitable pumping process inside a closed region composed of a mixture of relevant radiating atoms and molecules, the energy levels of which fully conforms to a stimulated emission created by a feedback of some portion of the coherent electromagnetic wave at the output port of the region.

The areas of use of lasers get very diverse along with the increasing in the developments of the design and manufacturing of high technology products. If a categorization according to priorities of using the highest technology in industrial products is made, it is seen that health and war technology equipments are more dominant over the other industry sectors. The lasers can have continuous wave (CW) mode lasing and/or pulsed-mode lasing and have conspicuous and effective characteristics such as lethal or non lethal effects, physiological, psychological or directly physical effect depending on the energy transferred into any target in modern war and health equipments. In order to make exact and correct evaluations about the resultant effects of any laser source on any target, it seems that it is an unavoidable approach to make spectral power distribution, total power and energy measurements of the relevant laser source in addition to the determination of surface absorption/reflection, structural and atomic/molecular bonding characteristics of the target.

The spectral power distribution (W/nm) and the total power (W) carry a significant meaning for a CW mode/regime laser source because the knowledge of total power of a CW laser is enough to calculate the total exposure over time t (s) for surface of any relevant target in (J) and (J/cm$^2$), energy density, by taking the target absorptiveness into account. Differently from the measurement of total power of CW laser in W, the measurement of laser energy (J) per pulse for a Pulsed Type Laser Source in time domain conveys a significant meaning, because the exposure of the Pulsed Type Laser Source depends on pulse width (PW) and peak power $P_0$ of the Pulsed Type Laser Source, considering surface absorption/reflection, structural and atomic/molecular bonding properties of the target.

NOTE: The term "Chopped Type Laser Source" in the invention means the modulated laser source generated by chopping CW Gaussian Laser Beams of CW Laser Source(s) mechanically by means of the group of the circular and metallic choppers, which is strict a part of FCIS based-LEMCS invented. The term "Pulsed Type Laser Source" in the invention means any other laser source which is different from the "Chopped Type Laser Source", and which is not a part of FCIS based-LEMCS invented. Nevertheless, both "Chopped Type Laser Source" and "Pulsed Type Laser Source" in the invention produce laser pulses, both of which have Gaussian beam profile, as infinite pulse train in time domain and finally, the terra "Gaussian Laser Beam" used in the invention means diffraction limited—transverse electromagnetic mode having the lowest order (TEM$_{00}$).

The transferred energy into the target by a laser source regardless of CW or pulsed type results in a temperature increase in limited volume of the target, depending on the heat capacity, mass and the initial temperature of the relevant volume of the target. Detecting the temperature increase of the relevant volume of the target resulted from the energy of the laser source can be made via conventional semiconductor type or metal/metal contact type temperature sensors. To gain signal to noise ratio (SNR) of detection system, which is one of the most important parameter increasing the measurement uncertainty, the separation of the temperature variation caused by energy transfer requires to he extended. The way to extend the separation between the initial temperature and the final temperature caused by laser source energy is to reduce the heat capacity (specific heat) of the target which is accomplished by reducing the initial temperature of the target down to cryogenic level, relying on Bose-Einstein approach. Reducing the initial temperature of the target also minimizes the atomic and molecular vibrations. According to Bose-Einstein statistic for the canonical ensemble, the heat capacity (specific heat) of a solid target reduces exponentially at cryogenic levels of temperature and this physical phenomenon expands the separation between the final and the initial temperature of the target, which expresses an absorbing cavity in a Cryogenic Radiometer (CR) and finally a calorimetric measurement for absolute optical power measurement and also optical energy measurement.

By considering the above summary, the traceable measurements of the laser energy meters and their traceable calibrations can be carried out by measuring the temperature difference (K) between the final and the initial temperature of the target along with inclusion of mass (kg) and the specific heat (J/kg K)), which is a measureable quantity, in the calculations, bearing in mind that: the time constant of the target (or the absorbing cavity). In a CR, the specific heat of the absorbing cavity for the electrical watt (A.V=W) applied within $\Delta t$ (s) time interval is obtained as a ratio and it is called as thermal coefficient in (W/K), also generating (J/K). In this traceability stage, it is seen that temperature (K), direct current (A) and direct voltage (V) together with traceable time (s) measurement necessary to define the time constant (s) of the target (or the absorbing cavity) and time interval $\Delta t$ (s) of the electrical power applied to the absorbing cavity should be wholly traceable to primary standards. As a result, the averaged pulse energy of a Pulsed Type Laser Source/Chopped Type Laser Source can be derived by calorimetric methods with traceability of temperature (K), direct current (A), direct voltage (V), and time (s).

Under the illumination of the above briefing related to the traceability chain of optical power and energy, it is understood that we need an optical power measurement in (W) and a time measurement in (s) for realization of the averaged pulse energy (J) of any Pulsed Type Laser Source. The mathematical basis belonging to deriving the averaged pulse energy of the Pulsed Type Laser Source is given by taking the laser pulses having a pulse width of PW (s) and a period of T (s), the peak power of which is $P_0$ (W), as an infinite pulse trainin time domain. Referring to the periodic pulse shape of Pulsed Type Laser Source in the style of an infinite pulse wave train, the function of output power of the Pulsed Type Laser Source for a period of T (s) is defined as P(t) in Eq.(1):

$$P(t) = \begin{Bmatrix} P_0 & 0 \le t \le PW \\ 0 & PW < t < T \end{Bmatrix} (W) \quad (1)$$

And P(t) is a periodical function, as an infinite laser pulse train in time domain, P(t)=P(t+T). Pulse energy of the single pulse of Pulsed Type Laser Source, PE (J);

$$PE = P_0 \cdot PW (J) \quad (2)$$

The average power of the Pulsed Type Laser Source, $P_{av}$;

$$P_{av} = \langle P(t) \rangle = \frac{1}{T} \int_0^T P(t) \, dt \; (W) \quad (3)$$

If the integral is written in the most general form and in the averaged terms by taking the Duty Cycle into account, Eq.(4) is obtained:

$$P_{av} = \frac{N PW_{av}}{T_{av}} P_0 \; (W) \quad (4)$$

$$\text{Duty Cycle}_{av} = \frac{N PW_{av}}{T_{av}} T_{av} = PW_{av} + DT_{av} \quad (5)$$

$$P_{av} = \frac{N}{T_{av}} PE_{av} \; (W) \quad (6)$$

Where the averaged pulse width is PW and the averaged dead time is $DT_{av}$ in an averaged repetition period $T_{av}$ for an infinite laser pulse train generated by Pulsed Type Laser Source. The averaged pulse energy of Pulsed Type Laser Source is obtained by multiplying N with $PE_{av}$. N is the pulse number and is equal to 1 for periodic and infinite pulse train in time domain, Eq.(4) and (6) give us a very useful approach to derive the averaged pulse energy $PE_{av}$ of Pulsed Type Laser Source. If repetition period T and the averaged optical power $P_{av}$ of Pulsed Type Laser Source are measured, the averaged pulse energy can easily be calculated. These measurements of the averaged repetition period $T_{av}$ and the averaged optical power $P_{av}$ should be performed traceable to primary level standards, which are $^{133}$Cs (or $^{87}$Rb) Atomic Frequency Standard in time scale (s), and optical power transfer standard calibrated against absolute optical power measurement system called CR in optical power scale (W) [1 and 2], and an electrometer in direct current scale (A) traceable to Quantum Hall System, and DC Josephson System. The precise measurements of $T_{av}$ and $P_{av}$ traceable the primary level standards exhibits a process without measuring the temperature change caused by the averaged pulse energy of a Pulsed Type Laser Source. The most uncertainty contribution of the calorimetric measurements of the averaged pulse energy is resulted from the determination time constant of an absorbing surface (target) and so the pulse and the modulation response of the absorbing cavity (target). In addition to the elimination of time constant of FCIS time/frequency related measurements in the invention, the new configuration of the integrating sphere invented, called as FCIS, enables the user positioning the laser beam having a Gaussian profile on the same optical axis with respect to the entrance port for every calibration process so the reproducibility of the calibration and the measurement processes are increased with the new configuration of FCIS.

Photovoltaic type photodiodes generate an integrated photocurrent as response of the optical flux falling on the sensitive surfaces, corresponding to average optical power of the incident optical flux. This is also valid for the ultra fast photodiodes having very fast impulse response, like positive-intrinsic-negative (PIN) photodiodes as well as avalanched type photodiodes supplied with a reversed voltage bias which reduces the diffusion capacity of the photodiode, still used in optical time domain retlectometer instruments. The integrated photocurrent is also generated for the relatively small portion of light flux within optical pulses having ultra short time intervals, such as $\Delta t \cong 20 \times 10^{-12}$ s.

The parameters to be measured to determine the averaged pulse energy $PE_{av}$ of the Pulsed Type Laser Source in Eq.(6) are averaged repetition period $T_{av}$, number of pulses N having a varying pulse width PW, and average power $P_{av}$, corresponding to an average photocurrent $I_{av}$ generated by the First Photodiode, which is InGaAs_1 for the apparatus designed as one embodiment in the invention. Eq.(6) can be re-written as Eq.(7) by considering the spectral responsivity of the First Photodiode in order to obtain the averaged pulse energy of Pulsed Type Laser Source in FIG. 1 and FIG. 2.

$$P_{av} = \frac{I_{av}}{R_{FCIS}^\lambda} = \frac{N}{T_{av}} PE_{av} \; (W) \quad (7)$$

Where $R_{FCIS}^\lambda$ spectral power responsivity of FCIS, to which the First Photodiode is mounted, in A/W. As stated above, $I_{av}$ is measured by the First Photodiode placed orthogonally with respect to laser entrance port of FCIS. $I_{av}= \langle I_{ph}(t) \rangle$, $I_{ph}(t)=I_{ph}(t+T)$ is the periodic pulse type photocurrent, generated by P(t). $I_{av}$ is the time average of $I_{ph}(t)=I_{ph0} \text{rect}(t)$. $T_{av}$ (and/or $f_{av}$) is measured by using a second photodiode mounted on an internal steel hemisphere, which is placed on directly opposite Gaussian laser beam entrance port of FCIS of FCIS based-LEMCS. For single pulse having a unit amplitude, rect(t) function is defined as in Eq.(8).

$$\text{rect}(t) = \begin{Bmatrix} 0 & PW < t < \infty \\ 1 & 0 < t < PW \end{Bmatrix} \quad (8)$$

This definition of a single pulse given in Eq.(8) will be useful for the description of the pulse response of the First Photodiode and for the description of use of a second photodiode, which is different from the First Photodiode, and which has a relatively small time constant, to carry out time/frequency related measurements in Eq.(7). $R_{FCIS}^\lambda$ in Eq.(7) is obtained by calibrating FCIS based-LEMCS against the Optical Power Transfer Standard, which is an InGaAs based spectralon sphere radiometer directly and which is absolutely calibrated against Cryogenic Radiometer (CR) in this invention. Another alternative process of deriving the $R_{FCIS}^\lambda$ of the First Photodiode can be performed with a relatively higher uncertainty arising from the surface non uniformity by referencing a flat spectral response Electrically Calibrated Pyroelectric Radiometer (ECPR), traceable to CR, in such a way that the whole spectra of 900 nm to 1650 nm of the First Photodiode is covered.

NOTE: The use of different type of Optical Power Transfer Standard doesn't disturb the philosophy of the invention because FCIS based-LEMCS is one embodiment.

According to Eq.(7), if $I_{av}$, $T_{av}$, and $R_{FCIS}^\lambda$ are measured, the specified and averaged pulse energy $PE_{av}$ of the Pulsed Type Laser Source can be calculated with an expanded uncertainty by taking the related partial derivations of $I_{av}$, $T_{av}$, and $R_{FCIS}^\lambda$ into the calculations.

The Second Photodiode, which is InGaAs_2 in the invention as one embodiment, is assembled with a first multimode (MM) patch cord. FC/PC connector end of the first multimode (MM) patch cord is combined to a Mechanical Attenuator and the HMS connector end of the first MM fiber patch cord having a Zr ferrule is mounted on the center of the inner wall of an internal steel hemisphere, which is placed inside FCIS, which has a smaller diameter than that of FCIS. The Second Photodiode combined with the hemisphere through a second MM patch cord, the Mechanical Attenuator, and the first MM patch cord having ceramic and Zr ferrules is used for the time measurements such as averaged repetition period $T_{av}$ and averaged repetition frequency $f_{av}$ in Eq.(7), cutoff limit is 6 GHz. The second use purpose of the Second Photodiode is to coincide optical axes of FCIS and Pulsed Type Laser Source, Chopped Type Laser Source, and CW Laser Source. The Internal Steel Hemisphere is made from stainless steel and is assembled with a Zr ferrule of the first MM optical fiber patch cord. The internal Steel Hemisphere is so settled inside FCIS that Gaussian laser beam entrance port of FCIS of FCIS based-LEMCS sees directly the center of the Internal Steel Hemisphere, at the center of which Zr ferrule of HMS connector end of the first MM optical fiber patch cord is mounted back 0.2 mm from the inner surface. The placement of a internal steel hemisphere together with Zr ferrule of HMS connector end of the first MM optical fiber patch cord is one of the important points of this invention.

The practical way to search the frequency response of any electronic device, such as a pin photodiode in this invention, is to apply a pulse having a varying pulse width and a varying period to the electronic device. According to the Fourier transformation between time and frequency domains, as long as the pulse width PW is made relatively narrow, it is seen that the frequency content of the pulse increases. As a result, an ideal $\delta(t)$-impulse function in time domain covers a frequency range from zero to infinite theoretically. The periodic optical pulses P(t) generated by the Pulsed Type Laser Source, the pulse width PW of which are adjustable, can be defined as a sum of odd (sinus) harmonics in Fourier series, and they have the decreasing amplitude with a DC component, the period of which is T (s), matching the repetition frequency f (Hz). Correspondingly, the modulation frequency response of FCIS is obtained the sum of all the responses of FCIS through the First Photodiode against the each frequency component obtained from the Fourier series. When the frequency content of Fourier Series of a periodic pulse train repeated within repetition period T is seen, the first term, which has the highest amplitude, is f (Hz), which is exactly the same as the repetition frequency of the Pulsed Type Laser Source. The successive frequency terms of sinus are lined up to 2f, 3f, 4f, ..., nf, where n is the number of the summed frequency components, with the decreasing amplitude. It should be noted that making the pulse width PW in time domain be narrow increases the frequency contents. Therefore the pulse response characteristics and the modulation frequency response characteristics of the First Photodiode of FCIS, which is used to measure the averaged photocurrent $I_{av}$ proportional to the averaged optical power $P_{av}$, are presented together herein. It is pointed out that. FCIS based-LEMCS and the method described in the invention can operate up to a repetition rate of 1 MHz which is the cutoff limit of the First Photodiode. In order to use FCIS based-LEMCS correctly and properly in measuring the average optical power $P_{av}$, FCIS based-LEMS should be held within the frequency range in which the First Photodiode of FCIS based-LEMCS has a flat frequency response. If the repetition frequency is too high the First. Photodiode to catch, which corresponds to being too faster rising and falling edge times, and too narrower pulse widths and dead times, it is impossible to convert the average optical power of such an infinite pulse train of Pulsed Type Laser Source having a peak power of $P_0$ into the average photocurrent. This is an inherent behavior for the photodiodes as well as the electronic circuit exhibiting low pass filter behavior.

The First Photodiode behaves as a RC low pass filter for the increasing modulation frequencies resulted from the equivalent circuits composed of the total of junction capacitance ($C_j$) and stray capacitance ($C_s$) of the First Photodiode, which acts as in reversed bias condition when light flux falls onto the sensitive surface of the First Photodiode. Correspondingly, diffusion capacity of the First Photodiode, which describes the rearrangement of the minority carriers within the depletion region under the forward bias, is not considered in this equivalent circuit. The equivalent circuit of the First Photodiode in FCIS of FCIS based-LEMCS is shown in FIG. 3. Resultantly, the equivalent capacitance is $C_{eq}=C_j+C_s\cong200$ pF, and at zero bias, $C_j\cong20$ pF at 25° C. The equivalent resistance of the First Photodiode consists of parallel shunt resistance ($R_{sh}$), serial resistance of bulk semiconductor ($R_s$), and parallel input resistance of the following current to voltage amplifier ($R_i$), directly corresponding to the electrometer used in this invention. The equivalent resistance is $1/R_{eq}=(1/R_{sh}+1/(R_s+R_i))$. For the First Photodiode used in the invention, $R_{sh}\cong10$ MΩ, $R_s\cong800$ Ω and $R_i\cong0.72$ Ω, yields an equivalent resistance $R_{eq}\cong800$ Ω, corresponding to a time constant of $R_{eq}C_{eq}\cong16\times10^{-8}$ s (160 ns) for the First Photodiode at 25° C. Due to the fact that any additional reversed bias voltage is not applied to the First Photodiode, the photocurrent $I_{ph}(t)$ doesn't contain dark current and it contains the photocurrent induced by the average power of Pulsed Type Laser Source which has Poisson type noise distribution and Boltzmann Noise current. Even if not applying any reversed bias to the First Photodiode in the invention reduces the higher frequency limit, the noise limit of the First Photodiode of FCIS become better and this approach enables FCIS reaching a threshold level of 1 nA in non-cooling mode, corresponding to 16.5 pJ at 1550 nm level for a Duty Cycle of 0.17 at 1 MHz, −3 dB frequency range, in practice.

In this section the pulse and the modulation frequency responses of FCIS based-LEMCS invented: Modulation frequency response of FCIS caused by the RC low pass filter type equivalent circuit consisting from the resistance and capacitance values of the First Photodiode, other effect restricting the pulse and the modulation frequency responses of FCIS is the time constant (τ) of FCIS, based on the diameter of the integrating sphere, coating average reflectance of the inner coating, and light velocity. The time constant (τ) of FCIS is an effective component on determination of average power $P_{av}$ and resultantly averaged pulse energy by FCIS through the First Photodiode.

By considering the below evaluations concerning with the modulation frequency response of FCIS through the First Photodiode against the rising, the falling edges of the optical light pulses together with pulse width PW, generated by Pulsed Type Laser Source, the pulse response of FCIS should be taken into account, because repetition rate of 1 MHz, corresponding to a period of 1 μs, should have the rise and the fall times relatively very lower than 1 μs. For these edges together with relatively short PW can be regarded as δ-delta impulse function for FCIS with an inner diameter of 15 cm which has the First Photodiode and the investigation is made according to the modulation frequency response pertaining to the repetition frequencies up to 1 MHz. As a result, it is obvious that increasing of the modulation frequency gives rise to shortening the rise and the fall time of the pulses as well as PW. In this case, the pulse energy term in Eq.(7) should contain the pulse response term. Therefore Eq.(7) can be rearranged and considered in two parts as in Eq.(9) and as in Eq.(10). First, the pulse response needing to be investigated for measuring $P_{av}$ in the invention is that of the First Photodiode, behaving as a RC low pass filter against the optical pulses having increasing repetition rates, If the complete pulse response of a RC low pass filter circuit composed of the parallel combination of $R_{eq}$ and $C_{eq}$ is calculated, the rise time and the fall time along with PW at the output photocurrent $I_{av}$ of the First Photodiode also exhibits exponential behavior. In this case, by assuming the laser pulse entering in FCIS, the peak power of $P_0$ can be written as Eq.(9) for single laser pulse, containing the pulse response of FCIS and the pulse response of the First Photodiode, and it should be noted that $I_{ph0}$ should have a rectangular function form.

$$P_0 = \frac{I_{pho}}{R^\lambda_{FCIS}} \zeta^{pd\_1} \zeta^{FCIS} \quad 0 < t < PW \ (W) \tag{9}$$

Where $$\zeta^{FCIS} = \left(1 - e^{-\frac{t_r + PW + t_f}{\tau}}\right)$$

is the pulse response of FCIS against the laser pulse and $\zeta^{pd\_1}$ is the pulse response function of the First Photodiode of FCIS, respectively. A pulse can be divided into three parts. The first part is rising edge $t_r$, the second part is pulse width PW, and the third part is falling edge, $t_f$. However, in the characterization of the pulse response of the First Photodiode, to think an integrated and complete part of the response of the First Photodiode against the rising edge and the pulse width of the pulse is correct, because in these parts of time of the single pulse, the capacitors of the equivalent circuit are the state of charging and keeping stable. The third part of the single pulse directly corresponds to discharging the capacitors and so third part of the pulse should be represented by a different function. The pulse response function $\zeta^{pd\_1}$, which is composed of the summation the responses written for three pulse parts, directly relies on the time of charging of capacitors and discharging capacitors through relevant equivalent resistances. This analysis can easily be made by using a continuous convolution of the single pulse with the equivalent circuit of the First Photodiode.

$$\zeta^{pd\_1} = \begin{cases} \left(1 - e^{-\frac{t}{16 \times 10^{-8}}}\right) rect(t) & t = t_r + PW \quad 0 \le t \le PW \\ \left(e^{-\frac{(t-PW)}{16 \times 10^{-8}}} - 1\right) rect(t - PW) & t = t_f \quad \infty > t > PW \end{cases} \tag{10}$$

Where $\zeta^{pd\_1}$ is the multiplier for $I_{ph0}$, which matches the initial voltage on $C_{eq}$ just before the discharging of the equivalent capacitor $C_{eq}$ was started for ∞>t>PW. The pulse energy $PE_0$ of a single laser pulse including the pulse responses is, $$PE_0 = PW P_0 = PW \frac{I_{pho}}{R^\lambda_{FCIS}} \zeta^{pd\_1} \zeta^{FCIS} \ (W) \tag{11}$$

Where $t_r$, $t_f$, and PW are the rise time, the fall time and the pulse width of the pulse of the laser pulse. For the single pulse PW>>160 ns, and $t_r$<<PW for both pulse response functions;

$$\zeta^{pd\_1} \cong \left(1 - e^{-\frac{PW}{(R_{eq} C_{eq})}}\right) \to 1$$

and PW=4.6 $(R_{eq} C_{eq}) \cong 736$ ns. The pulse width of 736 ns is sufficiently larger than 160 ns for this approximation, producing 0.99 $I_{av}$.

The parameter $$\tau = -\frac{2}{3} \frac{D}{c} \frac{1}{\ln(\rho)}$$

is the time constant of FCIS, ρ is the average reflectance of the inner coating of FCIS, D is diameter of FCIS, and c is the velocity of light in vacuum. The term $$\frac{1}{\ln(\rho)}$$

corresponds to average number of reflections until a photon is to be absorbed [3 and 4]. It is possible to measure of FCIS by measuring the rise times of a very short pulse, which has a pulse width of a few ps, at the entrance port and at the detector port after first reflection. Regarding the time constant τ of FCIS, bearing in mind that quasi-exponential absorption behavior of the inner wall coating of FCIS having highly diffusive reflection is in accordance with the Beer Lambert Law for a photon flux emitted from Pulsed Type Laser Source and assuming that the inner coating of FCIS is nearly uniform and the inner volume of FCIS having a diameter of 15 cm is nearly isotropic, we can say that the pulse response of integrating sphere have an exponential behaviors for rise and fall times of the pulse of the Gaussian Laser Beam due to the time constant (τ) and the dissipation of diffusely reflected irradiance of a single light pulse on the entire inner surface of FCIS reaches to any point within an elapsed time Δt' inside of FCIS [3 and 4]. According to the above assessments, if PW is larger than τ and for CW laser beam instead of pulse $P_{av}$ goes to $P_0$. If PW is smaller than $\tau$, corresponding to ultra short pulse condition, there is no sufficient time for the uniform and diffuse reflection of a single pulse inside FCIS and $P_{av}$ cannot be detected. One of the important points to determine the pulse and the modulation frequency response of the First Photodiode used in the application of measuring the average power of the Pulsed Type Laser Source in the invention is to characterize how many portion of Gaussian Laser Beam entering FCIS is diffusely reflected inside FCIS. For this characterization, the ratio between the diffuse power inside FCIS and the direct power entering in FCIS directly corresponds to $$\eta_{diffuse} = \frac{P_0^{diff}}{P_0},$$

which is the power efficiency between the diffuse power inside FCIS and the direct power entering in the FCIS, $f_{-3dB}^{FCIS}=1/(2\pi\tau)$ is the cutoff frequency of FCIS. The direct spectral responsivity calibration of FCIS based LEMS against Optical Power Transfer Standard, which will be described in the section "Determination of the spectral responsivity $R_{FCIS}^\lambda$ of FCIS based-LEMCS", eliminates $\eta_{diffuse}$ in Eq.(12) because $R_{FCIS}^\lambda$ (A/W) is obtained from the optical flux diffusely reflected inside FCIS and $\eta_{diffuse}$ in $R_{FCIS}^\lambda$ is at the denominator in Eq.(12). The time constant of FCIS in the invention is $\tau \cong 3$ ns, corresponding to $f_{-3dB}^{FCIS} \cong 53$ MHz, for a wall coating having an average value of 0.90. In the pulse response function of FCIS based-LEMCS, the pulse response of FCIS based-LEMCS comprises two parts given in Eq.(12). The first part is related to the geometric characteristics of FCIS of FCIS based-LEMCS together with its inner coating property and the second part is related to the equivalent circuit of the First Photodiode. By comparing Eq.(10) and Eq.(11), Eq.(12) is written as a complete and final equation.

$$PE_0 = PW \frac{I_{pho}}{R_{FCIS}^\lambda}\left(1 - e^{-\frac{PW}{3\times 10^{-9}}}\right)\zeta^{pd\_1} \quad (J) \tag{12}$$

In Eq.(12), it is seen that this type of pulse response function $\zeta^{pd\_1}$ of the First Photodiode causes the distortion of the ideal pulse shape of photocurrent $I_{ph0}$ generated by the single laser pulse, depending on time constant of the equivalent circuit 171 of the First Photodiode, $R_{eq}C_{eq}$. This shape distortion, is especially resulted from the relatively larger time constant of the First Photodiode $R_{eq}C_{eq}$=160 ns, rather than time constant of FCIS $\tau \cong 3$ ns. The distortion occurs also in phase of the photocurrent pulse produced by the laser pulse with respect to the laser pulse. These distortions negatively affect to carry out the time/frequency related measurements by means of the First Photodiode. These distortions are characterized in FIG. 2 as PW' and DT' for the photocurrent $I_{ph}(t)$ which is generated by the First Photodiode against Pulse Width and Dead Time of Pulsed/Chopped Gaussian laser beams of Pulsed Type Laser Source and Chopped Type Laser Source. To defeat the problematic condition resulted from the distortion based on unreliable time/frequency related measurements, a second photodiode having a relatively higher low cutoff frequency is placed and reserved in the invention, which is one of the new implementations presented in the invention. The averaged photocurrent measurements and time/frequency related measurements are carried out separately by different photodiodes, called the First Photodiode and called the second in the invention.

The term of Eq.(12)

$$\zeta^{pd\_1} \cong \left(1 - e^{-\frac{PW}{(16\times 10^{-8})}}\right)$$

for the single pulse PW>>160 ns, and PW>>$t_r$, $t_f$ which is the pulse response of the First Photodiode mounted to FCIS in Eq.(12), is an effective parameter for the relatively short pulse widths at the higher modulation frequencies, PW of which approaches 736 ns or shorter. A pulse width PW of 736 ns forms the upper time limit for the First Photodiode of FCIS in the invention together with sufficient and necessary Dead Time DT for heat dissipation, which is detailed in the section of "DESCRIPTION". In case of using any other photodiode having $R_eC_{eq}$ lower than 160 ns instead of the First Photodiode, to obtain a new PW narrower than 0.736 μs is obvious. At same time, this is also valid for the term of Eq.(12).

$$\zeta^{FCIS} = \left(1 - e^{-\frac{PW}{3\times 10^{-9}}}\right),$$

which is the pulse response of FCIS of FCIS based-LEMCS in Eq.(12). The width of the laser pulses having PW wider than $4.6\tau \cong 14$ ns is sufficient to allow peak power $P_0$ of 0.99 to dissipate (spread) in the inner surface of FCIS. Due to the fact that both of the First Photodiode and the FCIS behave as a low pass filter, provided that the pulse width PW of Pulsed Type Laser Source is sufficiently wide, the peak pulse energy of the infinite laser pulse train is correctly measured. If the pulse width of Pulsed Type Laser Source is very short, relative to pulse response characteristics of FCIS and the First Photodiode, the rise and the fall times of infinite laser pulses of Pulsed Type Laser Source is retarded by low pass filter characteristics of the First Photodiode and the rise and fall times have slower slopes than original states. As a result this retarded rise and fall times causes to carry out measurement of averaged repetition period $T_{av}$ (or averaged repetition frequency $f_{av}$) having low precision which corresponds to high measurement uncertainty in time/frequency related measurements by using the output photocurrent $I_{ph}(t)$ of the First Photodiode. And the pulse width PW and the dead time DT values of infinite laser pulse train of Pulsed Type Laser Source are sensed and converted as PW' and DT' as in FIG. 3. In order to defeat this problematic condition due to limited pulse response of the First Photodiode, in the invention, the time frequency related measurements are carried out by second photodiode. FCIS based-LEMCS is one embodiment and the variation in numerical values doesn't change the philosophy of the invention.

The two of the most related international patents still in progress to the invention described herein are introduced at the following:

The invention described in US2013250997 (A1) deals with the thermopile type laser energy conversion. The thermopile theory of detecting the laser pulse energy relies on the temperature drop between the hot and cold thermocouple junctions across which the heat, caused by laser energy, flows radially, and the temperature drop results in a voltage output proportional to laser energy applied. This voltage output proportional to laser energy is collected with an integrating circuit receiving the electrical output from the thermopile, such that the energy of at least one pulse of the beam can be determined by integrating over time the electrical output arising from the at least one pulse. The response time of such a thermopile sensor is typically no faster than 1 s for reaching 95% of the final reading and the maximum repetition period to be measured with this system was stated as 10 Hz. However, FCIS based-LEMCS doesn't contain any thermopile type temperature sensor. Instead of using a thermopile, FCIS based-LEMCS is mainly composed of newly configured integrating sphere assembled with the photovoltaic type photodiodes, called the First Photodiode and the Second Photodiode and the averaged pulse energy of the Pulsed Type Laser Source e is determine by measuring by the averaged photocurrent proportional to the peak power of the Pulsed Type Laser Source and by measuring time related measurements of the Pulsed Type Laser Source for a repetition frequency extending to 1 MHz, corresponding to a repetition period of 1 µs, which is relatively very higher response time with respect to the system described in US2013250997 (A1). FCIS based-LEMCS described herein is one embodiment, the upper cutoff frequencies of the First Photodiode and the Second Photodiode don't disturb the philosophy of the invention described herein and so the photodiodes, the cutoff frequencies of which are higher than 1 MHz and 6 GHz, really and undoubtedly get better. Additionally, both the First Photodiode and the Second Photodiode specified herein can be exchanged with different types of semiconductor detector depending on the spectral power distribution of the laser to be engaged in the application Another invention described in JPS63100335(A) deals with securely detecting the energy of a laser beam by providing a laser detector for detecting the energy of a laser beam which is reflected and uniformed by a laser beam scattering device, which is a motorized chopper, and an integrating sphere. The detector mounted to the integrating sphere in JPS63100335(A) senses the uniformly scattered and reflected laser beam portion and the invented systems acts as laser energy presence sensor. Any pulse energy measurement procedure of laser is not seen in JPS63100335 (A). However, beyond the detection of presence of laser energy, FCIS based-LEMCS described herein provides both the measurement capability of the averaged pulse energy of the Pulsed Type Laser Source and the calibration of Commercial Laser Energy Meter against FCIS based-LEMCS by using Chopped Type Laser Source, which is a part of FCIS based-LEMCS, and which is traceable to primary level standards.

REFERENCES

[1] Oguz Celikel, Ozcan Bazkir, Mehmet Kucukoglu, and Ferhat Samedov, "Cryogenic radiometer based absolute spectral power responsivity calibration of integrating sphere radiometer to be used in power measurements at optical fiber communication wavelengths", *Optical and Quantum Electronics*.37, 529-543, (2005).

[2] Ferhat Sametoglu "New traceability chains in the photometric and radiometric measurements at the National Metrology Institute of Turkey", *Optics and Lasers in Engineering*45,36-42, (2007).

[3] Volker Jungnickel, Volker Pohl, Stephan Nönnig, and Clemens von Helmolt "Physical Model of the Wireless Infrared Communication Channel" *IEEE Journal on Selected Areas in Communications*, vol. 20, no.3, 631-640, (April 2002).

[4] Labsphere Technical Guide: Integrating Sphere Photometry and Radiometry. http://vww.labsphere.com/uploads/technical-guides/a-guide-to-integrating-sphere-radiometry-and-photometry.pdf

[5] Oguz Celikel "Mode Field Diameter and cut-off wavelength measurements of single mode optical fiber standards used in OTDR calibrations" *Optical and Quantum Electronics*.37, 587 (2005).

[6] David Bergstrom "The Absorption of Laser Light by Rough Metal Surfaces", Doctoral Thesis, Department of Engineering, Physics and Mathematics Mid Sweden University Ustersund, Sweden, February 2008.

SUMMARY

After the completion of the investigation about the pulse responses of FCIS of FCIS based-LEMCS and the First Photodiode mounted to FCIS for a single pulse application in this invention, this section mainly deals with describing the averaged pulse energy including the modulation frequency response function of integrating sphere part of FCIS together with that of the First Photodiode mounted to FCIS so as to reach the exact averaged pulse energy values of Pulsed Type Laser Source and Chopped Type Laser Source, which produces the reference and averaged pulse energy to be used for calibrating Commercial Laser Energy Meter because the invented FCIS based-LEMCS is subjected to infinite laser pulse train, which is composed of an infinite series of single laser pulse in time domain.

In the invention, a-) As a new configuration, FCIS based-LEMCS to be engaged for measuring the averaged pulse energy $PE_{av}$ of a Pulsed Type Laser Source having Pulsed Gaussian Laser Beams as infinite pulse train in time domain is described.

b-) A new apparatus, called FCIS based-LEMCS and the calibration method belonging to the new apparatus along with a newly configured FCIS based-LEMCS equipped with a series of choppers, which is one embodiment, which contains a Chopped Type Laser Source obtained from CW Laser Sources, and which enable us adjusting the Duty Cycles changing from 0.17 to 0.84 at the repetition frequencies varying from 5 Hz to 2 KHz, is described to make the traceable calibrations of Commercial Laser Energy Meters, which operates on the spectral range of 900 nm-1650 nm over the averaged pulse energy range of 16.5 pJ to 100 mJ, to primary level standards. With the choice to use an electronic amplitude modulator instead of a group of choppers in the invention, constructed as one embodiment, upper frequency level of 2 kHz, which is available by means of DC motor having a rare earth doped magnet, can be expandable to 1 MHz region, which is the cutoff frequency of the First Photodiode.

In FCIS of FCIS based-LEMCS, two photodiodes are used, labeled as the First Photodiode and the Second Photodiode. The former is engaged in the measurement of average photocurrent $I_{av}$, resulted from the average power of the Pulsed Type Laser Source and the latter is used in repetition period $T_{av}$ (and/or $f_{av}$) measurements of the Pulsed Type Laser Source. For FCIS based-LEMCS, it is seen and proved that the repetition frequency range for an electronic type modulator instead of DC motor driven choppers, which is to be used to construct Chopped Type Laser Source in the traceable calibration of Commercial Laser Energy Meters in the invention, can be extend up to 1 MHz, which is the cutoff frequency limit of the First Photodiode. For the frequencies beyond 1 MHz, the pulse response and modulation response functions mentioned in the section of "BACKGROUND" should be taken into account.

As seen in the time constants of FCIS and the First Photodiode mounted to FCIS, the modulation frequency range of integrating sphere of FCIS is wider than that of the First Photodiode and so bearing in mind that for the Pulsed Type Laser Source, $T_{av}(=1/f_{av})$ is equal to the averaged values of $(PW+DT+t_r+t_f)$, it is enough to write the average photocurrent $I_{av}$ as a function of the modulation frequency of the Pulsed Type Laser Source so as to define the modulation frequency dependency of the resultant averaged pulse energy value $PE_{av}$ in unit of J, caused by the dependency of the First Photodiode only. The cutoff frequency of FCIS is $f_{-3dB}^{FCIS}=1/(2\pi\tau)\cong 53$ MHz. In this case, the modulation frequency response function of FCIS is assumed as 1 for the frequency band of 0-1 MHz in which the First Photodiode operates. By considering the Fourier Series expansion of an infinite and periodic pulse train, the averaged repetition frequency of which is $f_{av}=1$ MHz, the highest amplitude of the first odd frequency component of Fourier series expansion belonging to the infinite and periodic pulse train is at $f=1$ MHz. The following frequencies together with a DC component are 2 MHz, 3 MHz, . . . , n f, with the decreasing amplitude. In this case, the other following frequency contents higher than 1 MHz constituting the infinite and periodic pulse train are attenuated with a relatively higher slope (20 dB/decade) by the First Photodiode behaving as a RC low pass filter. The cutoff frequency of which is ~1 MHz $(f_{-3dB}^{pd\_1}=1/(2\pi R_{eq}C_{eq})=995222$ Hz). With this brief evaluation, instead of summing all of the frequency responses of the First Photodiode against the infinite and periodic pulse train, the first Fourier term, which has sinusoidal behavior, is considered and the modulation frequency response function of the First Photodiode is calculated according to sinus function, the linear frequency of which corresponds to the averaged repetition frequency $f_{av}$ (Hz), the first odd frequency component of Fourier series expansion of infinite and periodic pulse train. This approach gives very good explanation for the modulation frequency dependence of FCIS. As a result, the final form of $PE_{av}$ in Eq. (13) is calculated by multiplying $I_{ph}(t)$ in Eq.(12) with the modulation frequency transfer function $\xi^{pd\_1}(f_{av})$ of the equivalent circuit of the First Photodiode, behaving as a RC low pass filter in FIG. 3, for the sufficiently wide pulse widths. For the infinite laser pulse train generated by Pulsed Type Laser Source, the averaged pulse energy is given in Eq.(13);

$$PE_{av}(f_{av}) = \frac{T_{av}I_{av}(f_{av})}{NR_{FCIS}^{\lambda}} = \frac{I_{av}(f_{av})}{f_{av}NR_{FCIS}^{\lambda}} \quad (J) \quad (13)$$

Eq.(14) characterizes Eq.(13) as a function of the repetition frequency $f_{av}$ (Hz), corresponding to the modulation frequency response functions of FCIS based-LEMCS and the First Photodiode, instead of the pulse response functions terms in Eq.(9) and Eq.(10).

$$I_{av}(f_{av}) = \langle I_{ph}(t)\rangle \xi^{pd\_1}(f_{av})\xi^{FCIS}(f_{av}) \cong \quad (14)$$

$$I_{av}\frac{\eta_{diffuse}}{\left(1+\left(\frac{f_{av}}{f_{-3dB}^{pd\_1}}\right)^2\right)^{1/2}} \quad (A) \; 0 < f_{av} \le 1 \text{ MHz}$$

$$\xi^{FCIS}(f_{av}) = \frac{\eta_{diffuse}}{\left(1+\left(\frac{f_{av}}{f_{-3dB}^{FCIS}}\right)^2\right)^{1/2}} \xi^{pd\_1}(f_{av}) = \frac{1}{\left(1+\left(\frac{f_{av}}{f_{-3dB}^{pd\_1}}\right)^2\right)^{1/2}} \quad (-) \quad (15)$$

Where the phase terms of Eq.(15), based on frequency terms, is discarded. The term $$\frac{f_{av}}{f_{-3dB}^{FCIS}},$$

caused by time constant of FCIS $\tau$ (s) Eq.(10), can be neglected and dropped for the repetition frequencies up to the upper frequency limit of 1 MHz of the First Photodiode valid in this invention. $f_{-3dB}^{H}$ is the high frequency cutoff limit of the First Photodiode, behaving as a RC low pass filter in FIG. 3, which can be calculated from $(R_{eq}.C_{eq})$ as ~1 MHz $(f_{-3dB}^{pd\_1}1/(2\pi R_{eq}C_{eq})=995222$ Hz) theoretically. The frequency range from 0 Hz up to 1 MHz, which is also obtained by the theoretical calculations, is verified by the measurements carried out by FCIS assembled with the electrometer. The role of the modulation response function of the First Photodiode $\xi^{pd\_1}(f_{av})$ is presented in Eq.(14). The resultant averaged peak pulse energy $PE_{av}$ of a Pulsed Type Laser Source as a function of the averaged repetition frequency $(f_{av}=1/T_{av})$ is given in Eq.(16), by considering the first odd term of Fourier Expansion series of the pulse train having a varying PW. Eq.(16) is a well suited model function for FCIS of FCIS based-LEMCS in the invention, characterizing both of the modulation frequency response and the pulse response of the FCIS system. Considering the $f_{-3dB}^{FCIS}\cong 53$ MHz, the modulation frequency response function of the whole of FCIS composed of an integrating sphere and the First Photodiode consists of $\xi^{pd\_1}(f_{av})$ only for the repetition frequency range extending from 0 to 1 MHz, by multiplying $\xi^{pd\_1}(f_{av})$ with $\xi^{FCIS}(f_{av})\cong\eta_{diffuse}$. However, the robustness of the method presented in the invention give us an advantage to eliminate $\xi^{FCIS}(f_{av})\cong\eta_{diffuse}$. Averaged pulse energy of the Pulsed Type Laser Source is as follows by considering the modulation frequency response function of FCIS based-LEMCS, which is final equation by which the averaged pulse energy is calculated in the invention.

$$PE_{av}(f_{av}) = \quad (16)$$

$$\frac{T_{av}I_{av}}{NR_{FCIS}^{\lambda}}\frac{1}{\left(1+\left(\frac{f_{av}}{f_{-3dB}^{pd\_1}}\right)^2\right)^{1/2}} = \frac{I_{av}}{f_{av}NR_{FCIS}^{\lambda}}\frac{1}{\left(1+\left(\frac{f_{av}}{f_{-3dB}^{pd\_1}}\right)^2\right)^{1/2}} \quad (J)$$

Where due to that fact that $f_{-3dB}^{FCIS}\cong 53$ MHz is very high relative to the operation frequency range of FCIS based-LEMCS which is up to 1 MHz in measuring the averaged pulse energy of Pulsed Type Laser Source and is 2 kHz in calibration of Commercial Laser Energy Meter against FCIS based-LEMCS invented, the term $$\frac{f_{av}}{f_{-3dB}^{FCIS}}$$

is not included in Eq.(16). This is also valid for the range of the repetition frequency of 1 MHz.

$$R^\lambda_{FCIS} = \frac{I^{resp}(A)}{P^{cw\_resp}(W)},$$

which is determined from the calibration of FCIS against Optical Power Transfer Standard. The direct spectral responsivity calibration of FCIS based LEMS against Optical Power Transfer Standard, which will be described in the section "*Determination of the spectral responsivity $R_{FCIS}^\lambda$ of FCIS based-LEMCS*", eliminates $\eta_{diffuse}$ in Eq.(16) because $R_{FCIS}^\lambda$ (A/W) is obtained from the optical flux diffusely reflected inside FCIS and $\eta_{diffuse}$ in $R_{FCIS}^\lambda$ is at the denominator in Eq.(16).

If the background current $I_{bc}$, which fluctuates around zero line, takes place in the First Photodiode, this background current $I_{bc}$ is subtracted from $I_{av}$ to obtain correct averaged photocurrent caused by Gaussian laser pulses produced by Pulsed Type Laser Source. Duty Cycle=$f_{av} \cdot PW_{av}$=(N.$PW_{av}$)/$T_{av}$ N is 1 for infinite pulse traingenerated by Pulsed Type Laser Source in this invention. Due to the fact that $PE_{av}$ ($f_{av}$) and the averaged repetition period $T_{av}$ (s) are measured within a time interval determined by the average times of Electrometer and Time Interval Counter adjusted by operator during the pulse energy measurements, these are directly averaged values.

NOTE: The time/frequency related parameters, which are f (Hz), T(s), PW (s), DT (s) and stated in the text ore not time averaged values. However, $f_{av}$(Hz), $T_{av}$(s), $PW_{av}$(s), and $DT_{av}$ (s) parameters are the time averaged values obtained from the measurements of the time/frequency related parameters, which are f (Hz), T(s), PW (s), DT (s), by means of Time Interval Counter of FCIS based-LEMCS within a time interval adjusted by operator.

Time/frequency related measurements and ($T_{av}$ and $f_{av}$) in Eq.(16), which are traceable to $^{133}$Cs (or $^{87}$Rb) frequency standard through a commercial Time Interval Counter, are directly performed by fully eliminating the effect of relatively lower cutoff frequency of the First Photodiode and the effects of the time constant of FCIS on dissipation rate of the irradiation of P(t) diffusely reflected after collision of a Pulsed Gaussian Laser Beams of Pulsed Type Laser Source on the diffusive inner surface of FCIS with a novel placement of a fast response photodiode in the conventional integrating sphere, called as the Second Photodiode. This elimination is achieved with help of an internal steel hemisphere placed inside FCIS assembled with the first MM optical fiber patch cord having a Zr ferrule, the core diameter of which is 62.5 µm, and this is applicable for the integrating spheres to be used for higher peak laser energy the inner diameter of which is larger than 15 cm. The entrance port of FCIS and the center position of internal steel hemisphere are coincided on the same optical axis and the optical pulses strike on Zr ferrule settled on the center of the internal steel hemisphere first. The time/frequency related measurements are directly carried out for the pulse strikes of Pulsed Type Laser Source and the pulse strikes of Chopped Type Laser Sources by the combination of the Second Photodiode, Fast Current to Voltage Converter, and Time Interval Counter. With this configuration, all of the time measurements are performed as free of the time constant (τ=3 ns) of integrating sphere of FCIS and free of time constant of $R_{eq}C_{eq} \cong 16 \times 10^{-8}$ s (160 ns) of the First Photodiode used to measure average power $I_{av}$. The measurements of $I_{av}$ in Eq.(16) are carried out by an electrometer, the traceability of which comes from primary resistance standard, Quantum Hall System, and comes from primary direct voltage standard, DC Josephson System. The traceability of optical power scale of FCIS, which corresponds to the spectral responsivity of FCIS, $R_{FCIS}^\lambda$, in Eq.(16) through the First Photodiode is provided by an Optical Power Transfer Standard, InGaAs based spectralon sphere radiometer, as one embodiment in the invention.

BRIEF DESCRIPTION OF DRAWINGS

Figure 9A:
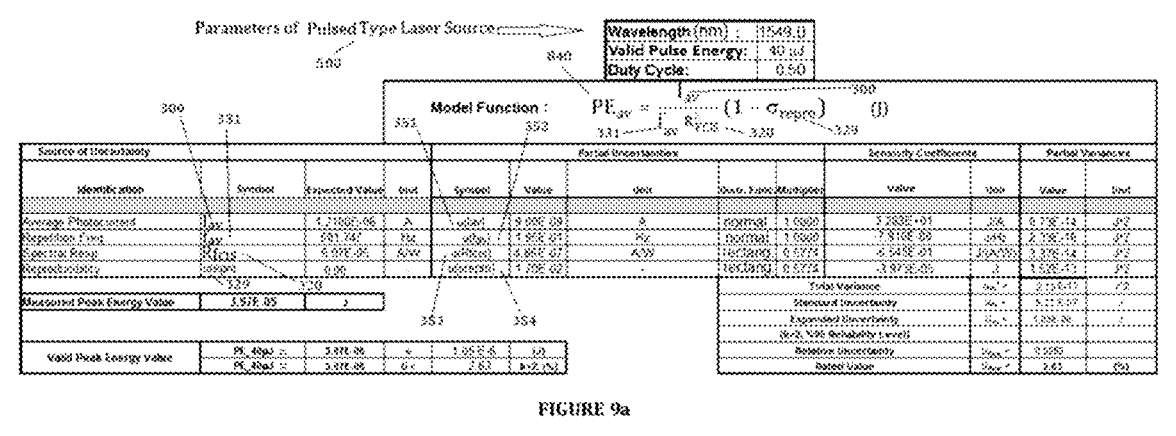

FIG. 9a. The uncertainty budget belonging to FCIS based-LEMCS for an averaged pulse energy $PE_{av}$ of 40 µJ as a rated value.

DESCRIPTION

The details of FCIS based-LEMCS111, vvrhich is constructed as one embodiment, which is used to measure the averaged pulse energy of a Pulsed Type Laser Source500 and to calibrate a Commercial Laser Energy Meter999 with the reference and averaged pulse energy generated by Chopped Type Laser Source600 in the structure of FCIS based-LEMCS111, which is traceable to primary level standards, are presented herein.

Figure 1:
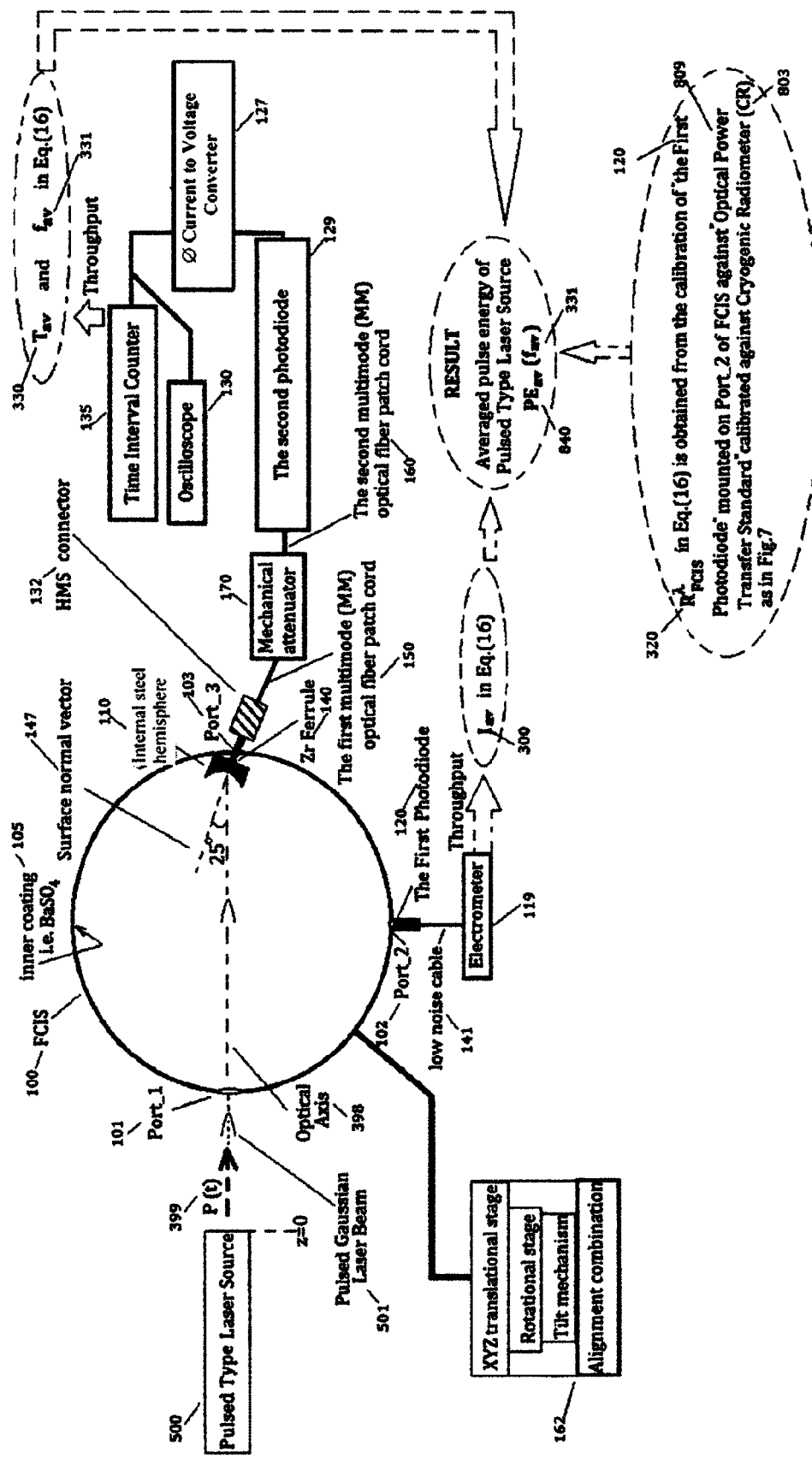
FIG. 1. The invented Fiber Coupled Integrating Sphere Based-Laser Energy Meter and Calibration System (FCIS based-LEMCS) without Chopped Type Laser Source in the measurement of the averaged peak pulse energy of a Pulsed Type Laser Source.
Figure 2:
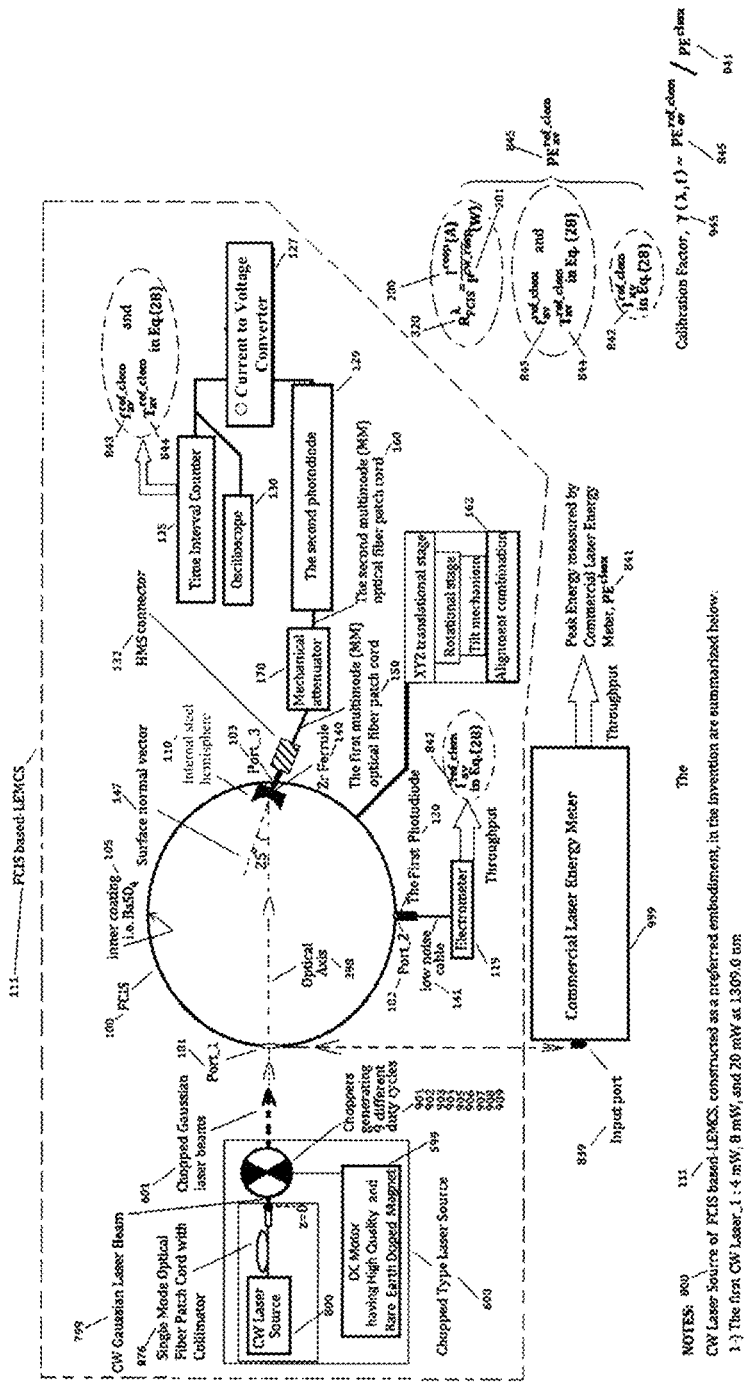
FIG. 2. The setup for calibration of Commercial Laser Energy Meter against FCIS of FCIS based-LEMCS by FCIS based-LEMCS. This drawing shows the whole of FCIS based-LEMCS with the dashed lines.

FCIS based-LEMCS111 which is the subject of the invention is completely shown in FIG. 2. The structural body of FCIS based-LEMCS111 consists of the configuration of FCIS100 detailed in FIG. 4, internal steel hemisphere assembled with Zr ferrule140 of HMS connector132 of a First MM Optical Fiber Patch Cord150 detailed in FIG. 5, nine separate choppers901-909 detailed in FIG. 6a and FIG. 6b, which are mountable to DC Motor599, an Electrometer119, a Time Interval Counter135, an Oscilloscope130, a Mechanical Attenuator170, an Alignment Combination162 and a second MM optical fiber path cord160 shown in FIG. 1 and FIG. 2 Even though the Electrometer119, the Time Interval Counter135, the Oscilloscope130, the Mechanical Attenuator170, the Alignment Combination162, the first MM optical fiber path cord150 and the second MM optical fiber path cord160, which are general purpose measurement instruments and apparatus, are excluded from the invention individually, they are included in the invention for both the measurement procedure of the averaged pulse energies $PE_{av}$840 of Pulsed Type Laser Source500, and the calibration of Commercial Laser Energy Meters999 to be performed by using the reference and averaged pulse energies $PE_{av}^{ref\_clem}$845 of Chopped Type Laser Source600 of FCIS based-LEMCS111, all of which are traceable to primary level standards demonstrated in FIG. 7.

Figure 4:
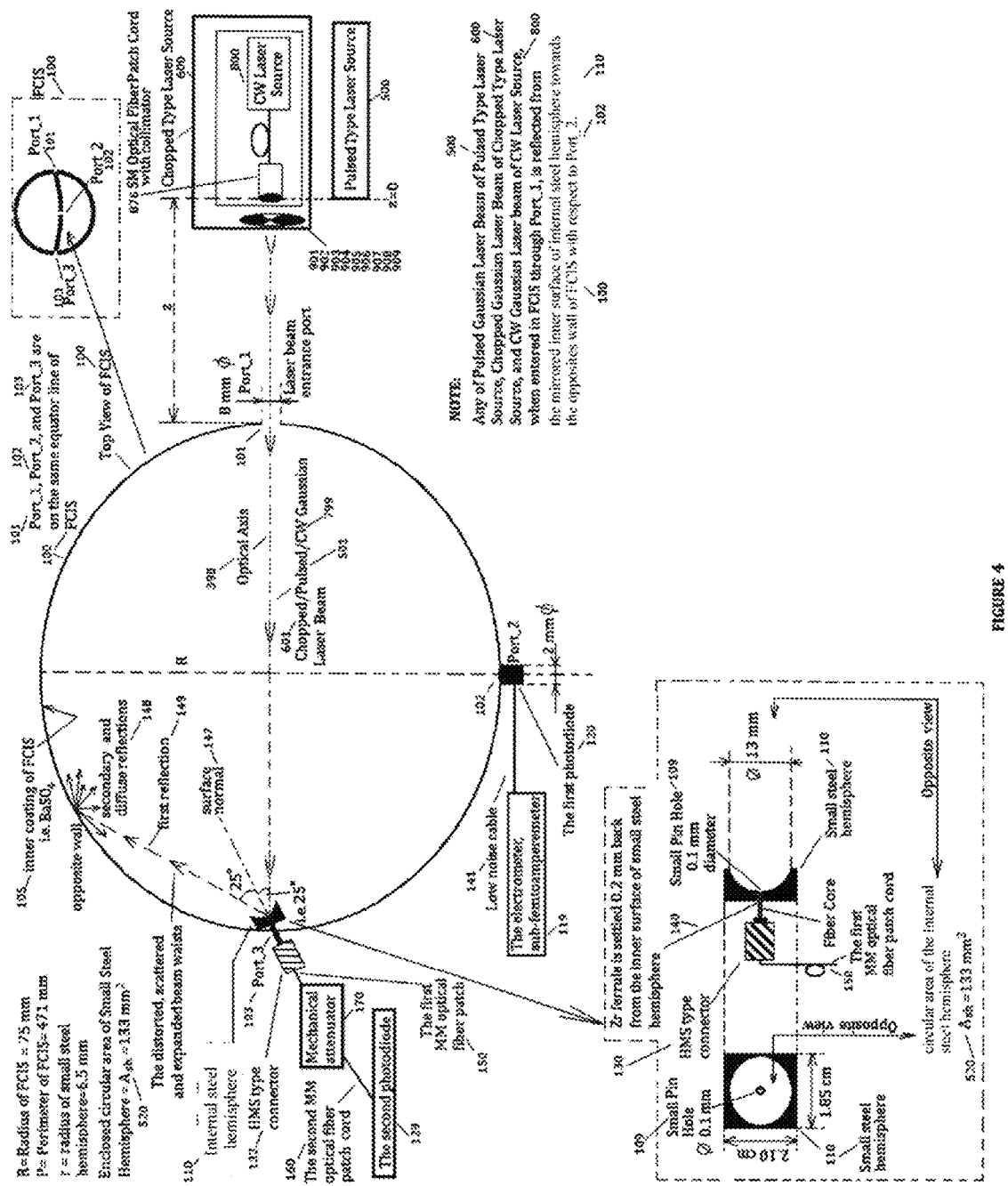
FIG. 4. The details and the components of FCIS of FCIS based-LEMCS and reflection properties together with the placements of Pulsed Type Laser Source and Chopped Type Laser Source.

In addition to traceable measurements of the averaged pulse energy $PE_{av}$840 of Pulsed Type Laser Source500 by FCIS based-LEMCS111, the traceable calibration of Commercial Laser Energy Meters999, which measure the averaged pulse energy, are carried out by the reference and averaged pulse energies $PE_{av}^{ref\_clem}$845 generated by means of Chopped Type Laser Source600, which is a part of FCIS based-LEMCS111. The method of traceable calibration of Commercial Laser Energy Meters999 via FCIS based-LEMCS111 is included in the invention. The invention is summarized at the following three items;

1-) The averaged pulse energy measurement section of FCIS based-LEMCS111 designed for measuring the averaged pulse energy $PE_{av}$840 of Pulsed Type Laser Source500 shown in FIG. 1, consists of an Al-integrating sphere having a diameter of 150 mm, called as FCIS100 in the invention, an internal steel hemisphere110 assembled with Zr ferrule140 of HMS connector132 of a First MM Optical Fiber Patch Cord150, which is mounted inside FCIS100, the details of which are given in FIG. 4, the Electrometer119 able to measure the photocurrent $I_{av}$300 generated by the First Photodiode120 mounted on Port_2102 of FCIS100 of FCIS based-LEMCS111, the Second Photodiode129 mounted on Port_3103 of FCIS100 of FCIS based-LEMCS111 through the First MM Optical Fiber Patch Cord150 having Zr ferrule140, which is to be used in time and frequency measurements together with Time Interval Counter135 and the Oscilloscope130 in FIG. 1.

Figure 6A:
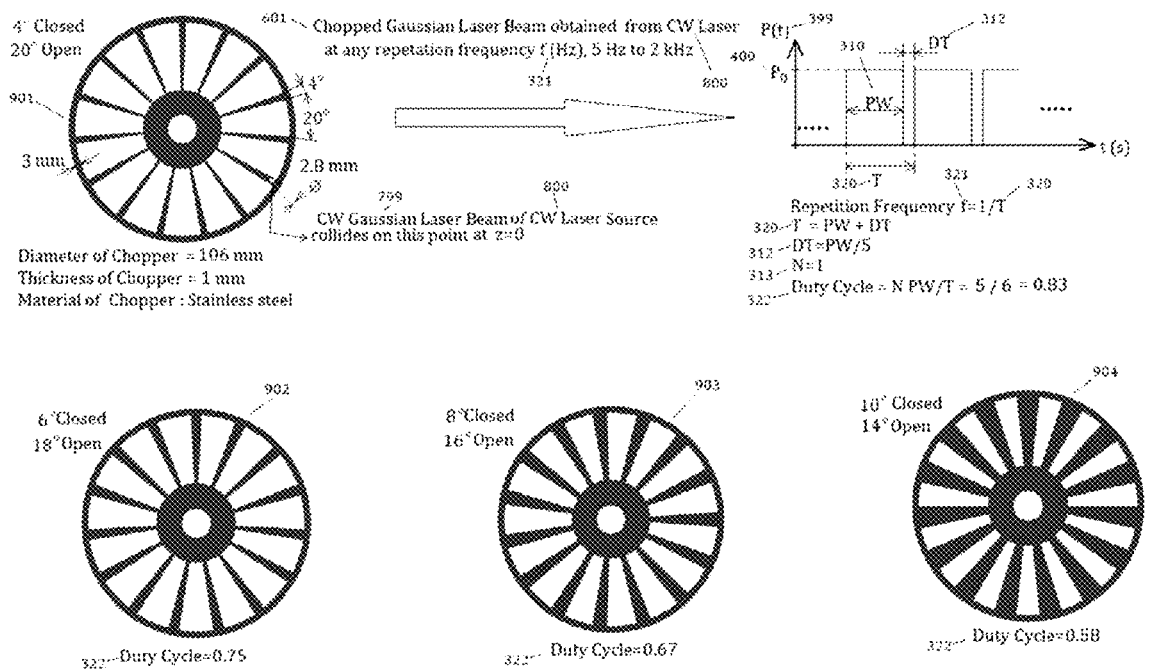
FIG. 6a. Choppers mounted on the DC motor, which has a rare earth doped magnet, 0.83, 0.75, 0.67, and 0.58 at constant repetition frequency of $f_{av}^{ref\_clem}$. These choppers in the invention are used to construct Chopped Type Laser Source from CW Laser Source(s), which is to be engaged as a reference and averaged pulse energy in traceable calibration of Commercial Laser Energy Meter.
Figure 6B:
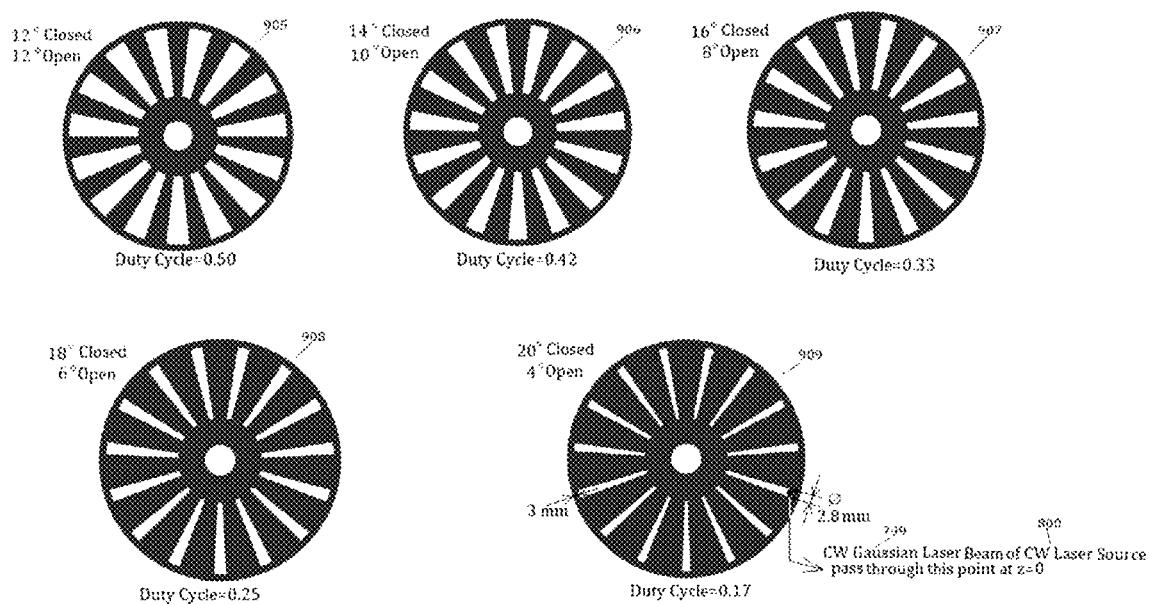
FIG. 6b. Choppers mounted on the DC Motor, which has a rare earth doped magnet, to generate Duty Cycles of 0.50, 0.42, 0.33, 0.25 and 0.17 at constant repetition frequency of $f_{av}^{ref\_clem}$. These choppers in the invention are used to construct Chopped Type Laser Source from CW Laser Source(s), which is to be engaged as a reference and averaged pulse energy in traceable calibration of Commercial Laser Energy Meter.

2-) The composition of FCIS based-LEMCS111, which is a series of separate choppers901-909 to construct a Chopped Type Laser Source600 generating the reference and averaged pulse energy $PE_{av}^{ref\_clem}$845 for the calibration of Commercial Laser Energy Meter999 together with all of the equipments, all of the parts, all of the configurations stated in item "1-)" just above. The whole of FCIS based-LEMCS is shown in FIG. 2. The combination of a DC motor599 with a series of separate choppers of FCIS based-LEMCS111, each of which has individual Duty Cycle shown in FIG. 6a and FIG. 6b, is used in establish Chopped Type Laser Source600 generating an infinite pulse train from CW Laser Sources800 in FIG. 2 and FIG. 3 in order to calibrate Commercial Laser Energy Meters against FCIS based-LEMCS111, traceable to primary level standards. In brief, Chopped Type Laser Source600 of FCIS based-LEMCS111 generates the reference and averaged pulse energy $PE_{av}^{ref\_clem}$845 to calibrate Commercial Laser Energy Meters 999.

3-)The measurement method of the averaged pulse energy $PE_{av}$840 of the Pulsed. Type Laser Source500 with FCIS based-LEMCS111, and the calibration method of a Commercial Laser Energy Meter999 against Chopped Type Laser Source600 of FCIS based-LEMCS111, both of which are traceable to primary level standards.

Due to the fact that the FCIS based-LEMCS111 is one embodiment the variation in the properties and the number of the choppers generating different Duty Cycles doesn't disturb the philosophy of the invention. Additionally, FCIS based-LEMCS111 described herein is one embodiment, the upper cutoff frequencies of the First Photodiode120 and the Second Photodiode129 don't disturb the philosophy of the invention described herein and so the photodiodes, the cutoff frequencies of which are higher than 1 MHz and 6 GHz, really and undoubtedly get better. Additionally, both the First Photodiode and the Second Photodiode specified herein can be exchanged with different types of semiconductor detector depending on the spectral power distribution of the laser to be engaged in the application.

1. Details of FCIS

The FCIS100 of FCIS based-LEMCS111 has three ports: These are Laser Entrance Port101 (Port_1), Average Optical Power Measurement Port102 (Port_2), and Time/Frequency Related Measurement Port103 (Port_3). These ports dwell on the same equator line of the FCN shown as in FIG. 4.

Port_1;

The diameter of Port_1101 is 8 mm. The diameter of 8 mm of Port_1 enables Pulsed Gaussian Laser Beam501 of Pulsed Type Laser Source500, Chopped Gaussian Laser Beam601 of Chopped Type Laser Source600, and CW Laser Source800, sequentially shown in FIG. 1, FIG. 2, and FIG. 8, to enter in FCIS100 of FCIS based-LEMCS111 without any contact by considering the beam waits and total beam diameters in the measurement of the averaged pulse energy $PE_{av}$840 of Pulsed Type Laser Source500 of FIG. 1, in the measurement of the reference and averaged pulse energy $PE_{av}^{ref\_clem}$845 of Chopped Type Laser Source600 of FIG. 2 and in the determination of spectral responsivity $R_{FCIS}^{\lambda}$320 of FCIS100 of FCIS based-LEMCS111 with the CW Gaussian Laser Beam799 of CW Laser Source800 of FIG. 8. The distance and beam divergence correlations among the point z=0 and Port_1101 and the center of the internal steel hemisphere110 in FIG. 1, FIG. 2, and FIG. 8 should provide the contactless passing of the Pulsed Gaussian Laser Beam501, Chopped Gaussian Laser Beam601, and CW Gaussian Laser Beam799.

The following calculations related to beam waist and beam divergences to be carried out for CW Gaussian Laser Beam799 of CW Laser Source800, which are used to construct Chopped Type Laser Source600 of FCIS based-LEMCS111 in FIG. 2 by means of a series of choppers901-909 shown in FIG. 6a, and FIG. 6b, which generates the reference and averaged pulse energy $PE_{av}^{ref\_clem}$845 to be used in the calibration of Commercial Laser Energy Meter999 against FCIS based-LEMCS111 are also taken into account for the measurement of the averaged pulse energy $PE_{av}$840 of Pulsed Type Laser Source500.

Figure 8:
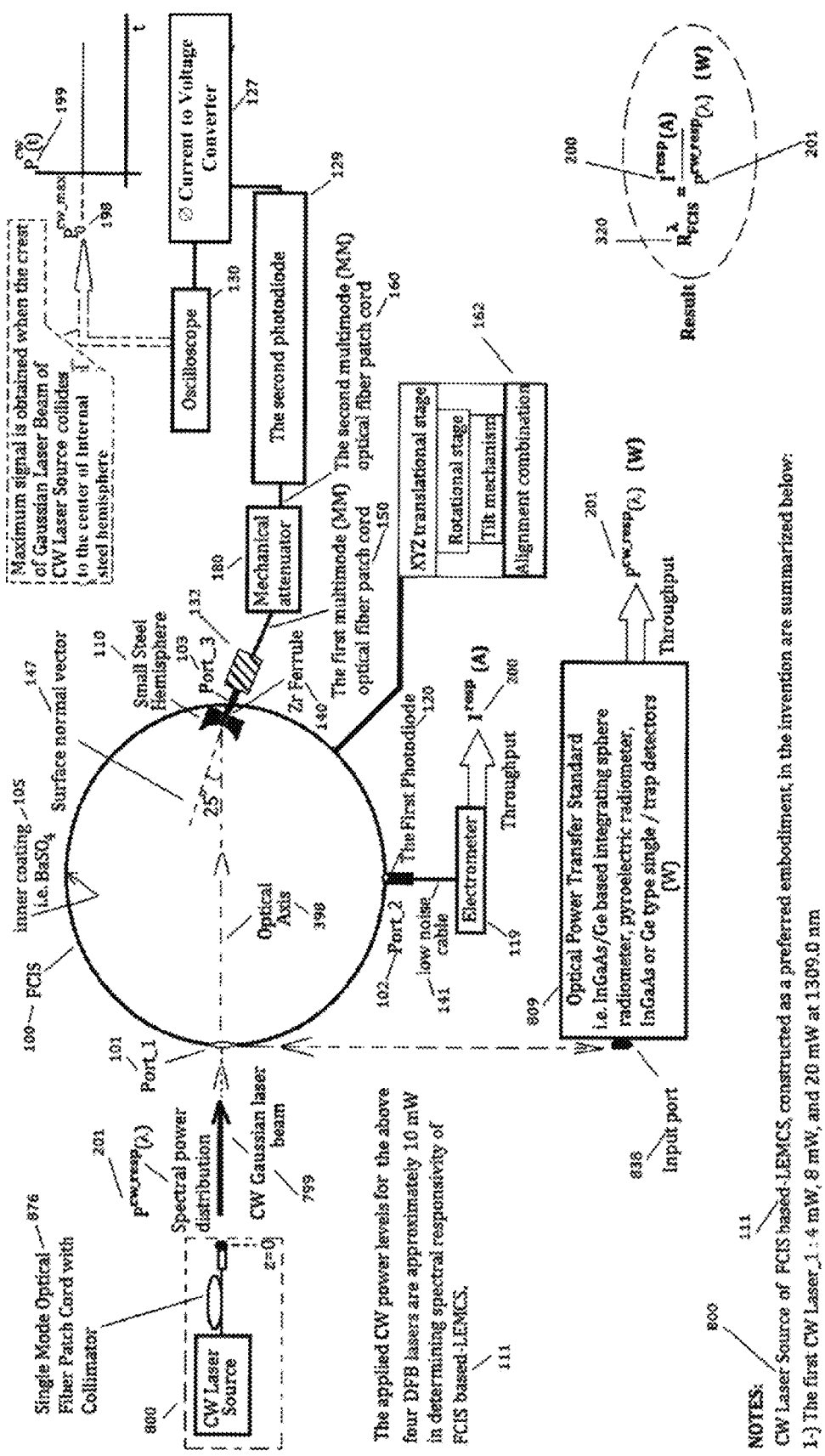
FIG. 8. The setup for the determination of spectral responsivity $R_{FCIS}^\lambda$ (A/W) of FCIS of FCIS based-LEMCS traceable to Cryogenic Radiometer, primary level optical power standard (W).

The four distributed feedback (DFB) laser diodes, each of which is called as CW Laser Source800 in FCIS based-LEMCS111 constructed as one embodiment in the invention, each of which individually radiates at 980.0 nm, 1064.0 nm, 1309.0 nm, and 1549.0 nm, and all the four of which have individual Single Mode (SM) Optical Fiber Patch Cords876 assembled with the individual collimators, are used in the determination the spectral responsivity $R_{FCIS}^{\lambda}$320 of FCIS100 of FCIS based-LEMCS111 in FIG. 8 and in the traceable calibration of Commercial Laser Energy Meters999 in FIG. 2 obtained by means of the nine different choppers 901-909 shown in FIG. 6a and FIG. 6b.

Single mode propagation inside the optical fiber patch cords of the four laser diodes means the field distribution of quasi transverse electric mode ($LP_{01}$) $HE_{11}$, no higher order modes. The width (beam waist: w(z), $1/e^2$ (13.53%) points of the irradiance level) change of the irradiance distribution at the output of the single mode optical fiber, corresponding to Gaussian beam profile, is the function of the numerical aperture of the relevant single mode optical fiber of the patch cord [5] and these beam waists of the irradiance distributions diverge, depending on the distance z from the end of fiber, the wavelength and the spectral band width which is relatively narrow for DFB lasers. Beam divergence of a Gaussian beam is described as θ=Arctan (w(z)/z) in (rad) or (deg), where w(z) is the beam waist at any distance z (mm) on the propagation way of the laser beam emerging from the output of the Single Mode (SM) Optical Fiber Patch Cord with Collimator876 of each CW Laser Sources800. The total beam divergence is equal to 2θ.

w(z=0)=2.0 mm, beam divergence 1.20 mrad at 980.0 nm, w(z=0)=2.4 mm, beam divergence 1.50 mrad at 1064.0 nm, w(z=0)=2.7 mm, beam divergence 1.50 mrad at 1309.0 nm, w(z=0)=2.8 mm, beam divergence 1.52 mrad at 1549.0 nm.

For a distance of 300 mm between the output of the Single Mode (SM) Optical Fiber Patch Cord with Collimator876 and the center of the internal steel hemisphere110, the beam divergence calculations are performed. The distance of 300 mm means a distance extending from z=0 to the center of internal steel hemisphere110 where a Pin Hole109 with a diameter of 0.1 mm is drilled and Zr ferrule140 of HMS Connector132 of the First MM Optical Fiber Patch Cord150 is located in the center position of the internal steel hemisphere110 and 0.2 mm back from the center surface of internal steel hemisphere110 at rest position shown in FIG. 4 and FIG. 5. In this case the total beam waists with the relevant divergences for the distance of 300 mm at the center of internal steel hemisphere110 are calculated as follows:

The total beam divergence 2θ=0.72 mm and the total beam waist is 2.72 mm for 980.0 nm CW Laser Source800, The total beam divergence 2θ=0.90 mm and the total beam waist is 3.30 mm for 1064.0 nm CW Laser Source800, The total beam divergence 2θ=0.90 mm and the total beam waist is 3.60 mm for 1309.0 mm CW Laser Source800, The total beam divergence 2θ=0.92 mm and the total beam waist is 3.72 mm for 1549.0 rim CW Laser Source800.
Port_2;

Port_2102 is an aperture, the diameter of which is 2 mm, as shown in FIG. 4. The First Photodiode120 is located in Port_2102. The average photocurrent measurements $I_{av}$300, and $I_{av}^{ref\_clem}$842, which are related to the average optical power $P_{av}$301 of either Pulse Type Laser Source500 or Chopped Type Laser Source600 as in FIG. 3 respectively, are carried out by means of the First Photodiode120 connected to the Electrometer119 able to measure the levels of sub-femto amperes in high accuracy mode. In addition to the averaged photocurrents labeled as $I_{av}$300, and $I_{av}^{ref\_clem}$842, the First Photodiode120 of FCIS100 of FCIS based-LEMCS111 generates the photocurrent $I^{resp}$200 during the traceable spectral responsivity calibration $R_{FCIS}^{\lambda}$320 of FCIS100 of FCIS based-LEMCS111, shown in FIG. 8. This photocurrent $I^{resp}$200 of the First Photodiode is used for deriving the spectral responsivity $R_{FCIS}^{\lambda}$320 of FCIS100 by dividing $I^{resp}$200 with $P^{cw\_resp}(\lambda)$201, which is obtained from Optical Power Transfer Standard809 directly.

Figure 3:
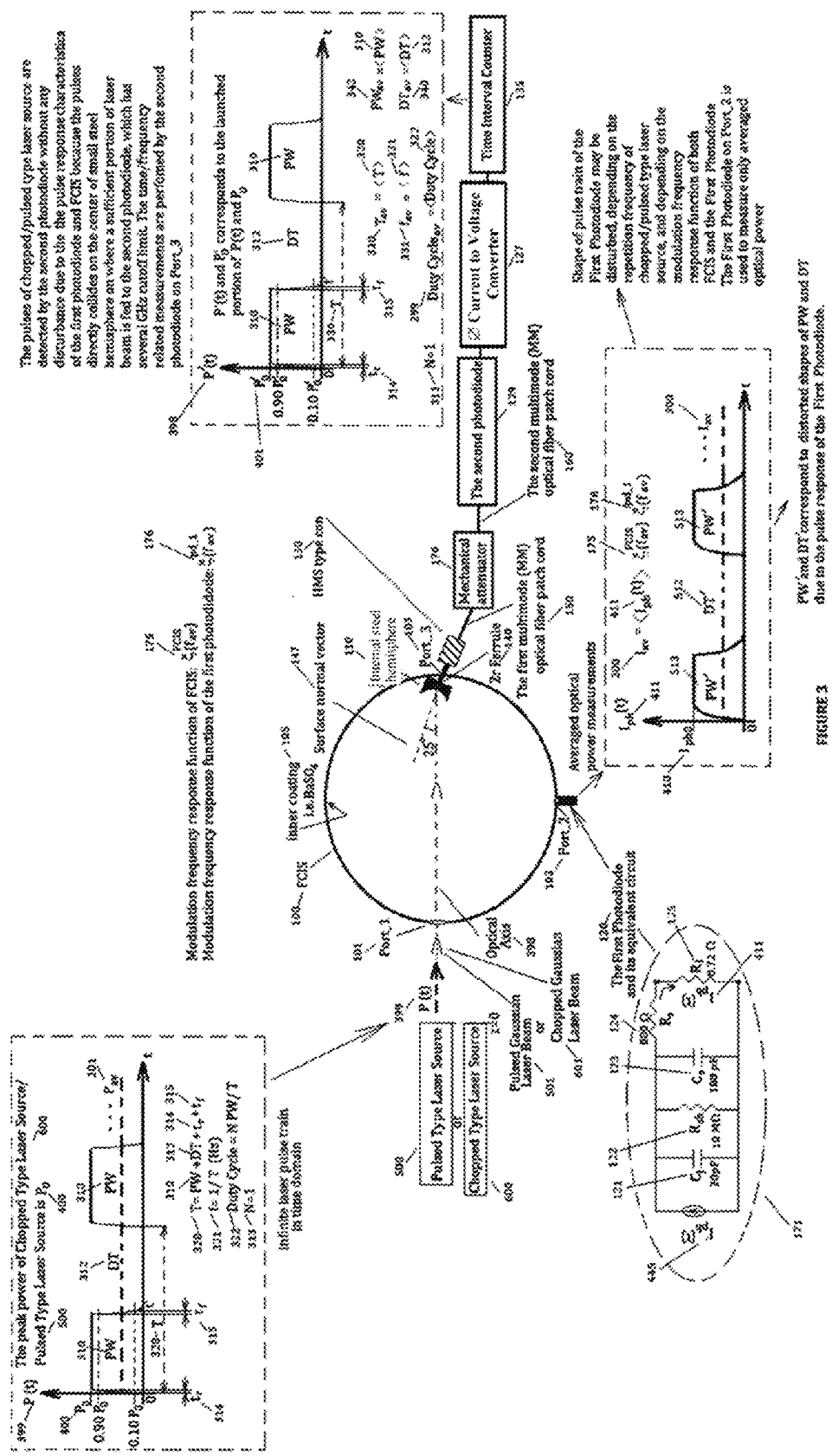
FIG. 3. Pulse characteristics of Pulsed Type Laser Source/Chopped Type Laser Source the average pulse energy of which is to be measured by FCIS based-LEMCS in the invention and the photocurrent proportional to the average optical power $P_{av}$, generated by the First Photodiode.

The First Photodiode120 mounted to Port_2102 generates the photocurrents proportional to the irradiance levels of Pulsed Gaussian Laser Beams, Chopped Gaussian Laser Beams, and CW Gaussian Laser Beams entering from Port_1 without saturation up to an average optical power of ~158 W by considering its saturation level of 7 mW. The photocurrent produced by the First Photodiode120 is converted into voltage and averaged by the Electrometer119. The First Photodiode120 at Port_2102 can operate up to a repetition rate of 1 MHz, which is the cutoff limit of the First Photodiode120.The details about the pulse and the modulation frequency response characteristics of the First Photodiode120 are introduced in the Sections "Background" and "Summary". In the invented FCIS based-LEMCS, the First Photodiode120 located in Port_2102 is used for only measuring the average photocurrent $I_{av}$300, and $I_{av}^{ref\_clem}$842 resulted from the average optical powers $P_{av}$301 of Pulsed Type Laser Source500/Chopped Type Laser Source600 in Eq.(16) only. In measuring the time/frequency related parameters of Pulsed Type Laser Source500 and Chopped Laser Source600, the First Photodiode120 at Port_2102 has not any responsibility, the main and the single mission of the First Photodiode120 of FCIS100 of FCIS based-LEMCS111 is only to measure the average photocurrents $I_{av}$300, and $I_{av}^{ref\_clem}$842 proportional to the averaged optical power levels $P_{av}$301 of Pulsed Type Laser Source/Chopped Type Laser Source as shown in FIG. 3. Furthermore, according to Eq.(16), the spectral responsivity $R_{FCIS}^{\lambda}$320 of FCIS of FCIS based-LEMCS needed to calculate the averaged pulse energy $PE_{av}$840 of Pulsed Type Laser Source500 and the reference and averaged pulse energy $PE_{av}^{ref\_clem}$845 of Chopped Type Laser Source600, corresponding to spectral responsivity of the First Photodiode120 mounted to Port_2102, is performed by its direct comparison to Optical Power Transfer Standard, calibrated against CR803 [1] and, the First Photodiode120 produces an averaged photocurrent $I^{resp}$200 in the determination process of the spectral responsivity $R_{FCIS}^{\lambda}$320.

Figure 7:
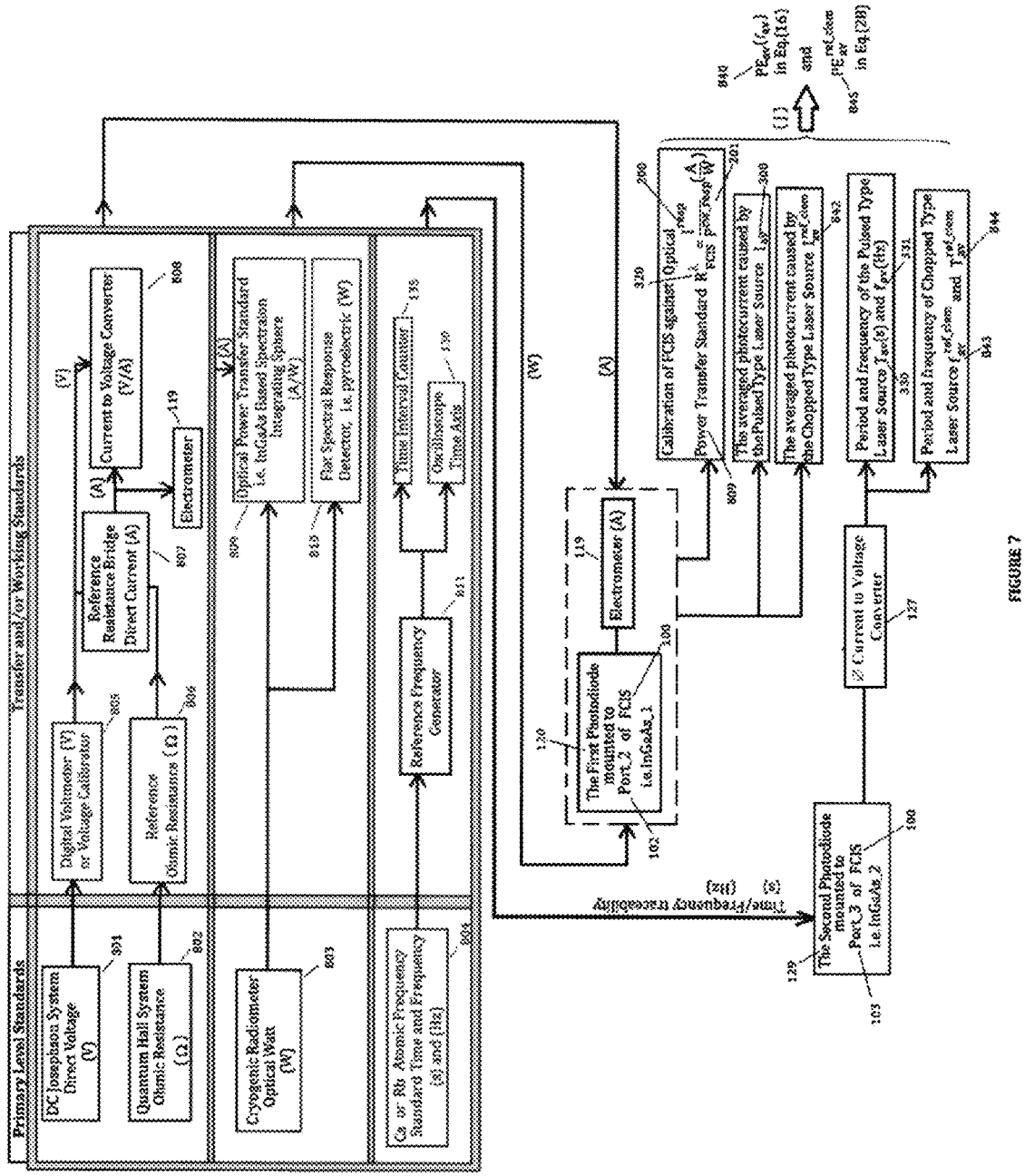
FIG. 7. Traceability chain of FCIS based-LEMCS, which is to be used in both measuring the averaged pulse energy $PE_{av}$ of Pulsed Type Laser Source and calibrating Commercial Laser Energy Meters by using the reference and averaged pulse energy of Chopped Type Laser Source of FCIS based-LEMCS.

All the average photocurrents $I_{av}$300, $I_{av}^{ref\_clem}$842 and $I^{resp}$200 generated produced by the First Photodiode120 mounted to Port_2102 are collected and averaged by the Electrometer119, which is traceable to Quantum Hall Resistance Standard and DC Josephson Voltage Standard through Reference Resistance Bridge as shown in FIG. 7. The traceability chain for $I_{av}$300, $I_{av}^{ref\_clem}$842 and $R_{FCIS}^{\lambda}(A/W)$320 is also demonstrated in FIG. 7.
Port_3;

The aims of the use of the Second Photodiode129 linked to Port_3103 of FCIS100 of FCIS based-LEMCS111 through Mechanical Attenuator and the first MM optical fiber patch cord as in FIG. 1 and FIG. 2 are i-) to perform the time/frequency related measurements of Pulsed Type Laser Source500/Chopped Type Laser Source600 without the effect of time constant of FCIS100 and without the effect of the relatively lower cutoff frequency of the First Photodiode120 and ii-) to coincide the Optical Axis398 of FCIS based-LEMCS111 with the those of the Pulsed Type Laser Source500, Chopped Type Laser Source600, and CW Laser Source800 highly repetitively so as to obtain high measurement reproducibility. In addition to time/frequency related measurements of Pulsed Type Laser Source500, Chopped Type Laser Source600 during $PE_{av}$840 and $PE_{av}^{ref\_clem}$845 measurements, the Second Photodiode129 is also used for highly repetitively coinciding the Optical Axis398 of FCIS based-LEMCS111 with the Optical Axes398 of the Pulsed Type Laser Source500, Chopped Type Laser Source600, and CW Laser Source800 entering from Port_1 inside FCIS in FIG. 1, FIG. 2, and FIG. 8 during the measurements of the averaged pulse energy $PE_{av}$840 of Pulsed Type Laser Source500, the determination of the averaged and reference pulse energy $PE_{av}^{ref\_clem}$845 of Chopped Type Laser Source for the calibration of Commercial. Laser Energy Meters999, and the determination of $R_{FCIS}^{\lambda}$ (A/W)320 of FCIS100 of FCIS based-LEMCS111 against Optical Power Transfer Standard809. Thanks to coinciding the Optical Axis 398 of FCIS100 with those of the Pulsed Type Laser Source500, Chopped Type Laser Source600, and CW Laser Source800 entering from Port_1 inside FCIS100 by means of the inclination of 25° of Internal Steel Hemisphere110 settled inside FCIS100 in the invention, extraordinary reproducibility and repeatability in the determination of $R_{FCIS}^{\lambda}$320, and the measurements of $PE_{av}$840 and $PE_{av}^{ref\_clem}$845 are observed.

The FC/PC connector side of the First MM Optical Fiber Patch Cord150 is joined to input of Mechanical Attenuator170 and then the output of Mechanical Attenuator170 is combined to the Second Photodiode129 through the Second MM Optical Fiber Patch Cord160. The photocurrent generated by the Second Photodiode129 is transformed into voltage by a Current to Voltage Converter127. Zr ferrule140 of HMS connector132 of the First MM Optical Fiber Patch Cord150 is mounted inner center surface of internal steel hemisphere110, which directly sees Port_1101, and which is settled on the equator line inside FCIS100 of FCIS based-LEMCS111 with an angle, i.e. 25° in the invention, which is shown in FIG. 4. With this inclination of internal steel hemisphere110 inside FCIS100, the First Photodiode120 used in measuring $I_{av}$840, $I_{av}^{ref\_clem}$845 , and $I^{resp}$200 is protected from first reflections of Pulsed Gaussian Laser Beam501 of Pulsed Type Laser Source500, and Chopped Gaussian Laser Beam601 of Chopped Type Laser Source600 entering in Port_1101. The same approach is also valid for CW Gaussian Laser Beam of CW Laser Sources used in the determination of spectral responsivity $R_{FCIS}^{\lambda}$320 of FCIS100 of FCIS based-LEMCS111 against Optical Power Transfer Standard809, and the sufficiently diffusely reflected beams148 depicted as in FIG. 4 fall on the active area of the First Photodiode120 mounted to the Port_2102 having a diameter of 2 mm. The first reflection149 takes place towards the wall opposite the First Photodiode120 and onto the same section of the inner surface wall of FCIS100 of FCIS based-LEMCS111 with the inclination of 25° of Internal Steel Hemisphere110 settled inside FCIS100, coated with $BaSO_4$105, reflects the beam, which is reflected first from the center of the polished/mirrored inner surface of internal steel hemisphere110, interior surface of FCIS100 of PCIS based-LEMCS111diffusely. The orientation of the First Reflection149 with the special inclination of 25° of Internal. Steel Hemisphere110 onto the same inner surface wall of FCIS100 provides highly reproducible measurements. This placement and the inclination of Internal Steel Hemisphere110 on Port3103 of FCIS100 is one of the most important properties of the invention. Additionally, whenever Pulsed Gaussian Laser Beams501 of Pulsed Type laser Source500 or Chopped. Gaussian Laser Beams601 of Chopped Type Laser Source600 or CW Gaussian Laser Beam799 of CW Laser Source800 entering in FCIS100 through Port_1101 collides on the center of internal steel hemisphere110 inclined, i.e. 25° in the invention, it is specularly reflected, called as a first retlection149 in Fig.4, to the wall opposite the First. Photodiode120 settling on the same equatorial line. The Pulsed Gaussian Laser Beams501 or Chopped. Gaussian Laser Beams601 or CW Gaussian Laser Beam799 colliding on the center of internal steel hemisphere110 begins to distort and their beam waists start to expand after colliding the center of internal steel hemisphere110 due to the inner curvature of internal steel hemisphere110 and the presence of Pin Hole109 at the center of internal steel hemisphere110. The distortion and the expansion of the first reflection beam149 forms relatively very larger area on the wall coated with $BaSO_4$105. This type positioning and use of internal steel hemisphere110 inside FCIS100 is very practical for not damaging $BaSO_4$. coated wall105 of FCIS100 and moreover, a sufficient diffuse reflection interior FCIS100 in the invention occurs, increasing the measurement reproducibility in the invention.

Port_3103 is so drilled with an angle that Zr ferrule140 of HMS connector 132 of the First MM Optical Fiber Patch Cord150, the length of which is 10 mm, and the outer diameter of which is 2.5 mm, extends to the position 0.2 mm back from the inner surface of internal steel hemisphere110 as in FIG. 4 in detail. The First MM Optical Fiber Patch. Cord150 has a $SiO_2$ core, the diameter of which is 62.5 µm. The crest of Pulsed Gaussian Laser Beams501 of Pulsed Type laser Source500 or the crest of Chopped Gaussian Laser Beams601 of Chopped Type Laser Source600 or the crest of CW Gaussian Laser Beam799 of CW Laser Source800 entering in FCIS100 through Port_1101 is continuously fallen onto the tip of Zr ferrule140 of HMS connector 132 of the First MM Optical Fiber Patch Cord150 shown as in FIG. 1, FIG. 2, and FIG. 8 by means of Alignment Combination162. Then the Optical Axis398 of FCIS100 and the optical axes of Pulsed Type Laser Source500, Chopped Type Laser Source600, and CW Laser Source800 shown in FIG. 1, FIG. 2, and FIG. 8 are coincided by means of Alignment Combination162 by on line tracking and maximizing the voltage amplitude at the output of a Current to Voltage Converter127 joined to the Second Photodiode129 on the screen of the Oscilloscope130. The relative maximum signal amplitude means that the crest of Pulsed Gaussian Laser Beams501 of Pulsed Type laser Source500 or the crest of Chopped Gaussian Laser Beams601 of Chopped Type Laser Source600 or the crest of CW Gaussian Laser Beam799 of CW Laser Source800 directly collides/falls on Zr ferrule140 placed on the center of internal steel hemisphere110. This process and the configurations in the invention considerably increase the measurement reproducibility and repeatability. In order to coincide the optical axes of Pulsed Type Laser Source500, Chopped Type Laser Source600, and CW Laser Source800 entering from Port_1101 with the Optical Axis398 settling on the core of Zr ferrule140 of the First MM Optical Fiber Patch Cord150 on Port_3103 during the measurements of $I_{av}$300, $I_{av}^{ref\_clem}$842, and $I^{resp}$200 is difficult. In order to overcome the difficulty, in the invention, an internal steel hemisphere110 assembled with the combination of the First MM Optical Fiber Patch Cord150, Mechanical Attenuator170, the First MM Optical Fiber Patch Cord129, and a Current to Voltage Converter127 is designed and is mounted inside a conventional integrating sphere which is equipped with the internal steel hemisphere110 assembled with the Zr ferrule140 of the First MM Optical Fiber Patch Cord150 illustrated as in FIG. 4 and FIG. 5, called Fiber Coupled integrating Sphere100 (FCIS) in the invention. The internal steel hemisphere110 having an enclosed circular area of $A_{sh}=133$ mm$^2$ 520 in FIG. 4 behaves as a target having a wide circular target area520 of 133 mm$^2$. Even though inner surface of the internal steel heinisphere110 is chemically and mechanically polished/mirrored, some portion of the intensive Pulsed Gaussian Laser Beams501 of Pulsed Type laser Source500, Chopped Gaussian Laser Beams601 of Chopped Type Laser Source600, and CW Gaussian Laser Beam799 of CW Laser Source800 colliding inner surface of the internal steel hemisphere110 is launched into the First MM Optical Fiber Patch Cord150 through its Zr ferrule140, thanks to a relatively high numerical aperture of optical fiber of the First MM Optical Fiber Patch Cord150, the remaining diffuse reflectance characteristic and the inner surface curvature of internal steel hemisphere110, all of which provide a structural advantage for launching of some portion of Pulsed Gaussian Laser Beams501, Chopped Gaussian Laser Beams601, and CW Gaussian Laser Beam799 into the core of Zr ferrule of the first MM optical fiber patch cord. If the intensity of the launched portion of Pulsed Gaussian Laser Beams501 or Chopped Gaussian Laser Beams601 or CW Gaussian. Laser Beam799, which is detected by the Second Photodiode129, is insufficient, the coinciding process is performed by means of Alignment Combination162 between the optical axis of Pulsed Type Laser Source500, Chopped. Type Laser Source600, and CW Laser Source800 and the Optical Axis398 extending the center of the inner surface of the internal steel hemisphere on Port_3103. By this alignment process, the crests of Pulsed Gaussian Laser Beams501, Chopped Gaussian Laser Beams601, and CW Gaussian Laser Beam799 entering from Port_1 through the Pin Hole109 of 0.1 mm diameter at the center of the internal steel hemisphere on Port_3 are coincided on the same optical axis398 and the maximizing process continues until the maximum intensity to be detected by the Second Photodiode129 is available and is seen on the Oscilloscope130 screen. As soon as the maximum intensity is obtained, and it is decided that the crests of Pulsed Gaussian Laser Beams501, Chopped Gaussian Laser Beams601, and CW Gaussian Laser Beam799 entering from Port_1101 directly collides to the center of the inner surface of the internal steel hemisphere110 on which a Pin Hole109 of 0.1 mm diameter is drilled. In this case, when $I_{av}$300, $I_{av}^{ref\_clem}$842, and $I^{resp}$200 measurements are performed by the combination of the First Photodiode120 with the Electrometer119, the time/frequency related measurements of Pulsed Type Laser Source500, and Chopped Type Laser Source600 are carried out by the combination of the Second Photodiode129, Current to Voltage Converter127, and Time Interval Counter135 of FCIS based-LEMCS111. With this type of the configuration of the first MM fiber patch cord150 and the second MM fiber patch cord160 assembled with internal steel hemisphere110 through Mechanical Attenuator 170, the measurement reproducibility of photocurrent parameters $I_{av}$300, $I_{av}^{ref\_clem}$842, and $I^{resp}$200, which are necessary for calculations of $PE_{av}$840, $PE_{av}^{ref\_clem}$845, and $R_{FCIS}^{\lambda}$ 320, is relatively enhanced for any relevant Gaussian type laser source, depending on the application in FCIS based-LEMCS such as, Pulsed Gaussian. Laser Beams501 of Pulsed Type laser Source500, Chopped Gaussian Laser Beams601 of Chopped Type Laser Source600, and GW Gaussian Laser Beam799 of CW Laser Source800, because the same Optical Axis398 is achieved by maximizing the photocurrent of the Second Photodiode129 on the screen of the Oscilloscope130. The maximum photocurrent from the Second Photodiode129 is obtained by adjusting Alignment Combination162 in FIG. 1, FIG. 2 and FIG. 8 as soon as the peak irradiance position (crest) of the Pulsed Gaussian Laser Beams501 of Pulsed Type Laser Source500, the Chopped Gaussian Laser Beam601 of Chopped Type Laser Source600, and the CW Gaussian Laser Beam799 of CW Laser Source800 entering from Port_1101 in FCIS100 is matched with 62.5 μm core of Zr ferrule140 of the First MM Optical Fiber Patch Cord150 extending to the inner surface of internal steel hemisphere110. The tip of Zr ferrule140 of the First MM Optical Fiber Patch Cord150 is located back from the inner surface of the internal steel hemisphere110 as 0.2 mm and that is, Zr ferrule 140 of the First MM Optical Fiber Patch Cord150 is rest backward the center of the internal steel hemisphere110. In order to launch the Gaussian Laser Beams501, 601, 799 into the First MM Optical Fiber Patch Cord150, a Pin Hole109, which is shown in FIG. 4 and which has a diameter of 0.1 mm, is so drilled that the core of Zr ferrule140 of HMS connector132 of the First MM Optical Fiber Patch Cord150 is centered with this Pin Hole109 and the Pulsed Gaussian Laser Beams501 of Pulsed Type Laser Source500, Chopped Gaussian Laser Beams601 of Chopped Type Laser Source600, and CW Gaussian Laser Beam799 of CW Laser Source800 is first oriented to this Pin Hole109 during $PE_{av}$840, $PE_{av}^{ref\_clem}$845, and $R_{FCIS}^{\lambda}$ 320 measurements by means of Alignment Combination162 by directly observing the relative output signal level of the Second Photodiode129 linked to Current to Voltage Converter127 on the screen of the Oscilloscope130. The maximum signal on the screen of the Oscilloscope130 is $P_0'$401 in FIG. 3 during $PE_{av}$840, and $PE_{av}^{ref\_clem}$845 measurements of Pulsed Type Laser Source500, and Chopped type Laser Source600, and the maximum signal on the screen of the Oscilloscope 130 is $P_0^{cw\_max}$198 for CW Laser Source800 as in FIG. 8 during the determination of $R_{FCIS}^{\lambda}$ 320. In the invention, because Chopped Type Laser Source600 is generated from CW Laser Sources800 by using a series of choppers901-909, the optical axes coinciding process can be made directly by using CW Laser Source800 without chopping CW Laser Gaussian Beams799 just before measuring $I_{av}^{ref\_clem}$842 and resultantly $PE_{av}^{ref\_clem}$845. This point is clarified in the Section "c-) Calibration of a Commercial Laser Energy Meter by using chopped type laser source". The Gaussian Laser Beams 501, 601, 799 of Pulsed Type Laser Source500, Chopped Type Laser Source600, and CW Laser Source800 reflected from the inner surface of the internal steel hemisphere110 are repetitively reflected towards nearly same region of FCIS100, labeled as the first reflection149 in FIG. 4, and this provides us with higher repeatability and reproducibility of optical axis alignment processes in measurements of $I_{av}$300, $I_{av}^{ref\_clem}$842, and $I^{resp}$200 yielding the results of $PE_{av}$840, $PE_{av}^{ref\_clem}$845, and $R_{FCIS}^{\lambda}$ 320 together with the time/frequency related measurements $T_{av}$330, $f_{av}$331, $T_{av}^{ref\_clem}$844, and $f_{av}^{ref\_clem}$843 to be performed by the Second Photodiode129. $T_{av}$330, $f_{av}$331 are related parameters to $PE_{av}$840, which is the averaged pulse energy of Pulsed Type Laser Source500. $T_{av}^{ref\_clem}$844, and $f_{av}^{ref\_clem}$843 are related parameters to $PE_{av}^{ref\_clem}$845, which is the reference and averaged pulse energy of Chopped Type Laser Source to be used in the calibration of Commercial Laser Energy Meter999. For CW Laser Source800 in FIG. 8, which has identical beam waist and divergence properties those stated in this invention, typically, an optic power of $P^{cw\_resp} \cong 4$ mW 201 of CW Gaussian Laser Beam799 of CW Laser Source800 entering from Port_1101 of FCIS100, and falling on the center of the internal steel hemisphere110, the launched optical power $P_o^{cw\_max}$198 in the First MM Optical Fiber Patch Cord150 through Pin Hole109 having a diameter of 0.1 mm stimulates a maximum DC voltage of 10 mV at the output of Current to Voltage Converter127 joined to the Second Photodiode129 as in FIG. 8, which is tracked on the screen of Oscilloscope130 in real time and during all the measurements in the invention. This also corresponds to a pulse peak power $P_0'$ of 10 mV 401 for Pulsed Type Laser Source500, and Chopped. Type Laser Source600. It is said that a maximum DC voltage −10 mV on the Oscilloscope130 screen matching an optical power of $P^{cw\_resp} \cong 4$ mW 201 corresponds typically to the best condition of the optical alignment between the optical axis of CW Laser Source800 and the optical axis398 of FCIS100 of FCIS based-LEMCS111 for the Port_1101, which is a circular aperture of 8 mm diameter in the invention. These typical values are given for how to operate the optical alignment procedure of FCIS based-LEMCS111 in the invention.

Internal steel hemisphere110, in the center of which Zr ferrule140 of HMS connector132 of the First MM Optical Fiber Patch Cord150 is placed, is inclined, i.e. 25°, towards the opposite wall of the. First. Photodiode120 in order to prevent the First Photodiode120 from the first reflections of Pulsed Gaussian Laser Beams501 of Pulsed Type Laser Source500 and Chopped Gaussian Laser Beams601 of Chopped Type Laser Source600 falling onto the First Photodiode120 as shown in FIG. 4. The diameter of the internal steel hemisphere110 is 13 mm and the circular target area of the internal steel hemisphere110 is $A_{sh} = \pi(13/2)^2 = 133$ mm² 520. Due to the fact that the internal steel hemisphere110 is inclined as i.e. 25° towards the opposite wall of the First Photodiode120, the Gaussian Laser Beams501, 601, 799 entering from Port_1101 doesn't see an enclosed circular area of $A_{sh} = 133$ mm² 520. Instead of 133 mm², Port_1101 sees an effective circular area of 133 mm²xcos (25°)=120.54 mm².

Figure 5:
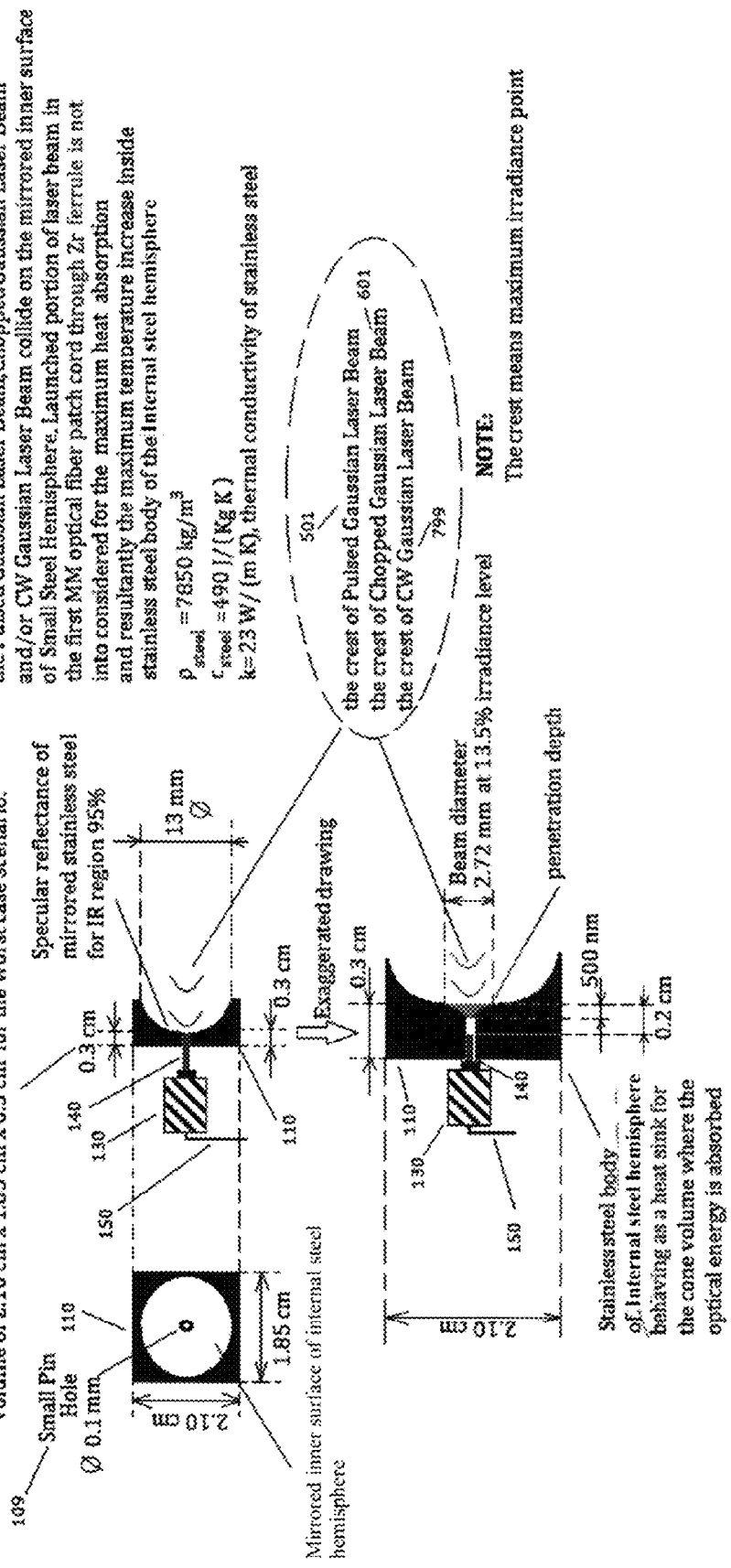
FIG. 5. Details of stainless steel body of internal steel hemisphere for the energy transfer and laser pulse parameter calculations in the determination of the pulse energy damage limit.

The inner surface of internal steel hemisphere110 is mechanically and chemically polished/mirrored. The increasing of the reflectivity of the inner surface of internal steel hemisphere110 with the polishing processes prevents the inner surface of internal steel hemisphere110 from the temperature increase, to be caused by Pulsed Gaussian Laser Beam501 of the Pulsed Type Laser Source500 and Chopped Gaussian Laser Beam601 of Chopped Type Laser Source600, interior surface of internal steel hemisphere110. The penetration dept of the electromagnetic energy the interior polished surface of internal steel hemisphere110 is infinitesimal small and the electric fields of Pulsed Type Laser Source500 and Chopped Type Laser Source600 induces the surface electric charges on the infinitesimal small surface depth on the polished/mirrored surface of the internal steel hemisphere110. This directly corresponds to no electrical charge inside the internal steel hemisphere110 and secondary electromagnetic waves are induced by the surface charges vibrating with an optical frequency identical to that of Pulsed Type Laser Source500 and Chopped Type Laser Source600. The secondary wave propagation of the Pulsed. Type Laser Source500 and Chopped Type Laser Source600 reflected from the interface air/internal steel hemisphere110 inner surface and Zr ferrule140, the melting point of which is 1855° C., gives rise to a scattering wave and so is reflected to the opposite wall of the First Photodiode120 inside FCIS100 with the inclination of internal steel hemisphere110, i.e. 25° in the invention. The absorption of electromagnetic wave in a metal takes places in consistent with Paul Drude's model, based on the idea that free electrons first accelerated with electrical field of electromagnetic wave in the metal are damped with phonon collisions together with other lattice imperfections, and is strong functions of polarization of electromagnetic wave, incidence angle of beam, surface properties such as roughness, frequency of electromagnetic wave, electrical conductivity of the metal, and the temperature of the metal. In FIG. 5, the penetration depth is demonstrated by dark gray such as an evanescent wave penetration inside stainless steel. In three dimensional spaces, the absorbing volume of stainless steel can be regarded as a cone for the estimation of energy transferred into stainless steel body via way of heat conduction and the temperature increases inside stainless steel body of internal steel hemisphere110. In addition to Paul Drude's model, Fresnel Formulas, which are written for wavelength dependent p- and s- polarization states in terms of optical constant of the mentioned metal, also work for absorption properties of the mentioned metal surface. For visible and IR electromagnetic fields, the penetration depth of electromagnetic wave in the metal is approximately a few tenths of nanometer. However, the typical penetration depth, in which the electromagnetic energy is strongly absorbed, is assumed as the order of a few hundreds of nanometers by considering the surface roughness, the impurities, the oxide content, the surface temperature and the possible surface defects of the inner polished surface of internal steel hemisphere, all of which cause the incoming light beam of Pulsed Type Laser Source to be trapped inside metal body, giving rise to temperature increase inside the stainless steel body. Therefore the calculations in the invention, it can he assumed that the relevant laser energy is confined and absorbed within a few hundred nanometers of the inner surface of internal steel hemisphere taking the surface roughness and other affecting parameters mentioned above into account. For an IR laser of 980 nm, the penetration depth of 500 nm together with the. surface roughness, the impurities, the oxide content, the surface temperature and the surface defects, which strongly affect the absorbance of the electromagnetic energy in the metal is a realistic approach, which is seen in the data obtained from atomic force microscope inspections and Monte Carlo Simulation results [6]. The "penetration depth" term stated in this part should be regarded as a confined volume of inner polished surface of internal steel hemisphere, in which any Pulsed Gaussian Laser Beam is strongly absorbed and is directly converted into temperature increase inside internal steel hemisphere. One of the critical point in this invention is to calculate the temperature increase in the confined volume of the internal steel hemisphere110 which is enclosed by the beam size of the Pulsed Type Laser Source on the target point of the internal steel hemisphere and the penetration depth of 500 nm with some degree of surface roughness. The beam sizes of Pulsed Type Laser Source500 and Chopped Type Laser Source600 on the target of the internal steel hemisphere110 corresponds to the base diameter of cone and it is calculated as 2.72 mm for 980 nm at the worst case. By assuming that the enclosed volume in body of internal steel hemisphere110 is a cone volume $V_{cone}^{SHM}$, not a cylinder, the following calculations are carried out for the worst case and scenario. The maximum single pulse energy $PE_0^{max}$ which corresponds to the maximum value of the pulse energy of Pulsed Type Laser Source500, is 100 mJ, the typical total (specular plus diffuse)

reflectance of inner surface of internal steel hemisphere110, which is chemically and mechanically mirrored/polished, is 95% for near IR region of the electromagnetic spectrum. The melting point of stainless steel, the material of the internal steel hemisphere, is 1510° C. The specific gravity of stainless steel $\rho_{steel}$, from which the internal steel hemisphere110 is manufactured, is 7850 kg/m³. The specific heat of stainless steel $c_{steel}$ is 490 J/(kg K) and the thermal conductivity, a function of electron mobility inside metal, is 23 W/(m K).

$$V_{cone}^{SHM} = \frac{1}{3}\pi \text{ Beam Waist Radius}^2 \cdot \text{Penetration Depth} \quad (16)$$

The volume $V_{cone}^{SHM}$ and the mass $m_{cone}^{SHM}$ of the cone, in which electromagnetic field of Pulsed Type Laser Source500 penetrates, is calculated as follows;

$$V_{cone}^{SHM} = \frac{1}{3}\pi \left(\frac{2.72 \text{ mm}}{2}\right)^2 500 \text{ nm} = 0.93 \times 10^{-12} \text{ m}^3$$

$$m_{cone}^{SHM} = V_{cone}^{SHM} \cdot \rho_{steel} = 0.93 \times 10^{-12} \text{ m}^3 \cdot 7.85 \times 10^6 \frac{g}{m^3} = 0.73 \times 10^{-5} \text{ g}$$

For a single pulse of 100 mJ, the temperature increment is calculated by $$Q = m_{cone}^{SHM} \cdot c_{steel} \cdot \Delta T(K) \quad (17)$$

The reflection of the mirrored surface of internal steel hemisphere110 is ~95%. In this case the absorbed energy by stainless steel for $PE_0^{max}$ of 100 mJ is around $P^{absorb}$=5 mJ. The temperature increment $\Delta T$ resulted from a absorbed energy $PE^{absorb}$ of 5 mJ inside the enclosed cone volume of stainless steel is, $$\Delta T = \frac{5 \text{ mJ}}{(0.73 \times 10^{-5} \text{ g})\left(490 \frac{J}{\text{kg K}}\right)} = 1398 \text{ K}$$

When the temperature increment of 1398 K caused by a $PE_0^{max}$ of 100 mJ inside the enclosed cone volume in the body of the internal steel hemisphere110, this temperature increment is dissipated inside all steel body of the internal steel hemisphere110. the total mass of the internal steel hemisphere110 13 g, and it has a surface area of 3.9 cm² (2.1 cm×1.85 cm and its thickness is 3 mm) behaving as a heat sink for the enclosed cone volume of the internal steel hemisphere110. The heat transfer from hotter region to the surrounding and cooler region inside the stainless steel body behaving as a heat sink for the enclosed cone volume of the internal steel hemisphere110 takes places with electron mobility and so the average electron velocity is a determinative parameter for thermal conductivity. If the heat transfer rate by heat conduction process inside stainless steel of the internal steel hemisphere110 is known, it is possible to calculate the time elapsed for decreasing the temperature increment of 1398 K to any reasonable temperature level not damaging the material and surface conditions of the internal steel hemisphere110. When the Pulsed Gaussian Beam of Pulsed Type Laser Source having a maximum pulse energy $PE_0^{max}$ of 100 mJ collides on the stainless steel with abeam diameter of 2.72 mm of 980 nm laser by assuming the temperature of the internal steel hemisphere110 is in thermal equilibrium for the room temperature of 25° C. equal to 298 K, the temperature on the target diameter of 2.72 mm of the stainless steel reaches 298 K+1398 K=1696 K, corresponding to 1423° C. The energy transfer rate $Q_{co}$ with conduction in (J/s) is $$Q_{co} = k_s A/x \cdot \Delta T' \; (J/s) \quad (18)$$

Where k is thermal conductivity of stainless steel and equal to 23 W/(m K). A is surface area of internal steel hemisphere110 behaving as a heat sink, and equal to 3.9 cm² and x is the thickness of the stainless steel constituting the internal steel hemisphere and equal to 3 mm. $\Delta T'$ is the temperature difference of stainless steel before and after heat dissipation. Now the instant temperature value on the target diameter of 2.72 mm of the stainless steel, once maximum single laser pulse energy $PE_0^{max}$ of 100 mJ of Pulsed Type Laser Source falls, is 1423° C. A temperature difference of $\Delta T'$=1000 K can be reasonable value for not damaging the inner surface of the internal steel hernisphere110. From Eq.(18), the energy transfer rate with conduction inside the steel body of the internal steel hemisphere is $Q_{co}$=2990 J/s, and finally the energy of 5 mJ absorbed by stainless steel is dissipated within (5 (mJ)/2990 (J/s)=1.7 μs) in body of the internal steel hemisphere110. The whole mass of the internal steel hemisphere110 is 13 g and the temperature increase inside whole body of the internal steel hemisphere110 can be estimated as in Eq.(19) by assuming that the temperature gradient is uniformly distributed inside the volume of the internal steel hemisphere110, $$Q = PE^{absorb} = 5 \text{ mJ} = m_{heat\_sink}^{SHM} \cdot c_{steel} \cdot \Delta T'' \quad (19)$$

The volume of the stainless steel behaving as a heat sink is equal to multiplication of the surface area of 3.9 cm² (2.1 cm=1.85 cm) with the thickness of 3 mm, yielding 1.17 cm³. The mass behaving as a heat sink $m_{heat\_sink}^{SHM}$ is obtained by multiplying 1.17 cm³ with stainless steel specific gravity $\rho_{steel}$, 7850 kg/m³, yielding $m_{heat\_sink}^{SHM}$=9.1845 g.

$$PE^{absorb} = 5 \text{ mJ} = 9.1845 \text{ g} \cdot 490 \text{ J/(kg K)} \cdot \Delta T'' \quad (20)$$

It should be remembered that 5 mJ is directly corresponds to a pulse energy of 100 mJ because of the averaged reflectivity of 95% of the mirrored inner surface of internal steel hemisphere110. Resultantly, temperature increase is $\Delta T'$=1.1 mK for each laser pulse. $PE_0^{max}$ of which is 100 mJ. The result inferred from these calculations the internal steel hemisphere easily withstand the laser pulse train composed of the maximum single laser pulse energies up to $PE_0^{max}$=100 mJ without any degradation, if the dead time DT312 is wider than 1.7 μs between two adjacent laser pulses, $PE_0^{max}$ of which is 100 mJ. if the dead time DT312 between two adjacent pulses in FIG. 3, each of which has a $PE_0^{max}$ of 100 mJ, is narrower than 1.7 μs, this doesn't allow the single pulse energy inside the body of internal steel hemisphere110 behaving as a heat sink to dissipate sufficiently. In other words, to apply any pulse train having the dead time DT312, which is narrower than 1.7 μs, between two adjacent pulses, each of which has a $PE_0^{max}$ of 100 mJ, increases the instant temperature of the body of the internal steel hemisphere110, as a function of repetition frequency of Pulsed Type Laser Source500. On the other hand, if it is assumed that Pulsed Type Laser Source has a repetition frequency of 1 MHz and it has a of 100 mJ, which matches a peak power $P_0$400 of 200 kW for PW310=0.5 μs, this is equal to 500,000 pulses per 1 sec (five hundred thousand pulses), in this case of Dead Time (DT312)=0.5 μs<1.7 μs, the temperature increases quickly inside the volume of the stainless steel behaving as a heat sink and approaches to 500,000×1.1 mK=550 K for pulse application of 1 s, which is the worst case. When the pulse energy increases, it is necessary to make DT312 between two adjacent laser pulses be larger than 1.7 µs so as to obtain sufficient heat dissipation. However it should be remembered that the maximum average power, which corresponds to the maximum value of the averaged optical power $P_{av}$301 in FIG. 3, which enters from the Port_1101 of FCIS100, and which corresponds to the saturation power for the First Photodiode120 of 7 mW, should be $P_{av}^{sat} \cong 158$ W, which is a value from the ration of the active area of the First Photodiode120 to the inner surface area of $4\pi R^2$ of FCIS100. in this case in order to measure to the peak power $P_0$400 of 200 kW via FCIS without saturation of the First Photodiode, the pulse width (PW310) of the peak power $P_0$400 of 200 kW should be 1.35 ns and the dead time (DT312) should be any value wider than 1.7 µs for sufficient heat dissipation inside stainless steel body. However, it is seen from Eq.(9), and Eq.(10), the rise time of the First Photodiode is 1 MHz and as a consequence, 1.35 ns pulse having a peak power $P_0$=200 kW400 cannot be detected by the First Photodiode120 owing to the pulse response limit of 0.736 µs of the First Photodiode120 in Eq.(9).

NOTE: The above calculations regarding time duration, —which is pulse dead time (DT) of infinite laser pulse train,—necessary for the sufficient dissipation of the absorbed heat resulted from the temperature increase, which is caused by the maximum pulse energy $PE_0^{max}$ of Pulsed Gaussian Laser Beam of Pulsed Type Laser Source, inside the body of internal steel hemisphere used as a target in the invention are to give an exact method for the question of how to calculate time duration (dead time-DT) between two adjacent pulses, each of which has a maximum single pulse enemy $PE_0^{max}$ of 100 mJ, during the application of maximum single pulse energy $PE_0^{max}$ of 100 mJ without damage on the inner surface of internal steel hemisphere. Reflectance, penetration depth, surface roughness, temperature of metal surface, specific heat of metal may change within very wide range, as well as electromagnetic wave properties such as wavelength, incident angle and its state of polarization. Any change in the numerical values of these parameters that strongly affect the above calculations doesn't disturb the philosophy of the invention, the correctness of the above calculations and the presented method.

Now here we can construct the correct limit conditions for the FCIS based-LEMCS111 for the parameters belonging to Pulsed Type Laser Source. The parameter here are averaged values: $PW_{av}^{min}$, which is the minimum value of $PW_{av}$342; $PW_{av}^{max}$, which is the maximum value of $PW_{av}$342; $DT_{av}^{min}$, which is the minimum value of $DT_{av}$340; $T_{av}^{min}$, which is the minimum value of $T_{av}$330; $P_{av}^{sat}$, which is the saturation value of $P_{av}$301 for the First Photodiode120; and $P_0^{max}$ which is the maximum value of $P_0$400 of the maximum peak power of either Pulsed Type Laser Source in FIG. 3: According to the assessments given just below Eq.(9), $PW_{av}^{min}$ should be equal to or larger than 736 ns for time response of the First Photodiode, $DT_{av}^{min}$ should be equal to or larger than 1.7 µs for sufficient heat dissipation at the maximum pulse energy of $PE_{av}^{max}$=100 mJ from the above evaluations together with those in FIG. (4). Finally, the maximum averaged saturation power $P_{av}^{sat}$, which can be measured by FCIS based-LEMCS111 without saturation of the First Photodiode120 is calculated as 158 W from the surface ratios of FCIS100 interior surface area and active area of the First Photodiode120. Resultantly, by using Eq.(4) for an infinite laser pulse train having a period of $T_{av}^{min} = PW_{av}^{min} + DT_{av}^{min} = 0.736$ µs+1.7 µs=2.436 µs and we can calculate the maximum peak power $P_0^{max}$ to be measured through FCIS based-LEMCS111 for an infinite laser pulse train having an averaged Duty Cycle$_{av}$299 as in Eq.(5), $$P_{av}^{max} = 158 \text{ W} = \frac{P_0^{max} \cdot PW_{av}^{min}}{PW_{av}^{min} + DT_{av}^{min}} = \frac{P_0^{max}(0.736 \times 10^{-6} \text{ s})}{(0.736 \times 10^{-6} \text{ s} + 1.7 \times 10^{-6} \text{ s})} \quad (21)$$

An infinite laser pulse train having a maximum peak power $P_0^{max}$=522 W calculated from Eq.(21), the $PW_0^{min}$ of which is 0.736 µs and the of which is 1.7 µs creates an averaged pulse energy $PE_{av}$840 of ~384 µJ on FCIS based-LEMCS111 and it can be measured without damage on internal steel hemisphere surface and without saturation of the First Photodiode.

For the maximum averaged pulse energy $PE_{av}^{max}$ of 100 mJ of FCIS based-LEMCS111, the maximum pulse width $PW_{av}^{max}$ for the maximum peak power $P_0^{max}$ of 522 W of Pulsed Type Laser Source, which can be detected by the First Photodiode120 without saturation, is calculated by dividing $PE_{av}^{max}$=100 mj with $P_0^{max}$=522 W and the result is $PW_{av}^{max} \cong 1.9 \times 10^{-4}$ s.

In brief, the ultimate limit parameters for measuring the averaged pulse energy of Pulsed Type Laser Source500, which FCIS based-LEMCS111 in the invention can measure, are summarized as minimum averaged pulse width, $PW_{av}^{min} \cong 0.736$ µs, averaged minimum dead time, $DT_{av}^{min} \cong 1.7$ µs, producing a minimum repetition period of $T_{av}^{min} \cong 2.436$ µs, corresponding to an averaged repetition frequency of $f_{av}^{max}=1/T=410509$ Hz and the maximum pulse width, $PW_{av}^{max} \cong 1.9 \times 10^{-4}$ s for a maximum peak power $P_0^{max} \cong 522$ W, which can be detected by the First Photodiode without saturation and the averaged saturation power for the First Photodiode120 is $P_{av}^{sat} \cong 158$ W.

Mechanical Attenuator170, which is joined to the ceramic ferrule of FC/PC connector of the first MM optical fiber patch cord120, is used to attenuate the some portion of the Pulsed Gaussian Laser Beam501 launched into Zr ferrule140 of HMS connector132 of the First MM Optical Fiber Patch Cord150 assembled with internal steel hemisphere110. In this invention, although the limited numerical aperture of 0.25 rad of the optical fiber core of Zr ferrule140 of the First MM Optical Fiber Patch Cord150 inherently protects the Second Photodiode129, a Mechanical Attenuator170 is also engaged for an additional protection of the Second Photodiode129 against high level of optical power exposure during time and frequency measurements of the Pulse Type Laser Sources500 having a relatively high peak power. Due to the fact that the Second Photodiode129 is only used for time/frequency related measurements, Mechanical Attenuator170 is kept on high attenuation position. High attenuation position of Mechanical Attenuator170 is reduced to low attenuation position by observing the voltage on the screen of the Oscilloscope130, $PE_{av}(f_{av})$840 value of which is to be measured, until the pulse levels of Pulsed Type Laser Source500 are seen on the screen of the Oscilloscope130. When the sufficient pulse level is seen on the screen of the Oscilloscope130, the averaged repetition period $T_{av}$330 and the averaged repetition frequency $f_{av}$331 of Pulsed Type Laser Source in Eq.(16) are measured directly by the combination of the Second Photodiode129, Current to Voltage Converter127, and Time Interval Counter135 in FIG. 1, which is calibrated traceable to $^{133}$Cs (or $^{87}$Rb) Atomic Frequency Standard804, in average mode.

The Second Photodiode129 is used for the time measurements, cutoff limit is 6 GHz and the cutoff limit of the successive Current to Voltage Converter127 is 10 GHz. Because FCIS based-LEMCS111 described in this invention is one embodiment, the upper cutoff frequencies are acceptable and better than 1 MHz and 6 GHz for both photodiodes designated as the First Photodiode120 and the Second Photodiode129. Additionally, both photodiodes called as the First Photodiode120 and the Second Photodiode129 herein can be exchanged with different types of semiconductor detector depending on the spectral power distribution of the laser in the application. Types of CW Laser Sources800 which are used for constructing Chopped Type Laser Sources600, generating the reference and averaged pulse energy $PE_{av}^{ref\_clem}$845, in FCIS based-LEMCS111, which is to be engaged in the traceable calibration of Commercial Laser Energy Meters999, are not included in the invention. However, the compatibilities and the dimensional relationships of the following parameters in terms of their sizes, and their locations together with the measurement and the calibration methods to be explained in Section "3. Measurement Method of pulse energy of Pulsed Type Laser Source and calibration of Commercial Laser Energy Meter by FCIS based-LEMCS" are included in the invention. The compatibilities and the dimensional correlations to be included in the invention, which are the additions to the three main ideas items given at the end of "DESCRIPTION" section, are;

a-) the geometrical dimension of Port_1101 with respect to full sizes of beam of Pulsed Type Laser Source500, Chopped Type Laser Source600, and CW Laser Source800 entering from Port_1101, and their beam waists, b-) beam divergences of Pulsed Type Laser Source500, Chopped Type Laser Source600, and CW Laser Source800 starting from z=0, depending on the distance on the Optical Axis398 with respect to size and location of the internal steel hemisphere110, c-) the size of internal steel hemisphere110 with respect to the size and dimension of FCIS100 of FCIS based-LEMCS111, its angular inclination and its position with respect to Port_2102, d-) the position of Zr ferrule140 of HMS connector132 of the First MM Optical Fiber Patch Cord150 assembled with the internal steel hemisphere110 at Port_3 with respect to position of Port_1101 for Pulsed. Gaussian. Laser Beam501, Chopped Gaussian Laser Beam 601, and CW Gaussian Laser Beam799 beam entering from Port_1101 and having the calculated beam divergences.

2. Details of Choppers

A series of the choppers901-909 of FCIS based-LEMCS111 invented are used for constructing Chopped Type Laser Source600 generating the reference and averaged pulse energies $PE_{av}^{ref\_clem}$845 for the calibration of Commercial Laser Energy Meters999 traceable to primary level standards by chopping the CW Gaussian Laser Beams799 of CW Laser Sources 800 in FIG. 2. which are called the first CW Laser_1, the second CW Laser_2, the third CW Laser_3, and the fourth CW Laser_4. These CW Laser Sources800, at same time, are operated in the determination of the spectral responsivity $R_{FCIS}^\lambda$320 of FCIS100 of FCIS based-LEMCS111 in CW regime/mode, shown in FIG. 8. With the choppers901-909 used in this invention, the CW Gaussian Laser Beams799 of the first CW Laser_1, the second CW Laser_2, the third CW Laser_3, and the fourth CW Laser_4 are chopped with variable Duty Cycles322. The Duty Cycles changing from 0.17 to 0.84 via DC Motor599 having High Quality Rare Earth Doped Magnet are obtained for the repetition frequencies321 (f=1/T), from 5 Hz to 2 kHz in, the calibration of Commercial Laser Energy Meter999 against FCIS based-LEMCS111 in FIG. 2. The adjustment of Duty Cycle continues up to 2 kHz via a DC Motor599. Modulation frequency depends on the angular rate generated by the DC motor and the Duty Cycle322 at any modulation frequency generated via DC Motor599 relies on the angular slit of any chopper joined to DC Motor599. The combination of the explained choppers901-909, CW Laser Sources800 and DC Motor599 having High Quality Rare Earth Doped Magnet in FCIS based-LEMCS111 forms the infinite laser pulses having stable pulse energies stated as the reference and averaged pulse energy $PE_{av}^{ref\_clem}$845 for calibrating Commercial Laser Energy Meters999 in FIG. 2 and N is equal to 1 for the infinite laser pulses in time domain.

In this invention, the different repetition periods T(s) 320 of the chopped Gaussian Laser Beams having an Duty Cycles299 varying 0.17 to 0.84 are generated, these repetition periods T(s) 320 are precisely measured by removing the negative effects of time constant of FCIS100 and the relatively lower cutoff frequency of the First Photodiode120 by means of new placement type of the Second Photodiode129 mounted to the FCIS100. Finally a new method and a new configuration of integrating sphere, called FCIS in this invention, are put into progress to calibrate the pulse energy $PE^{clem}$(J) scales of the Commercial Laser Energy Meters999.

The chopper901-909 details used in FCIS based-LEMCS111 are given in the drawings separately, from FIG. 6a to FIG. 6b. The metal coppers901-909 used in this invention are made from stainless steel and engraved by means of a computer controlled-laser cutting machine with high precision. The choppers901-909 are so designed that they have 15 periods in one complete turn and each period is 24°. The full diameter of each chopper901-909 is 106 mm, the thickness of each chopper901-909 is 1 mm. The closed section of the chopper901-909 generating a Duty Cycle322 of 0.83 in FIG. 6a is so designed and engraved that the CW Gaussian Laser Beam799, which has a beam waist of 2.8 mm at z=0, corresponding to the widest beam waist used herein, is completely blocked. The averaged Duty Cycle is Duty Cycle$_{av}$299 measured as an averaged value by Time Interval Counter130 and it is considered as time/frequency related measurements in the invention. The open section of the chopper901-909 generating a Duty Cycle322 of 0.17 in FIG. 6b is so designed and engraved that the CW Gaussian Laser Beam799, which has a beam waist of 2.8 mm at z=0, is completely passed. With this mechanical chopping process, the zero level of Chopped Gaussian laser beam, the $PE_{av}^{ref\_clem}$845 of which is to be measured, is exactly generated and as a result, the leakage (background) current $I_{av}^{ref\_clem}$842 caused by exactly not zeroing the optical power to be entered in FCIS100 of FCIS based-LEMCS111 is prevented and the undesired contribution at the leakage (background) current in $I_{av}^{ref\_clem}$842, which electronic modulation may cause this type error because of the insufficient reversed bias, is removed for each Duty Cycle322 at any averaged repetition frequency $f_{av}^{ref\_clem}$843 and this uncertainty source is disregarded with mechanical chopping processes, generated by the choppers detailed in drawings referred as FIG. 6a and FIG. 6b. If an electronic Modulator is used for applying pulse modulation to any laser operating in CW regime/mode, the zero level of the Pulsed Gaussian Laser Beams501 should be considered and subtracted in the calculation as a background (leakage current). If this background (leakage) current level due to not zeroing the output of modulated. Gaussian laser beams with the electronic modulation is not considered, it causes wrong pulse energy calculations and it increases the measurement uncertainty in the calibration of Commercial Laser Energy Meter999. However, the use of a series of the chopper 901-909 in producing the Chopped Gaussian Laser Beams 601 of Chopped Type Laser Source600 in this invention prevents the problematic and the undesired condition and reduces the measurement uncertainty caused by not getting zero level.

Jitter of the DC Motor599, to which the choppers901-909 is mounted as in FIG. 2, and which has a rare earth doped magnet, has an RMS value of 0.2° at 1 KHz. This value is obtained, comparing a reference frequency of 1 KHz with the Chopped Gaussian Laser Beams601 corning from the chopper having 0.5 Duty Cycle322, by Time Interval Counter130. For the constant peak powerP$_0$400 of the Chopped Gaussian Laser Beam601 as in FIG. 3, the maximum and minimum pulse energy to be generated by means of the chopper configuration, depending on the repetition frequency f(Hz)321, the repetition period T(s)320, dead time DT(s)312, pulse width PW(s)310, and Duty Cycle322 in the invention are given at the following.

The repetition frequency f(Hz)321 range, over which Commercial Laser Energy Meters999 are calibrated in FCIS based-LEMCS111 in this invention extends from 5 Hz to 2 kHz by means of the nine separate choppers for the Duty Cycle322 ranges 0.17 to 0.83 shown in FIG. 6a. and FIG. 6b. In this case the maximum energy via these choppers901-909 to be engaged in the calibration of Commercial Laser Energy Meter999 in FCIS based-LEMCS is calculated as follows. Superscript "_clem" shows the relevant parameter in the calibration of Commercial Laser Energy Meter999.

For the repetition frequencies f(Hz)321 which corresponds to the averaged repetition frequency $f_{av}$331, $f \ll f_{-3dB}^{pd\_1}$ in Eq.(16);

$$PE_{av}^{ref\_clem\_max} = \frac{T^{ref\_clem\_max} I_{av}^{ref\_clem}}{R_{FCIS}^{min}} = \frac{I_{av}^{ref\_clem}}{I^{ref\_clem\_min} R_{FCIS}^{min}} \quad (J) \quad (22)$$

In order to produce the maximum energy for the constant peak power P$_0$400 by means of the combination of one of the choppers901-909 and DC Motor599 in the invention, the maximum pulse width PW$^{ref\_clem\_max}$ corresponding to the minimum repetition frequency f$^{ref\_clem\_min}$ at maximum duty cycle Duty Cycle$^{ref\_clem\_max}$ should be adjusted and in the case of maximum pulse width PW$^{ref\_clem\_max}$, $I_{av}^{ref\_clem}$842 is obtained as the maximum photocurrent $I_{av}^{ref\_clem\_max}$ in the First Photodiode120 of FCIS100. According to CW Laser Source800 used in this invention, $R_{FCIS}^{min}$, which corresponds to the minimum value of $R_{FCIS}^{\lambda}$320, is equal to the spectral responsivity of FCIS100 at 980 nm, which is changeable value from application to application, $$f^{ref\_clem\_min} = \frac{\text{Duty Cycle}^{ref\_clem\_max}}{PW^{ref\_clem\_max}} \quad (\text{Hz}) \quad (23)$$

In this invention the minimum repetition frequency f$^{ref\_clem\_min}$=5 Hz, corresponding the maximum repetition period T$^{ref\_clem\_max}$=200 ms and Duty Cycle$^{ref\_clem\_max}$=0.83 for the chopper901 given in FIG. 6a, the corresponding the maximum pulse width PW$^{ref\_clem\_max}$=200 ms×0.83=166 ms. The final equation for Eq.(22) is $$PE_{av}^{ref\_clem\_max} = \frac{PW^{ref\_clem\_max} I_{av}^{ref\_clem\_max}}{\text{Duty Cycle}^{ref\_clem\_max} R_{FCIS}^{min}} \quad (J) \quad (24)$$

Minimum energy for these choppers901-909 to be engaged in the calibration of Commercial Laser Energy Meter999 in FCIS based-LEMCS111 is calculated as follows;

For the averaged repetition frequencies f(Hz)321, which corresponds to the averaged repetition frequency $f_{av}$331, $f \ll f_{-3dB}^{pd\_1}$ in Eq.(16);

$$PE_{av}^{ref\_clem\_min} = \frac{T^{ref\_clem\_min} I_{av}^{ref\_clem}}{R_{FCIS}^{max}} = \frac{I_{av}^{ref\_clem}}{I^{ref\_clem\_max} R_{FCIS}^{max}} \quad (J) \quad (25)$$

In order to produce the minimum energy for the constant peak power P$_0$400 by means of the combination of one of the choppers901-909 and DC Motor599 in the invention, the minimum pulse width PW$^{ref\_clem\_min}$ corresponding to the maximum repetition frequency f$^{ref\_clem\_max}$ at the minimum duty cycle Duty Cycle$^{ref\_clem\_min}$ should be adjusted and in the case of the minimum pulse width PW$^{ref\_clem\_min}$, $I_{av}^{ref\_clem}$842 is obtained as the minimum $I_{av}^{ref\_clem\_min}$ in the First Photodiode120 of FCIS100. According to CW Laser Source800 used in this invention, $R_{FCIS}^{max}$, which corresponds to the maximum value of $R_{FCIS}^{\lambda}$320, is equal to the spectral responsivity of FCIS100 at 1549 nm, which is changeable value from application to application.

$$f^{ref\_clem\_max} = \frac{\text{Duty Cycle}^{ref\_clem\_min}}{PW^{ref\_clem\_min}} \quad (\text{Hz}) \quad (26)$$

In this invention the maximum repetition frequency f$^{ref\_clem\_max}$=2 kHz, corresponding minimum repetition period T$^{ref\_clem\_min}$=0.5 ms and Duty Cycle$^{ref\_clem\_min}$=0.17 for the chopper909 given in FIG. 6b, the corresponding the minimum pulse width PW$^{ref\_clem\_min}$=0.5 ms×0.17=0.085 ms. The final equation for Eq.(25) is, $$PE_{av}^{ref\_clem\_min} = \frac{PW^{ref\_clem\_min} I_{av}^{ref\_clem\_min}}{\text{Duty Cycle}^{ref\_clem\_min} R_{FCIS}^{max}} \quad (J) \quad (27)$$

In order to protect the operator from the laser beam reflected the closed section of the relevant chopper901-909, the suitable protection equipments for both body and eye safety should be used.

The changing of these values presented here doesn't disturb the philosophy of this invention because FCIS based-LEMCS111 together with the methods to be described in the below Section 3 against FCIS based-LEMCS111 traceable to primary level standards constitutes one embodiment.

3. Measurement Method of pulse energy of Pulsed Type Laser Source and calibration of Commercial Laser Energy Meter by FCIS based-LEMCS This section comprises the following parts;

The section "*Determination of the spectral responsivity $R_{FCIS}^{\lambda}$ of FCIS based-LEMCS*" describes the method of determining the spectral responsivity $R_{FCIS}^{\lambda}$320 of FCIS100 of FCIS based-LEMCS with respect to the Optical Power Transfer Standard809 calibrated against Cryogenic Radiometer803 in near IR region by using CW Gaussian laser beam799 of CW Laser Source800 in FIG. 8.

The section "*Method of measuring the averaged pulse energy $PE_{av}$ of a Pulsed Type Laser Source by means of FCIS based-LEMCS*" describes the method of measuring the averaged pulse energy $PE_{av}$840 with pulsed Gaussian laser beams of a Pulsed Type Laser SourceS0O emitting in near IR region covering the spectral range in the invention, in which the spectral responsivity $R_{FCIS}^{\lambda}$320 of FCIS100 of FCIS based-LEMCS111 is determined, in FIG. 1. Due to the fact that the FCIS based-LEMCS111 is constructed as one embodiment, the changing in the spectral region specified as near IR above doesn't change the philosophy of the invention.

The section "*Calibration of a Commercial Laser Energy Meter by using Chopped Type Laser Source in FCIS based-LEMS*" describes how to calibrate any Commercial Laser Energy Meter against the chopped Gaussian laser beams601of Chopped Type Laser Source600 generated by means of the combination of CW Laser with the nine separate choppers as an infinite wave train, the averaged pulse energy $PE_{av}^{ref\_clem}$845 of which was measured by FCIS based-LEMCS, generating a calibration factor called γ 945 as in FIG. 2. These methods described in this section are included in this invention.

a-) Determination of the spectral responsivity $R_{FCIS}^{\lambda}$ of FCIS based-LEMCS;

In this invention, in order to determine the averaged pulse energy $PE_{av}$840 of Pulsed Type Laser Source500 and to determine the averaged pulse energy $PE_{av}^{ref\_clem}$845 of Chopped Type Laser Source600, the configurations of FCIS based-LEMCS111 illustrated in FIG. 1 and FIG. 2 are used for directly measuring the average photocurrents $I_{av}$300 and $I_{av}^{ref\_clem}$842 related to the averaged pulse energies $PE_{av}$840 and $PE_{av}^{ref\_clem}$845 emerging from the Pulsed Type Laser Source500 and Chopped Type Laser Source600 by means of the First Photodiode120 in turn, and are used for directly measuring the average repetition periods $T_{av}$330 and $T_{av}^{ref\_clem}$844 and the average repetition frequencies $f_{av}$331 and $f_{av}^{ref\_clem}$843 of Pulsed Type Laser Source500, and Chopped Type Laser Source600 by means of the Second Photodiode129 of FCIS100 of FCIS based-LEMCS111. In order to calculate the pulse energies of Pulsed Type Laser Source500, and Chopped Type Laser Source600, the spectral responsivity $R_{FCIS}^{\lambda}$320 of FCIS100 of FCIS based-LEMCS111 assembled with the First Photodiode120 is required. For a continuous type laser designated as CW Laser Source800 herein, meaning not modulated in time domain and so not containing no additional frequency component related to the modulation in time domain, the average optical power is the same as its peak power and the same case is valid for the average photocurrent and the peak photocurrent as well. After this brief and repeated evaluation, the determination of spectral responsivity $R_{FCIS}^{\lambda}$320 of the First Photodiode120 of FCIS based-LEMCS is accomplished with the configuration in FIG. 7. Superscript "resp" shows the relevant parameter in the determination of spectral responsivity $R_{FCIS}^{\lambda}$320 of FCIS100 of FCIS based-LEMCS.

In determination of $R_{FCIS}^{\lambda}$320 the setup of FCIS based-LEMCS shown in FIG. 8 is configured. The CW Gaussian laser beam799 of CW Laser Source800 is not chopped, and the optical power of CW Laser Source $P^{cw\_resp}$ 201 directly is fallen in FCIS100 in the continuous regime (CW). In this condition, FCIS100 of FCIS based-LEMCS works as a conventional integrating sphere, except for Internal steel hemisphere assembled with the Second Photodiode designed in the invention. The First Photodiode120 produces the photocurrent $I^{resp}(A)$200 proportional to the optical power of CW Laser Source $P^{cw\_resp}$ (W)201, which is measured by means of Optical Power Transfer Standard809. $I^{resp}(A)$200 measured by the First Photodiode120 is traceable to DC Josephson Voltage System801 and Quantum Hall Resistance System802 through Electrometer119 shown as in FIG. 7 and FIG. 8. The same CW Gaussian laser beam799 of CW Laser Source800 is fallen onto Optical Power Transfer Standard809 shown in FIG. 8 and FIG. 7, and then $P^{cw\_resp}$(W) is obtained as a traceable to Cryogenic Radiometer803 in FIG. 7. Resultantly, the derived spectral responsivity of FCIS based-LEMCS $$R_{FCIS}^{\lambda} = \frac{I^{resp}(A)}{P^{cw\_resp}(W)}$$

is fully traceable to primary level standards. $R_{FCIS}^{\lambda}$320 is the spectral response of the First Photodiode120 in FCIS100 of FCIS based-LEMCS111. The Second Photodiode129 of FCIS100 of FCIS based-LEMCS111, which is mainly used for measuring the time related measurements, and which sees Port_1101 in directly opposite position, is also used for coinciding the input laser beams on the same optical axis with respect to the Pin Hole109 at the center of internal steel hemisphere110 settled on Port_3103 axis in different measurements. With this type of configuration of the Second Photodiode129 in the invention, in addition to time related measurements in the calculations of $PE_{av}$ and $PE_{av}^{ref\_clem}$, the highly repetitive measurements in the determination of spectral responsivity $R_{FCIS}^{\lambda}$320, and the average photocurrents $I_{av}$300 and $I_{av}^{ref\_clem}$842 related to the averaged pulse energies $PE_{av}$840 and $PE_{av}^{ref\_clem}$845 are obtained because the input laser beams are collided on the Pin Hole109 at the center of internal steel hemisphere110 by tracking and maximizing the signal of the Second Photodiode on the Oscilloscope130 screen for Gaussian Laser Beams501/601 of Pulsed Type Laser Source500, Chopped Type Laser Source600, and CW Laser Source800. The Second Photodiode129 in the determination of the spectral responsivity $R_{FCIS}^{\lambda}$320 of FCIS based-LEMCS is only engaged for identical optical alignment of CW Laser Source800 towards inside of FCIS on the same optical beam path as in FIG. 8. The details of determining the spectral responsivity $R_{FCIS}^{\lambda}$320 of FCIS based-LEMCS are given in the following in item by item manner for easy understanding the process. In the numbering showing the steps to be applied, "a" shows that this measurement series belongs to "*a-) Determination of the spectral responsivity $R_{FCIS}^{\lambda}$ based-LEMCS*" and numbers as 1, 2, and etc. shows the sequence number of the steps being applied.

a-1) First, CW Laser Source800 lasing at wavelength λ (nm) given in FIG. 8 is run with a rated power of 10 mW and the CW Gaussian laser beam799 of CW Laser Source800 is oriented to Port_1 of FCIS of FCIS based-LEMCS. The output powers of CW Laser Sources800 are reduced to a few mW level by using neutral density filters to guarantee eye safety together with eye protection equipments in optical alignment, the optical densities of which extends to 2.5, which are located in front of the collimators at z=0.

a-2) By using an IR viewer card having a compatible spectral range with that of CW Laser Source800, the CW Gaussian Laser Beam799 of CW Laser Source800 is centered on Port_1.

The compatibilities and the relationships among the beam waists, the size of Port_1101, and the size of internal steel hemisphere, emphasized in "Details of FCIS" subsection of "DESCRIPTION" section, is taken into account in this step.

a-3) The centered CW Gaussian Laser Beam799 of CW Laser Source800 at Port_1101 is fallen onto the internal steel hemisphere on Port_3 by adjusting the Alignment Combination in FIG. 8.

a-4) As soon as the CW Gaussian Laser Beam799 entering from Port_1101 is fallen on the internal steel hemisphere110, the inner diameter of which is 13 mm shown as in FIG. 3, the Second Photodiode129 assembled with the internal steel hemisphere110 on Port 3103 starts to detect the optical flux launched into the core of Zr ferrule140 of HMS connector132 of the First MM Optical Fiber Patch Cord150 through Pin Hole109 due to inner curvature structure of internal steel hemisphere110.

a-5) The hemisphere structure of the internal steel hemisphere110 in the invention enables the CW Gaussian Laser Beam799 being captured by a 0.25 rad numerical aperture of the core of Zr ferrule140 of HMS connector132 of the First MM Optical Fiber Patch Cord150.

a-6) The photocurrent generated by the Second. Photodiode129, transformed into voltage by means of Current to Voltage Converter127 in FIG. 8 and the output voltage of Current to Voltage Converter127 is maximized in real time by adjusting the Alignment Combination in FIG. 8. The maximum output voltage is obtained when the maximum irradiance level of CW Gaussian laser beam799 of CW Laser Source800 is coincided with Pin Hole109 of 0.1 mm detailed in FIG. 4.

a-7) With this process described in this invention, the measurement reproducibility for the different measurements is enhanced because the crest corresponding to the maximum irradiance level of CW Gaussian Laser Beam799 CW Laser Source800 entering from Port_1 is targeted on the same point defined by the Pin Hole109 of 0.1 mm, back of which 62.5 μm diameter core the core of Zr ferrule140 of HMS type connector132 of the First MM Optical Fiber Patch Cord150 is rest/placed, by maximizing the output voltage of Current to Voltage Converter127 combined to the Second Photodiode129 on Port_3 on the screen of the Oscilloscope130 in real time.

a-8) In the condition of the maximum output voltage of Current to Voltage Converter127, which corresponds to the Second Photodiode129 detects the crest of the CW Gaussian Laser Beam799 of CW Laser Source800, the photocurrent $I^{resp}(A)$200 generated by the First Photodiode120 is read out proportional to the power $P^{cw\_resp}(\lambda)$201 of CW Laser Source800 lasing at wavelength $\lambda$ (nm) by means of Electrometer119.

a-9) After obtaining the photocurrent $I^{resp}(A)$200 generated by the First Photodiode, the same CW Gaussian Laser Beam799 of CW Laser Source800 is applied to Optical Power Transfer Standard809 by substituting Optical Power Transfer Standard809 for FCIS based-LEMCS. With this application, the optical power $P^{cw\_resp}(\lambda)$201 of CW Laser Source800 for wavelength $\lambda$ (nm) is obtained from Optical Power Transfer Standard809, traceable to CR803, in W.

a-10) These steps are repeated for the remaining of CW Laser Source800 and the spectral responsivities of FCIS100 of FCIS based-LEMCS are calculated by proportioning $I^{resp}(A)$200 to $P^{cw\_resp}(W)$ 201 as $R_{FCIS}^{\lambda}(A/W)$320 to be used in the calculations of $PE_{av}$840 and $PE_{av}^{ref\_clem}$845 in according to Eq.(16). In this invention, four CW Laser Sources800 are used, but any change in the number, wavelength, spectral bandwidth, and similar characteristics of lasers used in the invention doesn't change the philosophy of the invention. Different lasers can be used.

a-11) The results of spectral responsivity $R_{FCIS}^{\lambda}$ (A/W) 320 of FCIS100 of FCIS based-LEMCS111 described in this invention together with the related partial uncertainties are given below;

$R_{FCIS}^{980}=3.80\times10^{-5}(A/W)$; $u(R_{FCIS}^{980})=3.04\times10^{-7}(A/W)$ at 980.0 nm $R_{FCIS}^{1064}=4.20\times10^{-5}(A/W)$; $u(R_{FCIS}^{1064})=3.36\times10^{-7}(A/W)$ at 1064.0 nm $R_{FCIS}^{1309}=4.45\times10^{-5}(A/W)$; $u(R_{FCIS}^{1309})=3.56\times10^{-7}(A/W)$ at 1309.0 nm $R_{FCIS}^{1549}=6.07\times10^{-5}(A/W)$; $u(R_{FCIS}^{1549})=4.86\times10^{-7}(A/W)$ at 1549.0 nm Any change in these results introduced here doesn't change the philosophy of the invention because the FCIS based-LEMCS together with the methods described in the Section 3 is one embodiment. These spectral responsivities $R_{FCIS}^{\lambda}(A/W)$320 are used in the calculations of the averaged pulse energies $PE_{av}$840 and $PE_{av}^{ref\_clem}$845 of Pulsed Type Laser Source, and Chopped Type Laser Source, generating infinite pulse train in time domain, the wavelengths of which are conform to these wavelengths 980.0 nm, 1064.0 nm, 1309.0 nm, and 1549.0 nm, according to Eq.(16). Typical relative standard (combined) uncertainty is calculated as 0.80% (k=1) from the measurement series related to the determination of the spectral responsivity $R_{FCIS}^{\lambda}(A/W)$320 of FCIS100 of FCIS based-LEMCS111, which includes the all the uncertainty components coming from the calibrations of the transfer standards calibrated against these primary level standards in FIG. 7 as well as the individual uncertainties of the primary level standards in FIG. 7.

b-) *Method of measuring the averaged pulse energy $PE_{av}$ of Pulsed Type Laser Source by means of FCIS based-LEMCS;*

After completion of determination the spectral responsivities $R_{FCIS}^{\lambda}$ (A/W)320 of FCIS100 of FCIS based-LEMCS111 performed according to the sequential steps specified in the above section of "*Determination of the spectral responsivity $R_{FCIS}^{\lambda}$ of FCIS based-LEMCS*", the main configuration depicted in FIG. 1 is considered, which is the main configuration of this invention to measure the averaged pulse energy of a Pulsed Type Laser Source500 as a function of the repetition frequency $f_{av}$331. In order to measure the averaged pulse energy of Pulsed Type Laser Source by using FCIS based-LEMCS, Pulsed Type Laser Source500 instead of Chopped type Laser Source600 depicted in FIG. 2 is placed opposite Port_1101 of FCIS100 of FCIS based-LEMCS111. According to Eq.(16), the pulse energy related parameters of $R_{FCIS}^{\lambda}$ 320, $T_{av}$330, $f_{av}$331 and $I_{av}$300 should be measured $R_{FCIS}^{\lambda}$ 320 is determined by the sequential steps given in the section of "*Determination of the spectral responsivity $R_{FCIS}^{\lambda}$ of FCIS based-LEMCS*". The remaining parameters of the averaged pulse energy $PE_{av}(J)$840 in Eq.(16), which are $I_{av}$300, $f_{av}$331, $f_{av}$331, $I_{av}$300, are directly measured by FCIS based-LEMCS designed in this invention and the operation steps to measure these parameters of the Pulsed Type Laser Source are introduced as the sequential operation steps at the following. In the measurement of the averaged pulse energy $PE_{av}(J)$840 of Pulsed Type Laser Source500:

If the spectra of Pulsed Type Laser Source500, the averaged pulse energy $PE_{av}$840 of which is to be measured by FCIS based-LEMCS111, is different from $R_{FCIS}^{\lambda}$ 320 determined by the steps stated in the section of "*Determination of the spectral responsivity* $R_{FCIS}^\lambda$ *of FCIS based-LEMCS*", a suitable fitting programs to make interpolation is engaged by taking the spectral responsivity $R_{FCIS}^\lambda$ 320 of the First Photodiode120 mounted to FCIS100 into account.

The First Photodiode120 mounted on Port_2102 of FCIS based-LEMCS111 is used for measuring $I_{av}$300, corresponding to $P_{av}$301 of the pulsed type laser source.

The Second Photodiode129 assembled with internal steel hemisphere110 and mounted ora Port_3103 of FCIS based-LEMCS111 is used for measuring the averaged repetition period $T_{av}$330, the averaged repetition frequency $f_{av}$331, and number of pulses N of Pulsed Type Laser Source500, which is considered in a burst type laser source, and it is N=1 for infinite pulse train having constant repetition period T(s) 320. In this invention N=1 for Pulsed Type Laser Source500 producing infinite laser pulse train in time domain.

The Second Photodiode129 assembled with internal steel hemisphere110 and mounted on Port_3103 of FCIS of FCIS based-LEMCS, in addition to time/frequency related measurements, is also used for alignment of Pulsed Gaussian Laser Beam501 of Pulsed Type Laser Source500 entering from Port_1101 is targeted on the same point defined by the Pin Hole109 of 0.1 mm, back of which 62.5 µm diameter core of Zr ferrule140 of HMS connector132 of the First MM Optical Fiber Patch Cord150 is located, by maximizing the output voltage of Current to Voltage Converter127 combined to the Second Photodiode129 on Port_3103 on the screen of the Oscilloscope130 in real time.

In the numbering showing the steps to be applied, "b" shows that this measurement series belongs to the section of "*b-) Method of measuring the averaged pulse energy* $PE_{av}$ *of a Pulsed Type Laser Source by means of FCIS based-LEMCS*" and numbers as 1, 2, and etc. shows the sequence number of the steps being applied.

b-1) First, Chopped Type Laser Source600, which is a part of FCIS based-LEMCS invented, is removed from FCIS based-LEMCS illustrated in FIG. 2 and Pulsed Type Laser Source500, the averaged pulse energy $PE_{av}$840 of which is to be measured according to Eq.(16), is placed opposite Port_1101 of FCIS100 of FCIS based-LEMCS111 as in FIG. 1.

b-2) Pulsed Type Laser Source500 lasing at wavelength λ (nm) given in FIG. 1 is run and the Pulsed Gaussian Laser Beam501 of Pulsed Type Laser Source500 is oriented to Port_1101 of FCIS100 of FCIS based-LEMCS111 as in FIG. 1.

b-3) The output peak power levels $P_0$400 of Pulsed Type Laser Source500 are reduced to a few mW level in order to guarantee eye safety together with eye protection equipments by using one of the suitable one of the neutral density filters, the optical densities of which extends to 2.5, which are located in front of the collimators at z=0.

b-4) By using an IR viewer card having a compatible spectral range with that of Pulsed. Type Laser Source, the peak power levels $P_0$400 of the Pulsed. Gaussian Laser Beams501 of Pulsed Type Laser Source500 is reduced by a suitable neutral density filter, and the Pulsed Gaussian Laser Beams501 are centered on Port_1 by means of Alignment Combination162 in FIG. 1. The compatibilities and the relationships among the beam waists, the size of Port_1, and the size of internal steel hemisphere, emphasized in "Details of FCIS" subsection of "DESCRIPTION" section, should be taken into account in this step.

b-5) As soon as the Pulsed. Gaussian Laser Beam501 of Pulsed Type Laser Source500 entering from Port_1101 is fallen on the internal steel hemisphere110, the inner diameter of which is 13 mm shown as in FIG. 4, the Second Photodiode129 assembled with the internal steel hemisphere110 on Port_3103 starts detecting the optical flux entering from. Port_1101.

b-6) The maximization of the voltage output of Current to Voltage Converter127 combined to the Second Photodiode129 assembled with the internal steel hemisphere110 on Port_3 which starts to detect the Pulsed Gaussian Laser Beam501 entering from Port_1101 is performed by means of Alignment Combination162 and by tracking the screen of the Oscilloscope130 in real time. With this process in the invention, the measurement reproducibility for individual and independent pulse energy measurements is enhanced because the crest corresponding to the maximum irradiance level (crest) of Pulsed Gaussian Laser Beam501 entering from Port_1101 is targeted on the same point defined by the Pin Hole109 having a diameter of 0.1 mm, back of which 62.5 µm diameter core of Zr ferrule140 of HMS connector132 of the First MM Optical Fiber Patch Cord150 is rest/located. The amplitude of the maximization voltage on the screen of the Oscilloscope130 is not important. What is important at this point is to obtain maximum voltage and maximum voltage is obtained when the crest of the maximum irradiance level of the Pulsed Gaussian Laser Beam501 of Pulsed Type Laser Source500 entering from Port_1101 collides on the center of the Pin Hole109 having a diameter of 0.1 mm, back of which 62.5 µm diameter core of Zr ferrule140 of HMS connector132 of the First MM Optical Fiber Patch Cord150 is rest/located.

b-7) After completion of the maximization process, the output pulse power $P_0$400 of Pulsed Type Laser Source500 is adjusted to its normal operation power level to be measured and the Second Photodiode129 assembled with internal steel hemisphere110 on Port_3103 of FCIS100 of FCIS based-LEMCS111 starts to be directly used for time/frequency related measurements, which are the averaged repetition frequency $f_{av}$(Hz)331, the averaged repetition period $T_{av}$(s)330, the averaged pulse width $PW_{av}$ (s)342, the averaged dead time $DT_{av}$ (s)340, and the averaged Duty Cycle$_{av}$ 299 which is normalized to 1.

b-8) The pulsed voltage signal at the output of Current to Voltage Converter127 connecting to the Second Photodiode129 through Mechanical Attenuator170 on Port_3103, caused by Pulsed Type Laser Source500 operating in its normal operation power level, is observed on the screen of the Oscilloscope130.

b-9) The time frequency related parameters of the Pulsed Gaussian Laser Beams501 of Pulsed Type Laser Source500, the averaged pulse energy $PE_{av}$840 in Eq.(16) of which is aimed to be measured, are directly measured and averaged in real time without the effect of time constant τ of FCIS100 of FCIS based-LEMCS111 and the effect of of the pulse response $\zeta^{pd-1}$ of the First Photodiode 120 by Time Interval Counter135 in FIG. 1, which is traceable to $^{133}$Cs (or $^{87}$Rb) Atomic Frequency Standard in FIG. 7, to which Current to Voltage Converter127 and the Second Photodiode129, are consecutively connected in this invention. The averaged repetition period $T_{av}$(s) 330, and the averaged repetition frequency $f_{av}$(Hz) 331 obtained from this measurement are the same parameters as those in Eq.(16).

b-10) During the measurement of the averaged repetition frequency $f_{av}$ (Hz) 331 and the averaged repetition period $T_{av}$(s)330 of Pulsed Type Laser Source500, the First Photodiode120 measures the average photocurrent $I_{av}$(A)300 in FIG. 1 and FIG. 3, proportional to the average optical power $P_{av}$(W) 301 in FIG. 3, simultaneously as an advantage of this invention.

b-11) The resultant and averaged pulse energy $PE_{av}(f_{av})$ 840 in Eq.(16), as a function of the averaged repetition frequency $f_{av}$331, is calculated with the data series, $I_{av}(A)$ 300 obtained from "b-11", the repetition period $T_{av}(s)$ 330 obtained from "b-10", by considering $f_{-3dB}^{pd\_1}=1/(2\pi R_{eq}C_{eq})$=995222 Hz from the equivalent circuit171 of the First Photodiode120 in FIG. 3 and $R_{FCIS}^{\lambda}$ 320 obtained from the section of "a-) Determination of the spectral responsivity $R_{FCIS}^{\lambda}$ of FCIS based-LEMCS".

b-12) The maximum PW, $PW_{av}^{max} \leq 1.9 \times 10^{-4}$s corresponding to $PE_{av}^{max}$=100 mJ pulse energy for a maximum peak power $P_0^{max}$=522 W, which matches the peak power level $P_0$400 of Pulsed Type Laser Source500 in FIG. 2 which can be detected by the First Photodiode120 without saturation.

The ultimate limit parameters of Pulsed Type Laser Source500 to be measured by FCIS based-LEMCS111 for the maximum peak laser power of $P_0^{max}$=522 W in the invention are,

*minimum pulse width, $PW_{av}^{min} \cong 0.736$ ps, corresponding to $PE_{av}$840 of 384 µJ obtained from the pulse response characteristic $\zeta^{pd\_1}$ of the First Photodiode120, and

*minimum dead time, $DT_{av}^{min} \cong 1.7$ µs from the necessary time of sufficient heat dissipation inside the internal steel hemisphere110 as a target, which produces the minimum averaged repetition period of $T_{av}^{min}$ of 2.436 µs, corresponding to a maximum averaged repetition frequency $f_{av}^{max}$ of 410509 Hz.

In the measurement of the averaged pulse energy of Pulsed Type Laser Source500 lasing properly to the infinite pulse wave train given in FIG. 3 by means of FCIS based-LEMCS111, the compatibility of the beam sizes with Port_1101 and Port_3103 of FCIS100 of FCIS based-LEMCS111, and the permissible maximum energy level to be applied to FCIS based-LEMCS111 should be taken into account and the calculations and approaches given in this invention should be regarded. Pulse energies of Pulsed Type Laser Source500 operating in burst mode can be measured by FCIS based-LEMCS111 by applying the suitable integrating/averaging time settings of Electrometer119 in FIG. 1.

Figure 9B:
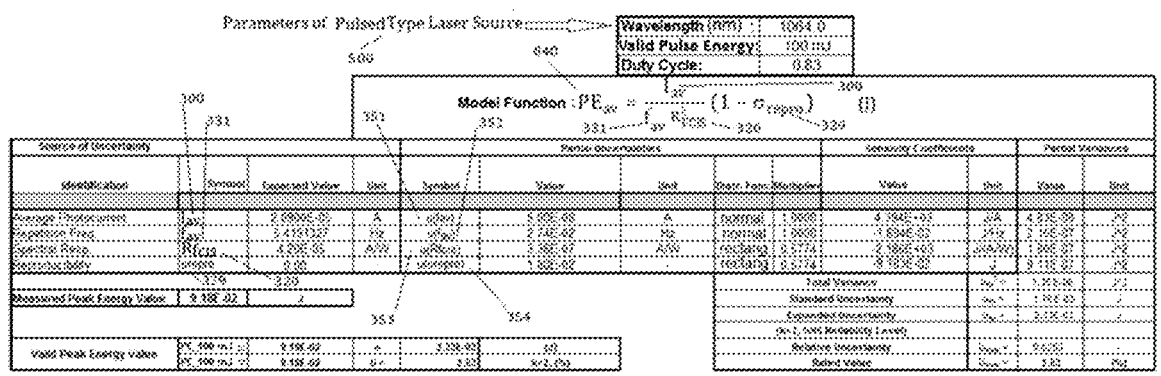
FIG. 9b. The uncertainty budget belonging to FCIS based-LEMCS for an averaged pulse energy $PE_{av}$ of 100 mj as a rated value.

In this section a brief uncertainty evaluation for FCIS based-LEMCS in this invention are introduced. This uncertainty analysis covers a pulse energy $PE_{av}$840 of 40 µj and pulse energy $PE_{av}$840 of 100 mJ for a Pulsed Type Laser Source500 lasing at 1549.0 nm ($f_{av}$32 500 Hz, Duty Cycle=0.5) and 1064.0 nm ($f_{av}$=5 Hz, Duty Cycle=0.83) respectively. For both averaged repetition frequencies $f_{av}$331 are very very smaller than $f_{-3dB}^{pd\_1}$=995222 Hz and athe frequency response term of Eq.(16), $$1 / \left(1+\left(\frac{f_{av}}{f_{-3dB}^{pd\_1}}\right)^2\right)^{1/2}$$

yields 1, so this term is not included in the uncertainty model function. The partial uncertainties of the uncertainty budgets given in FIG. 9a and FIG. 9b are $u(I_{av})$351, $u(f_{av})$352, $u(R_{FCIS})$353. These partial uncertainties includes the standard (combined) uncertainties coming from the traceable calibrations of Electrometer119, Time Interval Counter135 to primary level standards shown in FIG. 7, and the spectral responsivity determination $R_{FCIS}^{\lambda}$ 320 of FCIS100 of FCIS based-LEMCS111 against Optical Power Transfer Standard809 shown in FIG. 7 and FIG. 8. The inclusion of these standard uncertainties coming from the individual calibration of Electrometer119, Time Interval Counter135, and $R_{FCIS}^{\lambda}$ 320 in the individual and relevant partial uncertainty value, designated as $u(I_{av})$351, $u(f_{av})$352, $u(R_{FCIS})$353, is executed as root of summing of the squared values of the standards uncertainties. The largest uncertainty portion in both $u(I_{av})$351, and $u(f_{av})$352 is composed of the standard deviations during the measurement of the average photocurrent $I_{av}$300 generated by the First Photodiode120 in Eq.(16), and the measurement of the averaged repetition frequency $f_{av}$(Hz)331 (or repetition period $T_{av}$(s)330), which have normal type distribution functions (multiplier=1). Because $u(R_{FCIS})$353 is a predefined value obtained from the determination of $R_{FCIS}^{\lambda}$ 320 described in the section of "a-) Determination of the spectral responsivity $R_{FCIS}^{\lambda}$ of FCIS based-LEMCS", it is included in both of the uncertainty budgets as rectangular type distribution function (multiplier=1/$\sqrt{3}$). Regarding $u(\sigma_{repro})$354, which is named as the partial uncertainty in the error $\sigma_{repro}$329 in the measurement reproducibility of the averaged pulse energy of the pulsed type laser source; the error $\sigma_{repro}$329 in the measurement reproducibility is zero for perfect reproducibility in the uncertainty calculation. The partial uncertainty $u(\sigma_{repro})$354 in the error $\sigma_{repro}$329 of the measurement reproducibility of the averaged pulse energy $PE_{av}$840 is calculated by using the standard deviations of the averaged pulse energy $PE_{av}$840 values obtained from the successive positioning processes of FCIS100 of FCIS based-LEMCS111 opposed to the collimator of the Pulsed Type Laser Source at z=0.

c-) *Calibration of a Commercial Laser Energy Meter by using Chopped Type Laser Source in FCIS based-LEMS;*

In the numbering showing the steps to be applied, "c" shows that this measurement series belongs to the section of "c-) *Calibration of a Commercial Laser Energy Meter by using Chopped Type Loser Source in FCIS based-LEMS*" and numbers as 1, 2, and etc, shows the sequence number steps being applied, Superscript "_clem" shows the relevant parameter in the calibration of Commercial Laser Energy Meter999.

c-1) The complete setup demonstrated in FIG. 2, called as FCIS based-LEMCS111, is configured for traceable calibration of Commercial Laser Energy Meter999 by using Chopped Gaussian Laser Beams601 of Chopped Type Laser Source600, which are generated by means of the combination of DC Motor599 with a series chopper901-909 from CW Gaussian Laser Beam799 of CW Laser Source800, called four DFB lasers.

c-2) Depending on the measurement range of Commercial Laser Energy Meter999, the selections of the relevant chopper having a individual Duty Cycle322, repetition frequency f(Hz) 322, and the peak power $P_0$400 of Chopped Type Laser Source600 according to the Eq.(16).

c-3) CW Laser Source800 lasing at wavelength λ (nm) given in FIG. 2 is run and the CW Gaussian Laser Beam799 of CW Laser Source800 is oriented to Port_1101 of FCIS100 of FCIS based-LEMCS111 when DC Motor599 is not activated and so the chopper901-909 doesn't rotate.

c-4) The output powers of CW Gaussian Laser Beam799 of CW Laser Sources800 in FIG. 2 is reduced to a few mW level in order to guarantee eye safety together with eye protection equipments by using one of the suitable one of the neutral density filters, the optical densities of which extends to 2.5, which are located in front of the collimators of Single Mode Optical Fiber Patch Cord876 at z=0.

c-5) By using an IR viewer card having a compatible spectral range with that of CW Laser Source800, the CW Gaussian Laser Beam799 still at the output of the chopper901-909 in continuous regime, the power of which is reduced by means of a suitable neutral density filter, is centered on Port_1101 of FCIS100 of FCIS based-LEMCS111 by means of Alignment Combination162 in FIG. 2, The compatibilities and the relationships among the beam waists, the size of Port_1101, and the size of internal steel hemisphere110, emphasized in "Details of FCIS" subsection of "Description" section, is taken into account in this step.

c-6) As soon as the CW Gaussian Laser Beam799 entering, from the center point of Port_1101 of FCIS100 of FCIS based-LEMCS111 is fallen on the internal steel hemisphere110, the circular diameter of which is 13 mm shown as in FIG. 4, the Second Photodiode129 assembled with the internal steel hemisphere110 on Port_3103 of FCIS100 of FCIS based-LEMCS111 starts detecting the optical flux entering from Port_1101. At this step, DC Motor599 is not activated and the chopper901-909 doesn't rotate yet.

c-7) When the chopper901-909 doesn't rotate yet, and the maximization of the voltage output of Current to Voltage Converter127 combined to the Second Photodiode129 assembled with the internal steel hemisphere110 on Port_3103 of FCIS100 of FCIS based-LEMCS111 starting to detect the CW Gaussian Laser Beam799 entering from Port_1101 of FCIS100 of FCIS based-LEMCS111 is performed by means Alignment Combination162 and by tracking the screen of the Oscilloscope130 in real time. With this process in the invention, the measurement reproducibility for individual and independent pulse energy measurement is enhanced because the crest of CW Gaussian Laser Beam799 corresponding to the maximum irradiance level entering from Port_1101 is targeted on the same point defined by the Pin Hole110 of 0.1 mm, back of which 62.5 μm diameter core of Zr ferrule140 of HMS connector132 of the First MM Optical Fiber Patch. Cord150 is rest/located. The amplitude of the maximization voltage on the screen of the Oscilloscope130 is not important. What is important at this point is to obtain maximum voltage and maximum voltage is obtained when the crest of the maximum irradiance level of the CW Gaussian Laser Beam799 entering from Port_1101 collides on the center of Pin Hole109 of 0.1 mm, detailed in FIG. 5.

c-8) After completion of the maximization process, DC Motor599 in FIG. 2 is activated and the chopper901-909 begins to rotate, and Chopped Type Laser Source600 of FCIS based-LEMCM111 and Chopped Gaussian Laser Beams601 are available now. With beginning the rotation of the chopper901-909, the Second Photodiode129 assembled with internal steel hemisphere110 on Port_3103 of FCIS based-LEMCS111 starts to be directly used for time/frequency related measurements, the averaged repetition frequency $f_{av}^{ref\_clem}$843, the averaged repetition period $T_{av}^{ref\_clem}(s)$844, and the Duty Cycle, normalized to 1. The combination of CW Laser Source800 with the chopper901-909 in the invention provides the nine different Duty Cycles varying from 0.17 to 0.83 at any repetition frequency f (Hz)321 extending from 5 Hz to 2 kHz in the calibration processes of Commercial Laser Energy Meters999 by means of FCIS based-LEMCS111, traceable to primary level standards given in FIG. 7.

c-9) The voltage signal generated by the Second Photodiode129 assembled with the internal steel hemisphere110 on Port_3103 of FCIS100 of FCIS based-LEMCS111 is chopped instead of CW Gaussian Laser Beam799 and Chopped Gaussian Laser Beams601 generated by Chopped Type Laser Source600 of FCIS based-LEMCM111 are observed on the screen of the Oscilloscope130.

c-10) The time/frequency related parameters of Chopped Gaussian Laser Beams601 of Chopped Type Laser Source600, the reference and averaged pulse energy $PE_{av}^{ref\_clem}$845 of which is aimed to be measured, are directly measured and averaged, in real time, without the effect of time constant τ of FCIS100 of FCIS based-LEMCS111 and the effect of the pulse response $\zeta^{pd\_1}$ of the First Photodiode 120 by Time Interval Counter135 in FIG. 2, which is traceably calibrated to $^{133}$Cs (or $^{87}$Rb) Atomic Frequency Standard804 in FIG. 7, to which Current to Voltage Converter and the Second Photodiode129 is consecutively connected in the invention. The repetition period $T_{av}^{ref\_clem}(s)$ 844, and the repetition frequency $f_{av}^{ref\_clem}$ (Hz) 843 obtained from this measurement are the same parameters as those in. Eq.(16).

c-11) During the measurement of the averaged repetition frequency $f_{av}^{ref\_clem}$(Hz) 843 and the averaged repetition period $T_{av}^{ref\_clem}(s)$ 844 of the chopped Gaussian laser beams, the First Photodiode120 measures the average photocurrent $I_{av}^{ref\_clem}(A)$ 842 in FIG. 2, proportional to the average and reference pulse energy $PE_{av}^{ref\_clem}$845 in FIG. 2. The pulse energy is called as "the reference" because it will be measured by FCIS based-LEMCS111 and then the same pulse energy level $PE_{av}^{ref\_clem}$845 will be applied to Commercial Laser Energy Meter999 by substitution.

c-12) The resultant and the averaged and reference pulse energy $PE_{av}^{ref\_clem}(f_{av}^{ref\_clem})$ 845 in Eq.(28), as a function of the averaged repetition frequency $f_{av}^{ref\_clem}$(Hz)843, is calculated with the data series, $I_{av}^{ref\_clem}(A)$ 842 obtained from "c-11", the averaged repetition period $T_{av}^{ref\_clem}(s)$ obtained from "c-10", by considering $f_{-3dB}^{pd\_1}=1/(2\pi R_{eq}C_{eq})=995222$ Hz from the equivalent circuit171 of the First Photodiode120 in FIG. 3 and $R_{FCIS}^{\lambda}$320 obtained from the section of "a-) Determination of the spectral responsivity $R_{FCIS}^{\lambda}$ of MS based-LEMCS".

$$PE_{av}^{ref\_clem}(f_{av}^{ref\_clem}) = \frac{T_{av}^{ref\_clem} I_{av}^{ref\_clem}}{NR_{FCIS}^{\lambda}} \frac{1}{\left(1+\left(\frac{f_{av}^{ref\_clem}}{f_{-3dB}^{pd_1}}\right)^2\right)^{1/2}} \quad (28)$$

$$= \frac{I_{av}^{ref\_clem}}{f_{av}^{ref\_clem} NR_{FCIS}^{\lambda}} \frac{1}{\left(1+\left(\frac{f_{av}^{ref\_clem}}{f_{-3dB}^{pd_1}}\right)^2\right)^{1/2}}$$

Eq.(28), which is written for Chopped Type Laser Source600, is the same as Eq.(16), which is written for the calculation of the averaged pulse energy of Pulsed Type Laser Source. The calculated pulse energy $PE_{av}^{ref\_clem}(f_{av})$ 845 by means of FCIS based-LEMCS111 in unit of (J) will be the reference pulse energy $PE_{av}^{ref\_clem}(f_{av})$ 845 for Commercial Laser Energy Meters999 to be calibrated, which is determined fully traceably to primary level standards demonstrated in FIG. 7.

c-13) The sensitive surface of Commercial Laser Energy Meter999 shown as in FIG. 2, which is Input Port839, is directly and perpendicularly placed against the propagation way of the Chopped Gaussian Laser Beam601, the averaged and reference pulse energy $PE_{av}^{ref\_clem}(f_{av})$ 845 of which is determined from the steps specified from "c-1" to "c-12", which is called the reference averaged pulse energy. The readout of Commercial Laser Energy Meter999 is recorded as $PE^{clem}$841 in unit of J.

c-14) The linear calibration factor is calculated as, γ(λ, $f_{av}^{ref\_clem})=P_{av}^{ref\_clem}(f_{av})/PE^{clem}(f_{av})$, which is traceable to primary standards, in units of W, A, and s. $\gamma(\lambda, f_{av}^{ref\_clem})$945 is the linear calibration factor for Commercial Laser Energy Meter999.

FCIS based-LEMCS111 together with the calculations, the determination. of spectral responsivity method, the calibration method of Commercial Laser Energy Meter999 and the averaged pulse energy measurement method, all of which are given in the Section 3 and traceable to primary level standards shown in FIG. 7 herein, is one embodiment.

What is claimed is:

1. An apparatus of Fiber Coupled Integrating Sphere based-Laser Energy Meter and Calibration System (FCIS based-LEMCS) designed for measuring averaged pulse energy of a Pulsed Type Laser Source and for calibrating commercial laser energy meters comprising:

an integrating sphere, named as Fiber Coupled Integrating Sphere (FCIS) having Port_1, Port_2, and Port_3 on the same equatorial line, wherein the Port_1 is used as a port of incoming laser pulse having Gaussian Beam Profile, the Port_2 is used for measurement of average optical power port, and the Port_3 is used for measurement of time/frequency related parameter of the incoming laser pulse, in which an Internal Steel Hemisphere having a Pin Hole is placed, a group of continuous wave Laser Sources, emitting in Transverse Electromagnetic Mode, called continuous wave Gaussian Laser Beam, a group of circular choppers to be mounted on a shaft of direct current Motor having a rare earth doped magnet in order to construct a Chopped Type Laser Source generating a reference and averaged pulse energy, a mechanical attenuator used for protecting a Second Photodiode against high level of optical power, a first multimode optical fiber patch cord having on HMS connector with Zr ferrule at one end and FC/PC type connector with ceramic ferrule at another end, the Zr ferrule of the HMS connector of which is rest back side of the Pin Hole of the Internal Steel Hemisphere, a second multimode optical fiber patch cord having two FC/PC type connectors at both ends, a first photodiode, mounted on the Port_2, used to measure an averaged photocurrent proportional to averaged optical power of incoming laser pulses entering from the Port_1 of the FCIS, diffusely reflected from inner wall of the FCIS, the second photodiode, connected to the first multimode optical fiber optic patch cord through the second multimode optical fiber patch cord and the mechanical attenuator on the Port_2, used to measure time/frequency related parameters of incoming laser pulses without any influence of time constant of FCIS having diffusely inner coating due to directly seeing the incoming laser pulses entering from the Port_1, simultaneously enabling an averaged optical power measurement together with the first photodiode without any manual intervention, the Internal Steel Hemisphere, made of stainless steel, having the Pin Hole used for launching a portion of incoming laser pulses having Gaussian beam profile entering from the Port_1 of the FCIS into the Zr ferrule of HMS connector of the first multimode optical fiber patch cord by preventing excessive heating of internal optical fiber of the first multimode optical fiber patch cord, placed interior wall of the FCIS with an inclination of an angle of 25° with relative to laser entrance port, used for first directing laser reflections of the incoming laser pulses entering from the Port_1 towards the inner diffuse wall of the FCIS, used for capturing the incoming laser pulses entering from the Port_1, which improves a repeatability/reproducibility of optical alignment between Port_1 and optical path of the incoming laser pulses, used for the protection of the first photodiode from the high optical flux of incoming laser pulses by first reflecting towards diffusely coated inner wall of FCIS and used for protection of the second photodiode from the high optical flux of incoming laser pulses striking on the Pin Hole impeding the launch of whole of the incoming laser pulses entering from the Port_1 into the first multimode optical fiber patch cord, back side of which the Zr ferrule of the HMS connector of the first multimode optical fiber patch cord, another connector of which is connected to the second photodiode through the mechanical attenuator and the second fiber optic multimode optical fiber patch cord, directly seeing the Port_1 of the FCIS, to improve measurements of time/frequency related parameters with an averaged optical power measurement together with the first photodiode without any manual intervention and any influence of time constant of the FCIS having diffusely coated inner surface, an Optical Power Transfer Standard traceably calibrated against absolute optical watt standard, called Cryogenic Radiometer, an Electrometer, which is used for measuring an averaged photocurrent induced in the First Photodiode by an averaged optical power of the Gaussian Laser Beam entering in the integrating sphere through an entrance port, an Alignment Combination, a Current to Voltage Converter, a Time Interval Counter calibrated traceably to primary level Atomic Frequency Standard, and an oscilloscope.

2. The apparatus of claim 1 wherein the integrating sphere, the Internal Steel Hemisphere having the Pin Hole, the first photodiode, the second photodiode, the first multimode optical fiber patch cord having on HMS connector with Zr ferrule, the second multimode optical fiber patch cord, the electrometer, the alignment combination, the Current to Voltage Converter, the time interval counter, and the oscilloscope constitute the Fiber Coupled Integrating Sphere.

3. The apparatus of claim 2 wherein the group of continuous wave Laser Sources, emitting in Transverse Electromagnetic Mode the group of circular choppers to be mounted on a shaft of the direct current Motor having a rare earth doped magnet in order to construct a Chopped Type Laser Source generating a reference and averaged pulse energy constitutes a FCIS based-LEMCS.

4. The apparatus of claim 3 wherein an integrating sphere, which is made from Aluminum, has three ports settled on the same equator lime of the integrating sphere, a first port of which is called Port_1 used for entrance of the continuous wave Gaussian Laser Beam of the continuous wave Laser Source, for entrance of Chopped Gaussian Laser Beam of the Chopped Type Laser Source to be constructed with the combination of the continuous wave Laser Sources and the group of choppers to be mounted on a shaft of the DC Motor, and for entrance of Pulsed Gaussian Laser Beam of the Pulsed Type Laser Source, averaged pulse energy of which is measured by the FCIS, a second port of which is called Port_2 used for mounting the First Photodiode, a third port of which is called Port_3 used for placing the Internal Steel Hemisphere assembled with the Second Photodiode by a combination composed of the First Multimode Optical Fiber Patch Cord, the Mechanical Attenuator, and the Second Multimode Optical fiber Patch Cord.

5. The apparatus of claim 4 wherein the First Photodiode, which is mounted to the Port_2 of integrating sphere, generates an average photocurrent, which is proportional to average optical powers of the continuous wave Laser Sources, the "Chopped Type Laser Source" and the "Pulsed Type Laser Source", and which is necessary for calculating traceable and average pulse energies of the "Chopped Type Laser Source" and the "Pulsed Type Laser Source".

6. The apparatus of claim 5 wherein an Internal Steel Hemisphere, which is manufactured from stainless steel, is used for capturing and launching some portion the continuous wave Gaussian Laser Beams of the continuous wave Laser Sources, the Chopped Gaussian Laser Beams of the "Chopped Type Laser Source" and the "Pulsed Type Laser Source" entering in the integrating sphere, is used for launching some portion the continuous wave Gaussian Laser Beams of the continuous wave Laser Sources, the Chopped Gaussian Laser Beams of the "Chopped Type Laser Source" and the "Pulsed Type Laser Source" entering in the integrating sphere into the core of Zr ferrule of the First Multimode Optical Fiber Patch Cord placed and rest back of the Pin Hole at the center of Internal Steel Hemisphere, which constitutes an optical axis extending from the Port_1 to the Pin Hole for the continuous wave Gaussian Laser Beams of the continuous wave Laser Sources the Chopped Gaussian Laser Beams of the "Chopped Type Laser Source" and the Pulsed Gaussian Laser Beams of the "Pulsed Type Laser Source", and finally is also used for reflecting the continuous wave Gaussian Laser Beams of the continuous wave Laser Sources the Chopped Gaussian Laser Beams of the "Chopped Type Laser Source" and the Pulsed Gaussian Laser Beams of the "Pulsed Type Laser Source" entering in the integrating sphere through the Port_1 towards the same interior wall section of the integrating sphere, opposite to the First Photodiode.

7. The apparatus of claim 6 wherein the Second Photodiode is used for detecting the Pulsed Gaussian Laser Beams of "Pulsed Type Laser Source", and the continuous wave Gaussian Laser Beam of the continuous wave Laser Source used to establish the "Chopped Type Laser Source" along with the DC Motor when the optical axis of the "Pulsed Type Laser Source", or the optical axis of the continuous wave Laser Source used to construct "Chopped Type Laser Source with the DC Motor is coincided with the optical axis extending from Port_1 to the Pin Hole placed at the center of the internal Steel Hemisphere mounted on the Port_3 of the integrating sphere by tracking the maximum signal on the Oscilloscope screen before performing time and frequency measurements of the "Chopped Type Laser Source" and the "Pulsed Type Laser Source".

8. The apparatus of claim 7 wherein the Second Photodiode is used for measuring time/frequency parameters of the "Chopped Type Laser Source", and the "Pulsed Type Laser Source" after completion of coinciding the optical axis extending from Port_1 to the Pin Hole placed at the center of the Internal Steel Hemisphere mounted on the Port_3 of the integrating sphere with the optical axis of the "Pulsed Type Laser Source", and optical axis of the continuous wave Laser Source used to construct "Chopped Type Laser Source" along with the DC Motor.

9. The apparatus of claim 8 wherein each individual chopper of the group of circular choppers, which is able to be mounted to rotating shaft of the DC Motor having a rare earth doped magnet, and which has individual duty cycle, is used for constructing "Chopped Type Laser Source", which generates a reference and averaged pulse energy at any repetition frequency provided by DC Motor in order to carry out traceable average pulse energy calibration of Commercial Laser Energy Meters by the FCIS based-LEMCS.

10. The apparatus of claim 9 wherein the Alignment Combination, which is composed of three translational stages in three dimensions, a rotational stage and tilt mechanisms, all of which are capable of moving the integrating sphere called as FCIS, is used for aligning and coinciding the optical axis extending from the Port_1 to the Pin Hole placed at center of the Internal Steel Hemisphere in the FCIS with the optical axis of the Pulsed Gaussian Laser Beams of the "Pulsed Type Laser Source" and optical axis of the continuous wave Gaussian Laser Beams of the continuous wave Laser Source used for constructing "Chopped Type Laser Source".

11. The apparatus of claim 10 wherein the Current to Voltage Converter is used to convert photocurrent generated by the Second Photodiode into voltage in order to track maximum value of the voltage, which corresponds to direct collision of crest of continuous wave Gaussian Laser Beam or crest of the Pulsed Gaussian Laser Beam on the Pin Hole at the center of the Internal Steel Hemisphere, and which corresponds to fully coinciding the optical axis extending from the Port_1 to the Pin Hole placed at center of the Internal Steel Hemisphere in the FCIS with the optical axis of the Pulsed Gaussian Laser Beams of the "Pulsed Type Laser Source" and optical axis of the continuous wave Gaussian Laser Beams of the continuous wave Laser Source used for constructing "Chopped Type Laser Source", in real time.

12. The apparatus of claim 11 wherein the Current to Voltage Converter is also used to perform time/frequency related measurements belonging to the "Chopped Type Laser Source", and the "Pulsed Type Laser Source" entering in the integrating sphere, called as FCIS, through the Port_1, and is used to transfer the voltage to the oscilloscope after completion of coinciding and alignment processes of the optical axis of "Pulsed Type Laser Source", or the optical axis of the continuous wave Laser Source with the optical axis extending from the Port_1 to the Pin Hole at center of the Internal Steel Hemisphere placed in the FCIS.

13. The apparatus of claim 12 wherein the Oscilloscope is used to visually track time/frequency related voltage signals, which belong to the "Chopped Type Laser Source", and the "Pulsed Type Laser Source" entering in the integrating sphere, called as FCIS, through the Port_1 and which come from the Current to Voltage Converter in real time, and is also used to display the maximum value of the voltage, which corresponds to fully coinciding the optical axis extending from the Port_1 to the Pin Hole placed at center of the Internal Steel Hemisphere in the FCIS with the optical axis of the Pulsed Gaussian Laser Beams of the "Pulsed Type Laser Source" and optical axis of the continuous wave Gaussian Laser Beams of the continuous wave Laser Source used for constructing "Chopped Type Laser Source", in real time.

14. The apparatus of claim 13 wherein the Time Interval Counter, input of which is connected to output of the Current to Voltage Converter, is only used to carry out traceable average time/frequency related measurements of the "Pulsed. Type Laser Source" and the "Chopped Type Laser Source", which are necessary for calculating traceable and average pulse energies of the "Pulsed Type Laser Source" and the "Chopped Type Laser Source".

15. A method for determining spectral responsivity of a First Photodiode mounted to a Port_2 in an apparatus of Fiber Coupled Integrating Sphere based-Laser Energy Meter and Calibration System (FCIS based-LEMCS) designed for measuring averaged pulse energy of a Pulsed Type Laser Source and for calibrating commercial laser energy meters comprising:

an integrating sphere, named as Fiber Coupled Integrating Sphere (FCIS) having Port_1, Port_2, and Port_3 on the same equatorial line, wherein the Port_1 is used as a port of incoming laser pulse having Gaussian Beam Profile, the Port_2 is used for measurement of average optical power port, and the Port_3 is used for measurement of time/frequency related parameter of the incoming laser pulse, in which an Internal Steel Hemisphere having a Pin Hole is placed, a group of continuous wave Laser Sources, emitting in Transverse Electromagnetic Mode, called continuous wave Gaussian Laser Beam, a group of circular choppers to be mounted on a shaft of direct current Motor having a rare earth doped magnet in order to construct a Chopped Type Laser Source generating a reference and averaged pulse energy, a mechanical attenuator used for protecting a Second Photodiode against high level of optical power, a first multimode optical fiber patch cord having on HMS connector with Zr ferrule at one end and FC/PC type connector with ceramic ferrule at another end, the Zr ferrule of the HMS connector of which is rest back side of the Pin Hole of the Internal Steel Hemisphere, a second multimode optical fiber patch cord having two FC/PC type connectors at both ends, the first photodiode, mounted the Port_2, used to measure an averaged photocurrent proportional to averaged optical power of incoming laser pulses entering from the Port_1 of the FCIS, diffusely reflected from inner wall of the FCIS, the second photodiode, connected to the first multimode optical fiber optic patch cord through the second multimode optical fiber patch cord and the mechanical attenuator on the Port_2, used to measure time/frequency related parameters of incoming laser pulses without any influence of time constant of FCIS having diffusely inner coating due to directly seeing the incoming laser pulses entering from the Port_1, simultaneously enabling an averaged optical power measurement together with the first photodiode without any manual intervention, the Internal Steel Hemisphere, made of stainless steel, having the Pin Hole used for launching a portion of incoming laser pulses having Gaussian beam profile entering from the Port_1 of the FCIS into the Zr ferrule of HMS connector of the first multimode optical fiber patch cord by preventing excessive heating of internal optical fiber of the first multimode optical fiber patch cord, placed interior wall of the FCIS with an inclination of an angle of 25° with relative to laser entrance port, used for first directing laser reflections of the incoming laser pulses entering from the Port_1 towards the inner diffuse wall of the FCIS, used for capturing the incoming laser pulses entering from the Port_1, which improves a repeatability/reproducibility of optical alignment between Port_1 and optical path of the incoming laser pulses, used for the protection of the first photodiode from the high optical flux of incoming laser pulses by first reflecting towards diffusely coated inner wall of FCIS and used for protection of the second photodiode from the high optical flux of incoming laser pulses striking on the Pin Hole impeding the launch of whole of the incoming laser pulses entering from the Port_1 into the first multimode optical fiber patch cord, back side of which the Zr ferrule of the HMS connector of the first multimode optical fiber patch cord, another connector of which is connected to the second photodiode through the mechanical attenuator and the second fiber optic multimode optical fiber patch cord, directly seeing the Port_1 of the FCIS, to improve measurements of time/frequency related parameters with an averaged optical power measurement together with the first photodiode without any manual intervention and any influence of time constant of the FCIS having diffusely coated inner surface, an Optical Power Transfer Standard traceably calibrated against absolute optical watt standard, called Cryogenic Radiometer, an Electrometer, which is used for measuring an averaged photocurrent induced in the First Photodiode by an averaged optical power of the Gaussian Laser Beam entering in the integrating sphere through an entrance port, an Alignment Combination, a Current to Voltage Converter, a Time Interval Counter calibrated traceably to primary level Atomic Frequency Standard, and an oscilloscope;

wherein the integrating sphere, the Internal Steel Hemisphere having the Pin Hole, the first photodiode, the second photodiode, the first multimode optical fiber patch cord having on HMS connector with Zr ferrule, the second multimode optical fiber patch cord, the electrometer, the alignment combination, the Current to Voltage Converter, the time interval counter, and the oscilloscope constitute the Fiber Coupled Integrating Sphere;

wherein the group of continuous wave Laser Sources, emitting in Transverse Electromagnetic Mode, the group of circular choppers to be mounted on a shaft of the direct current Motor having a rare earth doped magnet in order to construct a Chopped Type Laser Source generating a reference and averaged pulse energy constitutes a FCIS based-LEMCS;

wherein the integrating sphere, which is made from Aluminum, has three ports settled on the same equator line of the integrating sphere, a first port of which is called Port _1 used for entrance of the continuous wave Gaussian Laser Beam of the continuous wave Laser Source, for entrance of Chopped Gaussian Laser Beam of the Chopped Type Laser Source to be constructed with the combination of the continuous wave Laser Sources and the group of choppers to be mounted on a shaft of the DC Motor, and for entrance of Pulsed Gaussian Laser Beam of the Pulsed Type Laser Source, averaged pulse energy of which is measured by the FCIS, a second port of which is called Port_2 used for mounting the First Photodiode, a third port of which is called Port_3 used for placing the Internal Steel Hemisphere assembled with the Second Photodiode by a combination composed of the first multimode optical fiber patch cord, the mechanical attenuator, and the second multimode optical fiber patch cord;

wherein the First Photodiode, which is mounted to the Port_2 of integrating sphere, generates an average photocurrent, which is proportional to average optical powers of the continuous wave Laser Sources, the Chopped Type Laser Source and the Pulsed Type Laser Source, and which is necessary for calculating traceable and average pulse energies of the Chopped Type Laser Source and the Pulsed Type Laser Source;

wherein the Internal Steel Hemisphere, which is manufactured from stainless steel, is used for capturing and launching some portion the continuous wave Gaussian Laser Beams of the continuous wave Laser Sources, the Chopped Gaussian Laser Beams of the Chopped Type Laser Source and the Pulsed Type Laser Source entering in the integrating sphere, is used for launching some portion the continuous wave Gaussian Laser Beams of the continuous wave Laser Sources, the Chopped Gaussian Laser Beams of the Chopped Type Laser Source and the Pulsed Type Laser Source entering in the integrating sphere into the core of Zr ferrule of the first multimode optical fiber patch cord placed and rest back of the Pin Hole at the center of Internal Steel Hemisphere, which constitutes an optical axis extending from the Port_1 to the Pin Hole for the continuous wave Gaussian Laser Beams of the continuous wave Laser Sources, the Chopped Gaussian Laser Beams of the Chopped Type Laser Source and the Pulsed Gaussian Laser Beams of the Pulsed Type Laser Source, and finally is also used for reflecting the continuous wave Gaussian Laser Beams of the continuous wave Laser Sources, the Chopped Gaussian Laser Beams of the Chopped Type Laser Source and the Pulsed Gaussian Laser Beams of the Pulsed Type Laser Source entering in the integrating sphere through the Port_1 towards the same interior wall section of the integrating sphere, opposite to the First Photodiode;

wherein the Second Photodiode is used for detecting the Pulsed Gaussian Laser Beams of Pulsed Type Laser Source, and the continuous wave Gaussian Laser Beam of the continuous wave Laser Source used to establish the Chopped Type Laser Source along with the DC Motor when the optical axis of the Pulsed Type Laser Source, or the optical axis of the continuous wave Laser Source used to construct Chopped Type Laser Source with the DC Motor is coincided with the optical axis extending from Port_1 to the Pin Hole placed at the center of the Internal Steel Hemisphere mounted on the Port_3 of the integrating sphere by tracking the maximum signal on the Oscilloscope screen before performing time and frequency measurements of the Chopped Type Laser Source and the Pulsed Type Laser Source;

wherein the Second Photodiode is used for measuring time/frequency parameters of the Chopped Type Laser Source, and the Pulsed Type Laser Source after completion of coinciding the optical axis extending from Port_1 to the Pin Hole placed at the center of the Internal Steel Hemisphere mounted on the Port_3 of the integrating sphere with the optical axis of the Pulsed Type Laser Source, and optical axis of the continuous wave Laser Source used to construct Chopped Type Laser Source along with the DC Motor;

wherein each individual chopper of the group of circular choppers, which is able to be mounted to rotating shaft of the DC Motor having a rare earth doped magnet, and which has individual duty cycle, is used for constructing Chopped Type Laser Source, which generates a reference and averaged pulse energy at any repetition frequency provided by DC Motor in order to carry out traceable average pulse energy calibration of Commercial Laser Energy Meters by the FCIS based-LEMCS;

wherein the Alignment Combination, which is composed of three translational stages in three dimensions, a rotational stage and tilt mechanisms, all of which are capable of moving the integrating sphere, called as FCIS, is used for aligning and coinciding the optical axis extending from the Port_1 to the Pin Hole placed at center of the Internal Steel Hemisphere in the FCIS with the optical axis of the Pulsed Gaussian Laser Beams of the Pulsed Type Laser Source and optical axis of the continuous wave Gaussian Laser Beams of the continuous wave Laser Source used for constructing Chopped Type Laser Source;

wherein the Current to Voltage Converter is used to convert photocurrent generated by the Second Photodiode into voltage in order to track maximum value of the voltage, which corresponds to direct collision of crest of continuous wave Gaussian Laser Beam or crest of the Pulsed Gaussian Laser Beam on the Pin Hole at the center of the Internal Steel Hemisphere, and which corresponds to fully coinciding the optical axis extending from the Port_1 to the Pin Hole placed at center of the Internal Steel Hemisphere in the FCIS with the optical axis of the Pulsed Gaussian Laser Beams of the Pulsed Type Laser Source and optical axis of the continuous wave Gaussian Laser Beams of the continuous wave Laser Source used for constructing Chopped Type Laser Source, in real time;

wherein the Current to Voltage Converter is also used to perform time/frequency related measurements belonging to the Chopped Type Laser Source, and the Pulsed Type Laser Source entering in the integrating sphere, called as FCIS, through the Port_1, and is used to transfer the voltage to the oscilloscope after completion of coinciding and alignment processes of the optical axis of Pulsed Type Laser Source, or the optical axis of the continuous wave Laser Source with the optical axis extending from the Port_1 to the Pin Hole at center of the Internal Steel Hemisphere placed in the FCIS;

wherein the Oscilloscope is used to visually track time/frequency related voltage signals, which belong to the Chopped Type Laser Source, and the Pulsed Type Laser Source entering in the integrating sphere, called as FCIS, through the Port_1 and which come from the Current to Voltage Converter in real time, and is also used to display the maximum value of the voltage, which corresponds to fully coinciding the optical axis extending from the Port_1 to the Pin Hole placed at center of the Internal Steel Hemisphere in the FCIS with the optical axis of the Pulsed Gaussian Laser Beams of the Pulsed Type Laser Source and optical axis of the continuous wave Gaussian Laser Beams of the continuous wave Laser Source used for constructing Chopped Type Laser Source, in real time;

wherein the Time Interval Counter, input of which is connected to output of the Current to Voltage Converter, is only used to carry out traceable average time/frequency related measurements of the Pulsed Type Laser Source and the Chopped Type Laser Source, which are necessary for calculating traceable and average pulse energies of the Pulsed Type Laser Source and the Chopped Type Laser Source;

the method comprising the following steps:

individually running of each of a group of continuous wave Laser Sources in continuous wave regime emitting in Transverse Electromagnetic Mode, called Gaussian laser beam, coinciding of optical axis of individual continuous wave Gaussian Laser Beam of each of a CW Laser Sources with an optical axis extending from the Port_1 to the Pin Hole at center of the Internal Steel Hemisphere placed in the FCIS, real time tracking and maximization of voltage output of the Current to Voltage Converter, which converts the photocurrent of the Second Photodiode into the voltage output, on the oscilloscope screen by the Alignment Combination as long as the coinciding process continues, after completion of maximization of the voltage output of the Current to Voltage Converter, measurement of averaged photocurrent the First Photodiode of the FCIS, which produces an averaged photocurrent proportional to average optical power of individual continuous wave Gaussian Laser Beam of any of the continuous wave Laser Sources, application of individual continuous wave Gaussian Laser Beam of each of the continuous wave Laser Sources, which causes the First Photodiode to generate an average photocurrent for a single wavelength, to the Optical Power Transfer Standard in order to obtain exact optical power level of individual continuous wave Gaussian Laser Beam of each of the continuous wave Laser Sources in W, which is traceable to cryogenic radiometer, calculation of spectral responsivity of the First Photodiode, which is mounted to the Port_2 of the FCIS, by rationing the averaged photocurrent of the First Photodiode to the optical power level of CW Gaussian Laser Beam of each of the CW Laser Sources measured by the Optical Power Transfer Standard.

16. The method of claim 15 wherein each of the group of continuous wave Laser Sources in continuous wave regime is first individually run, which corresponds to determination of spectral responsivity for single wavelength and which is repeated for different wavelengths, second, optical axis of individual Gaussian Laser Beam of each of the continuous wave Laser Sources is coincided with the optical axis extending from the Port_1 to the Pin Hole at center of the Internal Steel Hemisphere placed in the FCIS by the Alignment Combination, third, the voltage output of the Current to Voltage Converter combined to the Second Photodiode mounted to the Port_3 of the internal Steel Hemisphere on Port_3 of the FCIS is maximized by using the Alignment Combination and by tracking the Oscilloscope screen in real time, fourth, after completion of maximization of the voltage output of the Second Photodiode mounted to the Port_3 of the Internal Steel Hemisphere on Port_3 of the FCIS, the averaged photocurrent the First Photodiode, which produces an averaged photocurrent proportional to average optical power of individual continuous wave Gaussian Laser Beam of any of the continuous wave Laser Sources, is measured by the Electrometer, fifth the same individual continuous wave Gaussian Laser Beam of each of the continuous wave Laser Sources, which causes the First Photodiode to generate an average photocurrent for a single wavelength, is applied to the Optical Power Transfer Standard in order to obtain exact optical power level of individual continuous wave Gaussian Laser Beam of each of the continuous wave Laser Sources in W, which is traceable to cryogenic radiometer, sixth spectral responsivity of the First Photodiode, which is mounted to the Port_2 of the FCIS, by proportioning the averaged photocurrent of the First Photodiode of claim 5, which is measured by the Electrometer, to the optical power level of individual continuous wave Gaussian Laser Beam of each of the continuous wave Laser Sources which is measured by the Optical Power Transfer Standard in W.

17. A method of measuring an averaged pulse energy of a Pulsed Type Laser Source in an apparatus of Fiber Coupled Integrating Sphere based-Laser Energy Meter and Calibration System (FCIS based-LEMCS) designed for measuring averaged pulse energy of a Pulsed Type Laser Source and for calibrating commercial laser energy meters comprising:

an integrating sphere, named as Fiber Coupled Integrating Sphere (FCIS) having Port_1, Port_2, and Port_3 on the same equatorial line, wherein the Port_1 is used as a port of incoming laser pulse having Gaussian Beam Profile, the Port_2 is used for measurement of average optical power port, and the Port_3 is used for measurement of time/frequency related parameter of the incoming laser pulse, in which an Internal Steel Hemisphere having a Pin Hole is placed, a group of continuous wave Laser Sources, emitting in Transverse Electromagnetic Mode, called continuous wave Gaussian Laser Beam, a group of circular choppers to be mounted on a shaft of direct current Motor having a rare earth doped magnet in order to construct a Chopped Type Laser Source generating a reference and averaged pulse energy, mechanical attenuator used for protecting a Second Photodiode against high level of optical power, a first multimode optical fiber patch cord having on HMS connector with Zr ferrule at one end and FC/PC type connector with ceramic ferrule at another end, the Zr ferrule of the HMS connector of which is rest back side of the Pin Hole of the Internal Steel Hemisphere, a second multimode optical fiber patch cord having two FC/PC type connectors at both ends, a first photodiode, mounted the Port_2, used to measure an averaged photocurrent proportional to averaged optical power of incoming laser pulses entering from the Port_1 of the FCIS, diffusely reflected from inner wall of the FCIS, the second photodiode, connected to the first multimode optical fiber optic patch cord through the second multimode optical fiber patch cord and the mechanical attenuator on the Port_2, used to measure time/frequency related parameters of incoming laser pulses without any influence of time constant of FCIS having diffusely inner coating due to directly seeing the incoming laser pulses entering from the Port_1, simultaneously enabling an averaged optical power measurement together with the first photodiode without any manual intervention, the Internal Steel Hemisphere, made of stainless steel, having the Pin Hole used for launching a portion of incoming laser pulses having Gaussian beam profile entering from the Port_1 of the FCIS into the Zr ferrule of HMS connector of the first multimode optical fiber patch cord by preventing excessive heating of internal optical fiber of the first multimode optical fiber patch cord, placed interior wall of the FCIS with an inclination of an angle of 25° with relative to laser entrance port, used for first directing laser reflections of the incoming laser pulses entering from the Port_1 towards the inner diffuse wall of the FCIS, used for capturing the incoming laser pulses entering from the Port_1, which improves a repeatability/reproducibility of optical alignment between Port_1 and optical path of the incoming laser pulses, used for the protection of the first photodiode from the high optical flux of incoming laser pulses by first reflecting towards diffusely coated inner wall of FCIS and used for protection of the second photodiode from the high optical flux of incoming laser pulses striking on the Pin Hole impeding the launch of whole of the incoming laser pulses entering from the Port_1 into the first multimode optical fiber patch cord, back side of which the Zr ferrule of the HMS connector of the first multimode optical fiber patch cord, another connector of which is connected to the second photodiode through the mechanical attenuator and the second fiber optic multimode optical fiber patch cord, directly seeing the Port_1 of the FCIS, to improve measurements of time/frequency related parameters with an averaged optical power measurement together with the first photodiode without any manual intervention and any influence of time constant of the FCIS having diffusely coated inner surface, an Optical Power Transfer Standard traceably calibrated against absolute optical watt standard, called Cryogenic Radiometer, an Electrometer, which is used for measuring an averaged photocurrent induced in the First Photodiode by an averaged optical power of the Gaussian Laser Beam entering in the integrating sphere through an entrance port, an Alignment Combination, a Current to Voltage Converter, a Time Interval Counter calibrated traceably to primary level Atomic Frequency Standard, and an oscilloscope;

wherein the integrating sphere, the Internal Steel Hemisphere having the Pin Hole, the first photodiode, the second photodiode, the first multimode optical fiber patch cord having on HMS connector with Zr ferrule, the second multimode optical fiber patch cord, the electrometer, the alignment combination, the Current to Voltage Converter, the time interval counter, and the oscilloscope constitute the Fiber Coupled Integrating Sphere;

wherein the group of continuous wave Laser Sources, emitting in Transverse Electromagnetic Mode, the group of circular choppers to be mounted on a shaft of the direct current Motor having a rare earth doped magnet in order to construct a Chopped Type Laser Source generating a reference and averaged pulse energy constitutes a FCIS based-LEMCS;

wherein the integrating sphere, which is made from Aluminum, has three ports settled on the same equator line of the integrating sphere, a first port of which is called Port_1 used for entrance of the continuous wave Gaussian Laser Beam of the continuous wave Laser Source, for entrance of Chopped Gaussian Laser Beam of the Chopped Type Laser Source to be constructed with the combination of the continuous wave Laser Sources and the group of choppers to be mounted on a shaft of the DC Motor, and for entrance of Pulsed Gaussian Laser Beam of the Pulsed Type Laser Source, averaged pulse energy of which is measured by the FCIS, a second port of which is called Port_2 used for mounting the First Photodiode, a third port of which is called Port_3 used for placing the Internal Steel Hemisphere assembled with the Second Photodiode by a combination composed of the first multimode optical fiber patch cord, the mechanical attenuator, and the second multimode optical fiber patch cord;

wherein the First Photodiode, which is mounted to the Port_2 of integrating sphere, generates an average photocurrent, which is proportional to average optical powers of the continuous wave Laser Sources, the Chopped Type Laser Source and the Pulsed Type Laser Source, and which is necessary for calculating traceable and average pulse energies of the Chopped Type Laser Source and the Pulsed Type Laser Source;

wherein the Internal Steel Hemisphere, which is manufactured from stainless steel, is used for capturing and launching some portion the continuous wave Gaussian Laser Beams of the continuous wave Laser Sources, the Chopped Gaussian Laser Beams of the Chopped Type Laser Source and the Pulsed Type Laser Source entering in the integrating sphere, is used for launching some portion the continuous wave Gaussian Laser Beams of the continuous wave Laser Sources, the Chopped Gaussian Laser Beams of the Chopped Type Laser Source and the Pulsed Type Laser Source entering in the integrating sphere into the core of Zr ferrule of the first multimode optical fiber patch cord placed and rest back of the Pin Hole at the center of Internal Steel Hemisphere, which constitutes an optical axis extending from the Port_1 to the Pin Hole for the continuous wave Gaussian Laser Beams of the continuous wave Laser Sources, the Chopped Gaussian Laser Beams of the Chopped Type Laser Source and the Pulsed Gaussian Laser Beams of the Pulsed Type Laser Source, and finally is also used for reflecting the continuous wave Gaussian Laser Beams of the continuous wave Laser Sources, the Chopped Gaussian Laser Beams of the Chopped Type Laser Source and the Pulsed Gaussian Laser Beams of the Pulsed Type Laser Source entering in the integrating sphere through the Port_1 towards the same interior wall section of the integrating sphere, opposite to the First Photodiode;

wherein the Second Photodiode is used for detecting the Pulsed Gaussian Laser Beams of Pulsed Type Laser Source, and the continuous wave Gaussian Laser Beam of the continuous wave Laser Source used to establish the Chopped Type Laser Source along with the DC Motor when the optical axis of the Pulsed Type Laser Source, or the optical axis of the continuous wave Laser Source used to construct Chopped Type Laser Source with the DC Motor is coincided with the optical axis extending from Port_1 to the Pin Hole placed at the center of the Internal Steel Hemisphere mounted on the Port_3 of the integrating sphere by tracking the maximum signal on the Oscilloscope screen before performing time and frequency measurements of the Chopped Type Laser Source and the Pulsed Type Laser Source;

wherein the Second Photodiode is used for measuring time/frequency parameters of the Chopped Type Laser Source, and the Pulsed Type Laser Source after completion of coinciding the optical axis extending from Port_1 to the Pin Hole placed at the center of the Internal Steel Hemisphere mounted on the Port_3 of the integrating sphere with the optical axis of the Pulsed Type Laser Source, and optical axis of the continuous wave Laser Source used to construct Chopped Type Laser Source along with the DC Motor;

wherein each individual chopper of the group of circular choppers, which is able to be mounted to rotating shaft of the DC Motor having a rare earth doped magnet, and which has individual duty cycle, is used for constructing Chopped Type Laser Source, which generates a reference and averaged pulse energy at any repetition frequency provided by DC Motor in order to carry out traceable average pulse energy calibration of Commercial Laser Energy Meters by the FCIS based-LEMCS;

wherein the Alignment Combination, which is composed of three translational stages in three dimensions, a rotational stage and tilt mechanisms, all of which are capable of moving the integrating sphere, called as FCIS, is used for aligning and coinciding the optical axis extending from the Port_1 to the Pin Hole placed at center of the Internal Steel Hemisphere in the FCIS with the optical axis of the Pulsed Gaussian Laser Beams of the Pulsed Type Laser Source and optical axis of the continuous wave Gaussian Laser Beams of the continuous wave Laser Source used for constructing Chopped Type Laser Source;

wherein the Current to Voltage Converter is used to convert photocurrent generated by the Second Photodiode into voltage in order to track maximum value of the voltage, which corresponds to direct collision of crest of continuous wave Gaussian Laser Beam or crest of the Pulsed Gaussian Laser Beam on the Pin Hole at the center of the Internal Steel Hemisphere, and which corresponds to fully coinciding the optical axis extending from the Port_1 to the Pin Hole placed at center of the Internal Steel Hemisphere in the FCIS with the optical axis of the Pulsed Gaussian Laser Beams of the Pulsed Type Laser Source and optical axis of the continuous wave Gaussian Laser Beams of the continuous wave Laser Source used for constructing Chopped Type Laser Source, in real time;

wherein the Current to Voltage Converter is also used to perform time/frequency related measurements belonging to the Chopped Type Laser Source, and the Pulsed Type Laser Source entering in the integrating sphere, called as FCIS, through the Port_1, and is used to transfer the voltage to the oscilloscope after completion of coinciding and alignment processes of the optical axis of Pulsed Type Laser Source, or the optical axis of the continuous wave Laser Source with the optical axis extending from the Port_1 to the Pin Hole at center of the Internal Steel Hemisphere placed in the FCIS;

wherein the Oscilloscope is used to visually track time/frequency related voltage signals, which belong to the Chopped Type Laser Source, and the Pulsed Type Laser Source entering in the integrating sphere, called as FCIS, through the Port_1 and which come from the Current to Voltage Converter in real time, and is also used to display the maximum value of the voltage, which corresponds to fully coinciding the optical axis extending from the Port_1 to the Pin Hole placed at center of the Internal Steel Hemisphere in the FCIS with the optical axis of the Pulsed Gaussian Laser Beams of the Pulsed Type Laser Source and optical axis of the continuous wave Gaussian Laser Beams of the continuous wave Laser Source used for constructing Chopped Type Laser Source, in real time;

wherein the Time Interval Counter, input of which is connected to output of the Current to Voltage Converter, is only used to carry out traceable average time/frequency related measurements of the Pulsed Type Laser Source and the Chopped Type Laser Source, which are necessary for calculating traceable and average pulse energies of the Pulsed Type Laser Source and the Chopped Type Laser Source;

the method comprising the following steps:

perpendicularly placement of the Pulsed Type Laser Source opposite Port_1 of the FCIS of FCIS based-LEMCS, coinciding of optical axis of the Pulsed Type Laser Source with the optical axis extending from the Port_1 to the Pin Hole at center of the Internal Steel Hemisphere placed in the FCIS by the Alignment Combination, real time tracking and maximization of pulsed voltage output of the Current to Voltage Converter, which converts pulsed photocurrent of the Second Photodiode against Pulsed Gaussian Laser Beam of the Pulsed Type Laser Source into the pulsed type voltage, on the oscilloscope screen by the Alignment Combination, as long as the coinciding process continues, measurement of averaged time/frequency related parameter of the Pulsed Gaussian Laser Beam of the Pulsed Type Laser Source by the Time Interval Counter, to which the Second Photodiode is connected, through the Current to Voltage Converter, measurement of averaged photocurrent of the first photodiode, which is proportional to averaged power of the Pulsed Gaussian Laser Beam of the Pulsed Type Laser Source, by the Electrometer, which is used to read out the averaged photocurrent of the first photodiode, calculation of resultant averaged pulse energy of the Pulsed Gaussian Laser Beam of the Pulsed Type Laser Source by using spectral responsivity determined in the method, which is the identical to spectra of the Pulsed Type Laser Source, the averaged time/frequency related parameter, and the averaged photocurrent of the first photodiode.

18. The method of claim 17 wherein first the Pulsed Type Laser Source, averaged pulse energy of which is to be measured, is perpendicularly placed against Port_1 of FCIS, second, optical axis of Pulsed Gaussian Laser Beam of the Pulsed Type Laser Source is coincided with the optical axis extending from the Port_1 to the Pin Hole at center of the Internal Steel Hemisphere placed in the FCIS by the Alignment Combination, third, the pulsed type voltage outputs of the Current to Voltage Converter combined to the Second Photodiode mounted to Port_3 of the FCIS of the Internal Steel Hemisphere, corresponding to peak powers of the Pulsed Type Laser Source, is maximized by using the Alignment Combination and by tracking the pulsed type voltage outputs of the Current to Voltage Converter on the Oscilloscope screen in real time, fourth, the averaged time/frequency related parameter of the Pulsed Gaussian Laser Beam of the Pulsed Type Laser Source is measured by the Time Interval Counter, to which output of the Current to Voltage Converter is connected to the Second Photodiode, fifth, the averaged photocurrent of the first photodiode, which is proportional to averaged power of the Pulsed Gaussian Laser Beam of the Pulsed Type Laser Source, is measured in averaging mode simultaneously by the Electrometer, which is used to read out the averaged photocurrent of the first photodiode, and sixth, resultant averaged pulse energy of the Pulsed Gaussian Laser Beam of the Pulsed Type Laser Source is calculated by using spectral responsivity determined in the first method, which is the identical to spectra of the Pulsed Type Laser Source, the averaged time/frequency related parameter, and the averaged photocurrent of the first photodiode.

19. A method for calibrating a Commercial Laser Energy Meter by an apparatus of Fiber Coupled Integrating Sphere based-Laser Energy Meter and Calibration System (FCIS based-LEMCS) designed for measuring averaged pulse energy of a Pulsed Type Laser Source and for calibrating commercial laser energy meters comprising:

an integrating sphere, named as Fiber Coupled Integrating Sphere (FCIS) having Port_1, Port_2, and Port_3 on the same equatorial line, wherein the Port_1 is used as a port of incoming laser pulse having Gaussian Beam Profile, the Port_2 is used for measurement of average optical power port, and the Port_3 is used for measurement of time/frequency related parameter of the incoming laser pulse, in which an Internal Steel Hemisphere having a Pin Hole is placed, a group of continuous wave Laser Sources, emitting in Transverse Electromagnetic Mode, called continuous wave Gaussian Laser Beam, a group of circular choppers to be mounted on a shaft of direct current Motor having a rare earth doped magnet in order to construct a Chopped Type Laser Source generating a reference and averaged pulse energy, a mechanical attenuator used for protecting a Second Photodiode against high level of optical power, a first multimode optical fiber patch cord having on HMS connector with Zr ferrule at one end and FC/PC type connector with ceramic ferrule at another end, the Zr ferrule of the HMS connector of which is rest back side of the Pin Hole of the Internal Steel Hemisphere, a second multimode optical fiber patch cord having two FC/PC type connectors at both ends, a first photodiode, mounted the Port_2, used to measure an averaged photocurrent proportional to averaged optical power of incoming laser pulses entering from the Port_1 of the FCIS, diffusely reflected from inner wall of the FCIS, the second photodiode, connected to the first multimode optical fiber optic patch cord through the second multimode optical fiber patch cord and the mechanical attenuator on the Port_2, used to measure time/frequency related parameters of incoming laser pulses without any influence of time constant of FCIS having diffusely inner coating due to directly seeing the incoming laser pulses entering from the Port_1, simultaneously enabling an averaged optical power measurement together with the first photodiode without any manual intervention, the Internal Steel Hemisphere, made of stainless steel, having the Pin Hole used for launching a portion of incoming laser pulses having Gaussian beam profile entering from the Port_1 of the FCIS into the Zr ferrule of HMS connector of the first multimode optical fiber patch cord by preventing excessive heating of internal optical fiber of the first multimode optical fiber patch cord, placed interior wall of the FCIS with an inclination of an angle of 25° with relative to laser entrance port, used for first directing laser reflections of the incoming laser pulses entering from the Port_1 towards the inner diffuse wall of the FCIS, used for capturing the incoming laser pulses entering from the Port_1, which improves a repeatability/reproducibility of optical alignment between Port_1 and optical path of the incoming laser pulses, used for the protection of the first photodiode from the high optical flux of incoming laser pulses by first reflecting towards diffusely coated inner wall of FCIS and used for protection of the second photodiode from the high optical flux of incoming laser pulses striking on the Pin Hole impeding the launch of whole of the incoming laser pulses entering from the Port_1 into the first multimode optical fiber patch cord, back side of which the Zr ferrule of the HMS connector of the first multimode optical fiber patch cord, another connector of which is connected to the second photodiode through the mechanical attenuator and the second fiber optic multimode optical fiber patch cord, directly seeing the Port_1 of the FCIS, to improve measurements of time/frequency related parameters with an averaged optical power measurement together with the first photodiode without any manual intervention and any influence of time constant of the FCIS having diffusely coated inner surface, an Optical Power Transfer Standard traceably calibrated against absolute optical watt standard, called Cryogenic Radiometer, an Electrometer, which is used for measuring an averaged photocurrent induced in the First Photodiode by an averaged optical power of the Gaussian Laser Beam entering in the integrating sphere through an entrance port, an Alignment Combination, a Current to Voltage Converter, a Time Interval Counter calibrated traceably to primary level Atomic Frequency Standard, and an oscilloscope;

wherein the integrating sphere, the Internal Steel Hemisphere having the Pin Hole, the first photodiode, the second photodiode, the first multimode optical fiber patch cord having on HMS connector with Zr ferrule, the second multimode optical fiber patch cord, the electrometer, the alignment combination, the Current to Voltage Converter, the time interval counter, and the oscilloscope constitute the Fiber Coupled Integrating Sphere;

wherein the group of continuous wave Laser Sources, emitting in Transverse Electromagnetic Mode, the group of circular choppers to be mounted on a shaft of the direct current Motor having a rare earth doped magnet in order to construct a Chopped Type Laser Source generating a reference and averaged pulse energy constitutes a FCIS based-LEMCS;

wherein the integrating sphere, which is made from Aluminum, has three ports settled on the same equator line of the integrating sphere, a first port of which is called Port_1 used for entrance of the continuous wave Gaussian Laser Beam of the continuous wave Laser Source, for entrance of Chopped Gaussian Laser Beam of the Chopped Type Laser Source to be constructed with the combination of the continuous wave Laser Sources and the group of choppers to be mounted on a shaft of the DC Motor, and for entrance of Pulsed Gaussian Laser Beam of the Pulsed Type Laser Source, averaged pulse energy of which is measured by the FCIS, a second port of which is called Port_2 used for mounting the First Photodiode, a third port of which is called Port_3 used for placing the Internal Steel Hemisphere assembled with the Second Photodiode by a combination composed of the first multimode optical fiber patch cord, the mechanical attenuator, and the second multimode optical fiber patch cord;

wherein the First Photodiode, which is mounted to the Port_2 of integrating sphere, generates an average photocurrent, which is proportional to average optical powers of the continuous wave Laser Sources, the Chopped Type Laser Source and the Pulsed Type Laser Source, and which is necessary for calculating traceable and average pulse energies of the Chopped Type Laser Source and the Pulsed Type Laser Source;

wherein the Internal Steel Hemisphere, which is manufactured from stainless steel, is used for capturing and launching some portion the continuous wave Gaussian Laser Beams of the continuous wave Laser Sources, the Chopped Gaussian Laser Beams of the Chopped Type Laser Source and the Pulsed Type Laser Source entering in the integrating sphere, is used for launching some portion the continuous wave Gaussian Laser Beams of the continuous wave Laser Sources, the Chopped Gaussian Laser Beams of the Chopped Type Laser Source and the Pulsed Type Laser Source entering in the integrating sphere into the core of Zr ferrule of the first multimode optical fiber patch cord placed and rest back of the Pin Hole at the center of Internal Steel Hemisphere, which constitutes an optical axis extending from the Port_1 to the Pin Hole for the continuous wave Gaussian Laser Beams of the continuous wave Laser Sources, the Chopped Gaussian Laser Beams of the Chopped Type Laser Source and the Pulsed Gaussian Laser Beams of the Pulsed Type Laser Source, and finally is also used for reflecting the continuous wave Gaussian Laser Beams of the continuous wave Laser Sources, the Chopped Gaussian Laser Beams of the Chopped Type Laser Source and the Pulsed Gaussian Laser Beams of the Pulsed Type Laser Source entering in the integrating sphere through the Port_1 towards the same interior wall section of the integrating sphere, opposite to the First Photodiode;

wherein the Second Photodiode is used for detecting the Pulsed Gaussian Laser Beams of Pulsed Type Laser Source, and the continuous wave Gaussian Laser Beam of the continuous wave Laser Source used to establish the Chopped Type Laser Source along with the DC Motor when the optical axis of the Pulsed Type Laser Source, or the optical axis of the continuous wave Laser Source used to construct Chopped Type Laser Source with the DC Motor is coincided with the optical axis extending from Port_1 to the Pin Hole placed at the center of the Internal Steel Hemisphere mounted on the Port_3 of the integrating sphere by tracking the maximum signal on the Oscilloscope screen before performing time and frequency measurements of the Chopped Type Laser Source and the Pulsed Type Laser Source;

wherein the Second Photodiode is used for measuring time/frequency parameters of the Chopped Type Laser Source, and the Pulsed Type Laser Source after completion of coinciding the optical axis extending from Port_1 to the Pin Hole placed at the center of the Internal Steel Hemisphere mounted on the Port_3 of the integrating sphere with the optical axis of the Pulsed Type Laser Source, and optical axis of the continuous wave Laser Source used to construct Chopped Type Laser Source along with the DC Motor;

wherein each individual chopper of the group of circular choppers, which is able to be mounted to rotating shaft of the DC Motor having a rare earth doped magnet, and which has individual duty cycle, is used for constructing Chopped Type Laser Source, which generates a reference and averaged pulse energy at any repetition frequency provided by DC Motor in order to carry out traceable average pulse energy calibration of Commercial Laser Energy Meters by the FCIS based-LEMCS;

wherein the Alignment Combination, which is composed of three translational stages in three dimensions, a rotational stage and tilt mechanisms, all of which are capable of moving the integrating sphere, called as FCIS, is used for aligning and coinciding the optical axis extending from the Port_1 to the Pin Hole placed at center of the Internal Steel Hemisphere in the FCIS with the optical axis of the Pulsed Gaussian Laser Beams of the Pulsed Type Laser Source and optical axis of the continuous wave Gaussian Laser Beams of the continuous wave Laser Source used for constructing Chopped Type Laser Source;

wherein the Current to Voltage Converter is used to convert photocurrent generated by the Second Photodiode into voltage in order to track maximum value of the voltage, which corresponds to direct collision of crest of continuous wave Gaussian Laser Beam or crest of the Pulsed Gaussian Laser Beam on the Pin Hole at the center of the Internal Steel Hemisphere, and which corresponds to fully coinciding the optical axis extending from the Port_1 to the Pin Hole placed at center of the Internal Steel Hemisphere in the FCIS with the optical axis of the Pulsed Gaussian Laser Beams of the Pulsed Type Laser Source and optical axis of the continuous wave Gaussian Laser Beams of the continuous wave Laser Source used for constructing Chopped Type Laser Source, in real time;

wherein the Current to Voltage Converter is also used to perform time/frequency related measurements belonging to the Chopped Type Laser Source, and the Pulsed Type Laser Source entering in the integrating sphere, called as FCIS, through the Port_1, and is used to transfer the voltage to the oscilloscope after completion of coinciding and alignment processes of the optical axis of Pulsed Type Laser Source, or the optical axis of the continuous wave Laser Source with the optical axis extending from the Port_1 to the Pin Hole at center of the Internal Steel Hemisphere placed in the FCIS;

wherein the Oscilloscope is used to visually track time/frequency related voltage signals, which belong to the Chopped Type Laser Source, and the Pulsed Type Laser Source entering in the integrating sphere, called as FCIS, through the Port_1 and which come from the Current to Voltage Converter in real time, and is also used to display the maximum value of the voltage, which corresponds to fully coinciding the optical axis extending from the Port_1 to the Pin Hole placed at center of the Internal Steel Hemisphere in the FCIS with the optical axis of the Pulsed Gaussian Laser Beams of the Pulsed Type Laser Source and optical axis of the continuous wave Gaussian Laser Beams of the continuous wave Laser Source used for constructing Chopped Type Laser Source, in real time;

wherein the Time Interval Counter, input of which is connected to output of the Current to Voltage Converter, is only used to carry out traceable average time/frequency related measurements of the Pulsed Type Laser Source and the Chopped Type Laser Source, which are necessary for calculating traceable and average pulse energies of the Pulsed Type Laser Source and the Chopped Type Laser Source;

the method comprising the following steps:

individually running of the group of continuous wave Laser Sources in continuous wave regime and in different wavelengths compatible with wavelengths of the Commercial Laser Energy Meter to be calibrated, optical axis of continuous wave Gaussian Laser Beam of each of the group of continuous wave Laser Sources still running is coincided with the optical axis extending from the Port_1 to the Pin Hole at center of the Internal Steel Hemisphere placed in the FCIS by the Alignment Combination, real time tracking and maximization of voltage output of the Current to Voltage Converter, which converts the photocurrent of the Second Photodiode into the voltage output, on the oscilloscope screen by the Alignment Combination as long as the coinciding process continues, generation of Chopped Type Laser Source from each of the group of continuous wave Laser Sources in different wavelengths by activating DC Motor, after completion of coinciding the optical axes with the maximization process of the voltage output of the Current to Voltage Converter connected to the second photodiode, measurement of averaged time/frequency related parameter of the Chopped Gaussian Laser Beam of the Chopped Type Laser Source by the Time Interval Counter, to which the Second Photodiode is connected through the Current to Voltage Converter, measurement of averaged photocurrent of the first photodiode, which is proportional to averaged power of the Chopped Gaussian Laser Beam of the Chopped Type Laser Source, by the Electrometer, which is used to read out the averaged photocurrent of the first photodiode, calculation of resultant averaged pulse energy of the Chopped Gaussian Laser Beam of the Chopped Type Laser Source by using spectral responsivity determined in the method, which is the identical to spectra of the Chopped Type Laser Source, the averaged time/frequency related parameter, and the averaged photocurrent of the first photodiode as reference and averaged pulse energy to be applied to the Commercial Laser Energy Meter, perpendicular placement of the Commercial Laser Energy Meter with respect to the Chopped Gaussian Laser Beam of the Chopped Type Laser Source, which generates the reference and averaged pulse energy, calculation of calibration factor for the Commercial Laser Energy Meter by proportioning the reference and averaged pulse energy generated by Chopped Type Laser Source to the readout averaged pulse energy of the Commercial Laser Energy Meter.

20. The method of claim 19 wherein each of the group of continuous wave Laser Sources is first individually run in continuous wave regime and in different wavelengths compatible with wavelengths of the Commercial Laser Energy Meter to be calibrated, second, optical axis of continuous wave Gaussian Laser Beam of each of the group of continuous wave Laser Sources still running the continuous wave regime is coincided with the optical axis extending from the Port_1 to the Pin Hole at center of the Internal Steel Hemisphere placed in the FCIS by the Alignment Combination, third, direct voltage output, which corresponds to continuous wave regime of each of continuous wave Laser Sources, of the Current to Voltage Converter, which converts the photocurrent of the Second Photodiode into the voltage output, is tracked and maximized in real time on the oscilloscope screen by the Alignment Combination as long as the coinciding process continues, fourth, one of the group of circular choppers, which is mounted to the shaft of the DC Motor, is rotated to construct the Chopped Type Laser Source by mechanically chopping each of the continuous wave Laser Sources still running in continuous wave regime by activating the DC Motor, which has a rare earth doped magnet and separate and individual duty cycle for any constant repetition frequency, after completion of coinciding of the optical axes with the maximization process of the voltage output of the Current to Voltage Converter, fifth, averaged time/frequency related parameter of the Chopped Gaussian Laser Beam of the Chopped Type Laser Source is measured by the Time Interval Counter, to which the Second Photodiode is connected through the Current to Voltage Converter, sixth averaged photocurrent of the first photodiode, which is proportional to the averaged power of the Chopped Gaussian Laser Beam of the Chopped Type Laser Source, is measured by the Electrometer which is used to read out the averaged photocurrent of the first photodiode, during the measurement of the averaged time/frequency related parameter simultaneously, seventh, the resultant averaged pulse energy of the Chopped Gaussian Laser Beam of the Chopped Type Laser Source is calculated as reference and averaged pulse energy, which is to be applied to the Commercial Laser Energy Meter, by using the spectral responsivity determined in the first method, which is the identical to spectra of the Chopped Type Laser Source, the averaged time/frequency related parameter, and the averaged photocurrent of the first photodiode, eighth, the Commercial Laser Energy Meter is placed perpendicularly to Chopped Gaussian Laser Beam of the Chopped Type Laser Source in FCIS based-LEMCS against the in order to obtain average pulse energy readout of the Commercial Laser Energy Meter, ninth, the calibration factor for the Commercial Laser Energy Meter is calculated by proportioning the reference and averaged pulse energy generated by Chopped Type Laser Source the readout averaged pulse energy of the Commercial Laser Energy Meter.

\* \* \* \* \*